(12) United States Patent
Kondo et al.

(10) Patent No.: US 8,402,135 B2
(45) Date of Patent: Mar. 19, 2013

(54) DLNA-COMPLIANT DEVICE, DLNA CONNECTION SETTING METHOD, AND PROGRAM

(75) Inventors: Kazumoto Kondo, Tokyo (JP); Kazuhiro Imai, Kanagawa (JP); Yasuhisa Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 12/733,803

(22) PCT Filed: Sep. 26, 2008

(86) PCT No.: PCT/JP2008/067568
§ 371 (c)(1), (2), (4) Date: Mar. 17, 2010

(87) PCT Pub. No.: WO2009/041668
PCT Pub. Date: Apr. 2, 2009

(65) Prior Publication Data
US 2010/0185764 A1    Jul. 22, 2010

(30) Foreign Application Priority Data
Sep. 28, 2007 (JP) .................. P2007-255427

(51) Int. Cl.
*G06F 15/173* (2006.01)
(52) U.S. Cl. ............ 709/225; 348/552; 348/734; 710/8; 710/38
(58) Field of Classification Search .................. None
See application file for complete search history.

(56) References Cited

U.S. PATENT DOCUMENTS

| | | |
|---|---|---|
| 5,944,794 A | 8/1999 | Okamoto et al. |
| 6,457,040 B1 | 9/2002 | Mizuhara et al. |
| 7,394,499 B2 | 7/2008 | Okamoto et al. |
| 2003/0223377 A1* | 12/2003 | Simmons et al. ............. 370/254 |
| 2006/0069911 A1 | 3/2006 | Takabayashi et al. |
| 2007/0036158 A1* | 2/2007 | Hun-Kwon et al. ......... 370/389 |
| 2007/0220279 A1* | 9/2007 | Northcutt et al. ............ 713/193 |
| 2007/0237090 A1* | 10/2007 | Kim et al. .................... 370/252 |

FOREIGN PATENT DOCUMENTS

| | | |
|---|---|---|
| JP | 08-153072 A | 6/1996 |
| JP | 11-265347 A | 9/1999 |

(Continued)

OTHER PUBLICATIONS

"WWW ni Narau, Kaden Tsukuri", Nikkei Electronics, Jun. 15, 2007 (received date), vol. 954, pp. 46-49.

*Primary Examiner* — Moustafa M Meky
*Assistant Examiner* — Clayton R Williams
(74) *Attorney, Agent, or Firm* — Lerner, David, Littenberg, Krumholz & Mentlik, LLP

(57) ABSTRACT

[Problem]
To enhance the ease of use of a network by a DLNA-compliant device.
[Solving Means]
A television receiver 250 discovers another DLNA-compliant device connected to a network (S3). Then the television receiver 250 determines an IP address of eHDMI connection (S4) and, in the case of a device directly connected by HDMI, connection setting of a DLNA with that device is automatically executed (S5 through S8). The television receiver 250 may present each connection setting state to a user on a user interface screen, thereby making the user execute checking. In configuring an AV system, the user may execute direct connection by HDMI to enhance the ease of use of an AV system 200 without having to execute the connection setting of DLNA.

15 Claims, 28 Drawing Sheets

FOREIGN PATENT DOCUMENTS

| | | |
|---|---|---|
| JP | 2001-249899 A | 9/2001 |
| JP | 2003-337767 A | 11/2003 |
| JP | 2004-334756 A | 11/2004 |
| WO | WO-02/078336 A1 | 10/2002 |

* cited by examiner

F I G . 8

| PIN | SIGNAL ASSIGNMENT |
|---|---|
| 1 | TMDS DATA2+ |
| 3 | TMDS DATA2− |
| 5 | TMDS DATA1 SHIELD |
| 7 | TMDS DATA0+ |
| 9 | TMDS DATA0− |
| 11 | TMDS CLOCK SHIELD |
| 13 | CEC |
| 15 | SCL |
| 17 | DDC/CEC GROUND |
| 19 | HOT PLUG DETECT |

| PIN | SIGNAL ASSIGNMENT |
|---|---|
| 2 | TMDS DATA2 SHIELD |
| 4 | TMDS DATA1+ |
| 6 | TMDS DATA1− |
| 8 | TMDS DATA0 SHIELD |
| 10 | TMDS CLOCK+ |
| 12 | TMDS CLOCK− |
| 14 | RESERVED (N.C. ON DEVICE) |
| 16 | SDA |
| 18 | +5V POWER |

CEC EXTENSION

| Opcode | Parameters | Response |
| --- | --- | --- |
| <Request EHDMICapability> | None | true/false |
| <Request IPAddress> | None | IP Address |
| <Get IPAddress> | CEC logical addr. | IP Address |

FIG.13

CURRENT TABLE

| HDMI port | EXAMPLE OF CEC Physical address |
|---|---|
| HDMI 1 | 1.0.0.0 |
| HDMI 2 | 2.0.0.0 |
| HDMI 3 | 3.0.0.0 |

(a)

TABLE EXTENDED BY eHDMI

| HDMI port | EXAMPLE OF CEC Physical address | EXAMPLE OF IP Address |
|---|---|---|
| HDMI 1 | 1.0.0.0 | 192.168.10.3 |
| HDMI 2 | 2.0.0.0 | 192.168.10.4 |
| HDMI 3 | 3.0.0.0 | |

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | | B | | |
| 5 | C | | | | | D | | |
| 6 | Supports-AI | DC_48bit | DC_36bit | DC_30bit | DC_Y444 | Reserved (0) | Reserved (0) | DVI-Dual |
| 7 | Max_TMDS_Clock | | | | | | | |
| 8 | Latency | Full Duplex | Half Duplex | | | | | |
| 9 | Video Latency | | | | | | | |
| 10 | Audio Latency | | | | | | | |
| 11 | Interlaced Video Latency | | | | | | | |
| 12 | Interlaced Audio Latency | | | | | | | |
| 13...N | Reserved (0) | | | | | | | |

DLNA-COMPLIANT DEVICE, DLNA CONNECTION SETTING METHOD, AND PROGRAM

CROSS-REFERENCES TO RELATED APPLICATIONS

The present application is a national phase entry under 35 U.S.C. §371 of International Application No. PCT/JP2008/067568 filed Sep. 26, 2008, published on Apr. 2, 2009 as WO 2009/041668 A1, which claims priority from Japanese Patent Application No. JP 2007-255427 filed in the Japanese Patent Office on Sep. 28, 2007.

TECHNICAL FIELD

The present invention relates to a DLNA-compliant device, a DLNA connection setting method, and a program. More particularly, the present invention relates to a DLNA-compliant devices and so on configured to enhance the ease of use of a network by a DLNA-compliant device by automatically executing, for a DLNA-compliant device directly network-connected by an HDMI transmission path among other network-connected DLNA-compliant devices, the connection setting of DLNA with that DLNA-compliant device. Further, the present invention relates to a DLNA-compliant device and so on configured to enhance the ease of use of a network by DLNA-compliant devices when a DLNA-compliant device directly connected by a transmission path of HDMI is requested for an access request from a DLNA-compliant device not directly connected by a transmission path of HDMI among other network-connected DLNA-compliant devices by automatically setting access permission.

BACKGROUND ART

Recently, HDMI (High Definition Multimedia Interface) has been gaining popularity as a high-speed transmission communications interface configured to transmit at high speeds digital video signals, namely, non-compressed (or baseband) video signals (hereafter referred to as image data) and digital audio signals (hereafter referred to as audio data) accompanying the image data from AV (Audio Visual) sources including a DVD (Digital Versatile Disc) recorder and a set-top box to display devices including a television receiver and a projector, for example. For example, Patent Document 1 has a description of HDMI standard.

Also, recently, electronic devices compliant with DLNA (Digital Living Network Alliance) have been proposed. DLNA is an industry organization formed to facilitate the mutual connection between different makers in household appliance, mobile, and personal computer industries.

Patent Document 1: PCT Published application No. WO2002/078336

DISCLOSURE OF INVENTION

Technical Problem

The setting of the connection between DLNA-compliant devices requires at least the following four operations, which hampers the enhancement in the ease of use by the user.

(a) The original network setting (the physical connection between necessary devices and the preparation of a DHCP server and so on).

(b) The setting for using the server function (not only turning on the function but also the setting for publishing information of where is required).

(c) The registration of a device to be connected (registration of a client that is permitted to access the server is required).

(d) The setting of a client (the setting of the connection to which server).

Also, network-connected DLNA-compliant devices are transparent to the network, so that it is difficult to discover whether a device to be controlled is in a room or in another room; for example, policy setting such as viewing restriction is cumbersome because the recognition of the location of a device under a certain television receiver cannot be done.

Therefore, an object of the present invention is to enhance the ease of use of a network by DLNA-compliant devices.

Technical Solution

The concept of the present invention is a DLNA-compliant devices having a device discovery section configured to discover another DLNA-compliant device connected to a network;

a device decision section configured to decide whether another DLNA-compliant device found by the above-mentioned device discovery section is a DLNA-compliant device directly connected by a transmission path of HDMI; and a connection setting section configured to set the connection of DLNA with another DLNA-compliant device determined to be the above-mentioned directly connected DLNA-compliant device by the above-mentioned device decision section.

In the present invention, another DLNA-compliant device connected to a network is found by the device discovery section. Then, for the network-connected another DLNA-compliant device, the device decision section decides whether this another DLNA-compliant device is a DLNA-compliant device directly connected by a transmission path of HDMI. Next, for the DLNA-compliant device directly connected by a transmission path of HDMI among other network-connected DLNA-compliant devices, the connection setting section automatically sets the connection of DLNA with the own DLNA-compliant device. Consequently, with respect to the DLNA-compliant device directly connected by a transmission path of HDMI, the user need not execute DLNA connection setting, thereby enhancing the ease of use of a network by DLNA-compliant devices.

Further, in the present invention, for example, it is also practicable to arrange a user confirmation section so as for the user to confirm, by use of a user interface screen, that connection setting is executed in the connection setting section. In this case, the user can easily confirm, by use of a user interface screen, that DLNA connection setting is executed.

Also, the concept of this invention is a DLNA-compliant device having a device discovery section configured to discover another DLNA-compliant device connected to a network;

a device decision section configured to decide whether another DLNA-compliant device found by the above-mentioned device discovery section is a DLNA-compliant device directly connected by a transmission path of HDMI; and an access permission setting section configured, if an access request is made from a first DLNA-compliant device not directly connected to the above-mentioned transmission path of HDMI to a second DLNA-compliant device directly connected to the above-mentioned transmission path of HDMI, to execute setting for permitting the above-mentioned access.

In the present invention, another DLNA-compliant device connected to a network is found by the device discovery section. This device discovery is executed by device discovery of UPnP, for example. Then, it is determined by the device decision section whether another network-connected DLNA-compliant device is a DLNA-compliant device directly connected to the transmission path of HDMI. This device decision is executed by enquiring another DLNA-compliant device for HDMI compliance, for example. In this case, if it is found to be a DLNA-compliant device directly connected by the transmission path of HDMI, it is predicted that the device is near the own DLNA-compliant device, for example, in the same room.

Hence, if an access request is made from the first DLNA-compliant device not directly connected to the transmission path of HDMI to the second DLNA-compliant device directly connected to the transmission path of HDMI, setting is done so as to permit the above-mentioned access by the access permission setting section. Consequently, for the access request to the DLNA-compliant device directly connected by the transmission path of HDMI, the user need not set access permission, thereby enhancing the ease of use of a network by DLNA-compliant devices.

Also, in the present invention, for example, when an access request is made from a first DLNA-compliant device not directly connected to a transmission path of HDMI to a second DLNA-compliant device directly connected by the above-mentioned transmission path of HDMI, the access permission setting section may also execute setting so as to permit access to another DLNA-compliant device directly connected by the transmission path of HDMI along with the second DLNA-compliant device. Consequently, when an access request is made from the first DLNA-compliant device to a certain DLNA-compliant device directly connected by the transmission path of HDMI, setting is automatically executed so as to permit access from the first DLNA-compliant device with respect to all DLNA-compliant devices directly connected to the transmission path of HDMI.

Also, in the present invention, for example, a user confirmation section may also be arranged for the user to confirm, by use of a user interface screen, that access permission is set by the access permission setting section. In this case, the user can easily confirm that access permission is set by the use of a user interface screen.

Advantageous Effects

According to the present invention, for a DLNA-compliant device directly connected by a transmission path of HDMI among other DLNA-compliant devices connected to a network, the connection setting of DLNA with that DLNA-compliant device is automatically executed, thereby enhancing the ease of use of the network by the DLNA-compliant devices. Further, according to the present invention, when an access request is made from a DLNA-compliant device not directly connected by a transmission path of HDMI to a DLNA-compliant device directly connected to the transmission path of HDMI among other DLNA-compliant devices connected to a network, that access permission is automatically set, thereby enhancing the ease of use of the network by DLNA-compliant devices.

BRIEF DESCRIPTION OF DRAWINGS

FIG. 8 is a schematic diagram illustrating a pin arrangement (type A) of an HDMI terminal.

FIG. 13 is a diagram indicative of a table (CEC physical addresses and IP addresses corresponding to each HDMI terminal) held in each device.

FIG. 19 is a schematic diagram illustrating a structure of E-EDID vendor-specific data block.

EXPLANATION OF REFERENCE SYMBOLS

Figure 1:
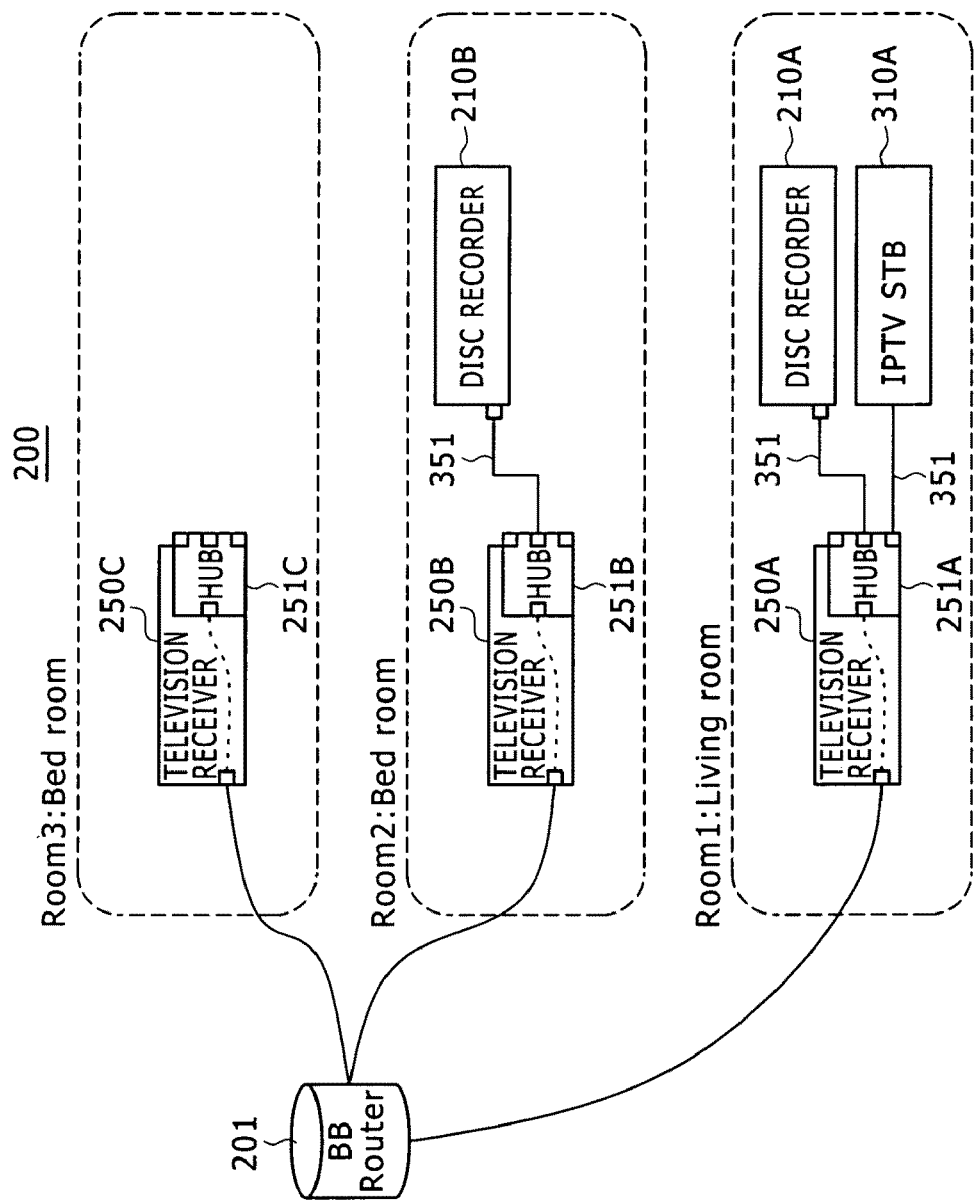
FIG. 1 is a block diagram illustrating an exemplary configuration of an AV system practiced as one embodiment of the invention.

200 ... AV system, 201 ... Broadband router, 210, 210A, 210B ... Disc recorder, 211 ... HDMI terminal, 212 ... HDMI transmission section, 212A ... High-speed data line interface, 250, 250A to 250C ... Television receiver, 251 ... HDMI terminal, 251A to 251C ... Hub, 252 HDMI reception section, 252A ... High-speed data line interface, 310 ... Set-top box for IPTV, 311 ... HDMI terminal, 312 ... HDMI transmission section, and 312A ... High-speed data line interface.

BEST MODE FOR CARRYING OUT THE INVENTION

The present invention will be described in further detail by way of embodiments thereof with reference to the accompanying drawings. Now, referring to FIG. 1, there are shown exemplary configurations of an AV (Audio Visual) system 200 practiced as one embodiment of the invention.

With this AV system 200, DLNA-compliant devices arranged in a room 1 through a room 3 are connected with each other via a broadband router (BB Router) 201, thereby configuring a network.

In the room 1, a television receiver 250A, a disc recorder 210A, and a set-top box (STB) 310A for IPTV are arranged. In this case, a hub (HUB) 251A having three HDMI terminals is arranged on the television receiver 250A and the disc recorder 210A and the set-top box 310A are connected to the HDMI terminals of that hub 251A via an HDMI cable 351.

In the room 2, a television receiver 250B and a disc recorder 210B are arranged. In this case, a hub (HUB) 251B having three HDMI terminals is arranged on the television receiver 250B and the disc recorder 210B is connected to the HDMI terminal of that hub 251B via the HDMI cable 351. In the room 3, a television receiver 250C is arranged. In this case, a hub (HUB) 251C having three HDMI terminals is arranged on the television receiver 250C.

It should be noted that, details being explained later, the television receivers 250 (250A, 250B, 250C), the disc recorders 210 (210A, 210B), and the set-top box 310A are devices compliant with eHDMI having an interface of a high-speed data line configured by use of a predetermined line of the HDMI cable 351 and the disc recorder 210 and the set-top box 310A connected to the television receiver 250 via the HDMI cable 351 also configure a network.

Figure 2:
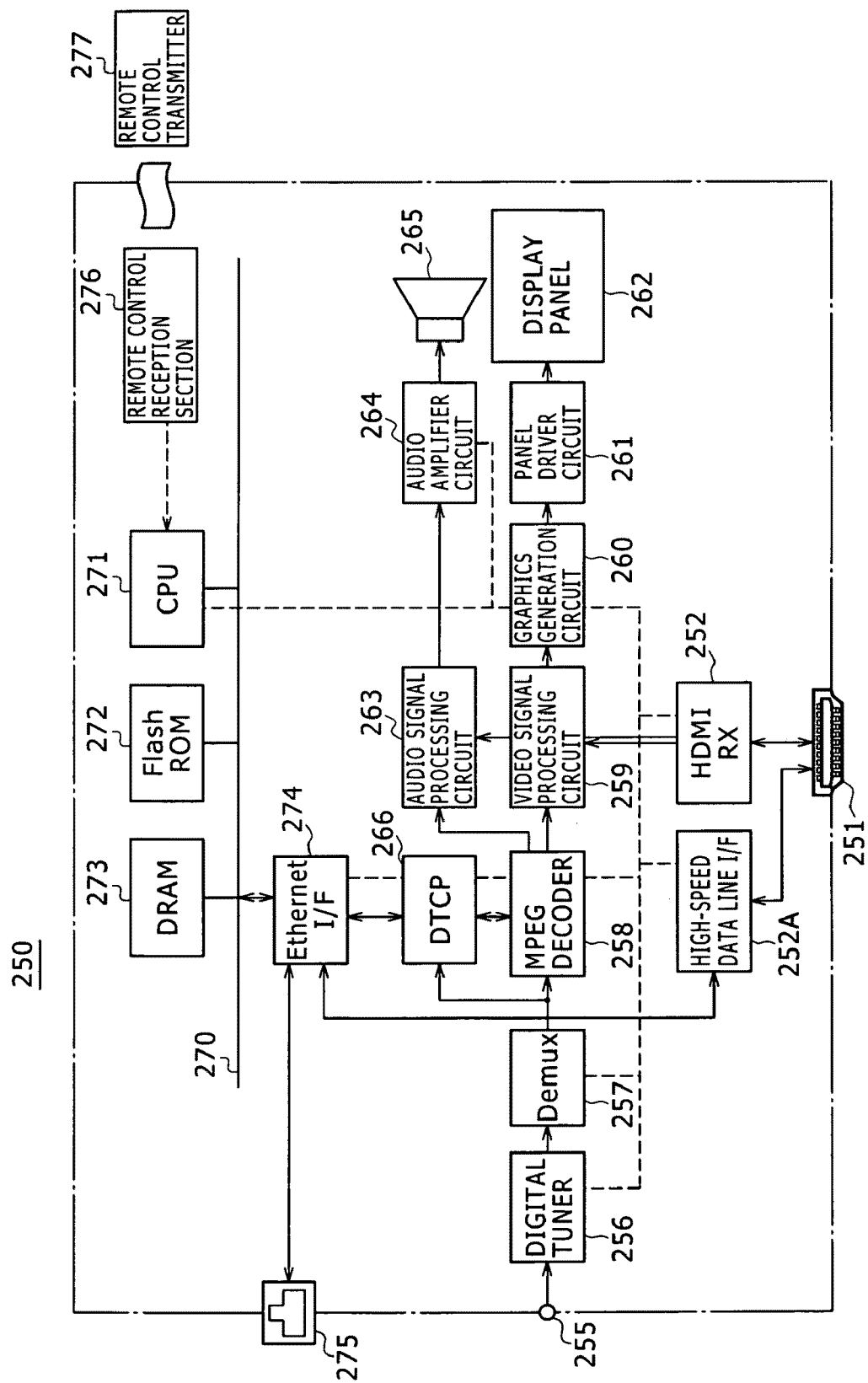
FIG. 2 is a block diagram illustrating an exemplary configuration of a television receiver (or a sink device) constituting the AV system.

FIG. 2 shows an exemplary configuration of the television receiver 250. However, in order to simplify the description, this example omits the hub having two or more HDMI terminals and therefore the configuration has only one HDMI terminal. This television receiver 250 configures a sink device of HDMI.

The television receiver 250 has an HDMI terminal 251, an HDMI reception section 252, a high-speed data line interface 252A, an antenna terminal 255, a digital tuner 256, a demultiplexer 257, an MPEG (Moving Picture Expert Group) decoder 258, a video signal processing circuit 259, a graphics generation circuit 260, a panel driver circuit 261, a display panel 262, an audio signal processing circuit 263, an audio amplifier circuit 264, a loudspeaker 265, a DTCP (Digital Transmission Content Protection) circuit 266, an internal bus 270, a CPU (Central Processing Unit) 271, a flash ROM (Read Only Memory) 272, a DRAM (Dynamic Random Access Memory) 273, an Ethernet interface (Ethernet I/F) 274, a network terminal 275, a remote control reception section 276, and a remote control transmitter 277. It is to be noted that "Ethernet" is a registered trademark.

The antenna terminal 255 is a terminal at which a television broadcast signal received by a reception antenna is entered. The digital tuner 256 processes the television broadcast signal received through the antenna terminal 255 and outputs a predetermined transport stream corresponding to a user-selected channel. The demultiplexer 257 extracts a partial TS (Transport Stream) (namely, a TS packet of video data and a TS packet of audio data) corresponding to the user-selected channel from the transport stream obtained by the digital tuner 256.

The demultiplexer 257 also extracts PSI/SI (Program Specific Information/Service Information) from the transport stream obtained by the digital tuner 256 and outputs the extracted PSI/SI to the CPU 271. The transport stream obtained by the digital tuner 256 is multiplexed with two or more channels. The processing of extracting a partial TS on a given channel from the transport stream by the demultiplexer 257 is enabled by obtaining the packet ID (PID) information of that channel from the PSI/SI (PAT/PMT).

The MPEG decoder 258 executes decoding on a video PES (Packetized Elementary Stream) packet made up of a TS packet of video data obtained by the demultiplexer 257, thereby obtaining video data. Also, the MPEG decoder 258 executes decoding on an audio PES packet made up of a TS packet of audio data obtained by the demultiplexer 257, thereby obtaining audio data. It should be noted that the MPEG decoder 258 executes decoding on the video and audio PES packets decoded by the DTCP circuit 266, thereby obtaining video and audio data, as required.

The video signal processing circuit 259 and the graphics generation circuit 260 execute multiscreen processing, graphics data superimposition processing and so on the video data obtained by the MPEG decoder 258, as required. The graphics generation circuit 260 also generates a user interface screen and so on for the user to be described later to confirm connection setting of DLNA or permission setting of an access request, for example. The panel driver circuit 261 drives the display panel 262 on the basis of the video data outputted from the graphics generation circuit 260. The display panel 262 is made up of an LCD (Liquid Crystal Display), a PDP (Plasma Display Panel), or the like. The audio signal processing circuit 263 executes D/A conversion and other necessary processing on the audio data obtained in the MPEG decoder 258. The audio amplifier circuit 264 amplifies an audio signal outputted from the audio signal processing circuit 263 and supplies the obtained audio signal to the loudspeaker 265.

The DTCP circuit 266 encrypts the partial TS extracted by the demultiplexer 253 as required. In addition, the DTCP circuit 266 decrypts the encrypted data supplied from the network terminal 275 or the high-speed data line interface 252A to the Ethernet interface 274 as required.

The CPU 271 controls the operation of each component of the television receiver 250. The flash ROM 272 stores control software and data. The DRAM 273 constitutes a work area for use by the CPU 271. The CPU 271 expands the software and data read from the flash ROM 272 into the DRAM 273 to start the software, thereby controlling each component of the television receiver 250. The remote control reception section 266 receives a remote control signal (a remote control code) supplied from the remote control transmitter 267 and supplies the received signal to the CPU 271. The CPU 271, the flash ROM 272, the DRAM 273, and the Ethernet interface 274 are connected to the internal bus 270.

The HDMI reception section (HDMI sink) 252 receives baseband video (image) data and audio data supplied to the HDMI terminal 251 via the HDMI cable 351 by the communication based on HDMI. Details of the HDMI reception section 252 will be described later. The high-speed data line interface 252A provides bidirectional communication interfaces by use of a predetermined line (the reserved line and the HOD line in this embodiment) constituting the HDMI cable 252. Details of these high-speed data line interface 252A will be described later.

The following briefly describes an operation of the television receiver 250 shown in FIG. 2.

A television broadcast signal entered in the antenna terminal 255 is supplied to the digital tuner 256. The digital tuner 256 processes the received television signal to output a predetermined transport stream corresponding to a user-specified channel. This predetermined transport stream is supplied to the demultiplexer 257. The demultiplexer 257 extracts, from the supplied transport stream, a partial TS (a video data TS packet and an audio data TS packet) corresponding to the user-specified channel, supplying the extracted partial TS to the MPEG decoder 258.

The MPEG decoder 258 decodes the video PES packet made up of the video data TS packet to obtain video data. The video signal processing circuit 259 and the graphics generation circuit 260 execute multiscreen processing, graphics data superimposition processing and so on on this video data as required, supplying the processed video data to the panel driver circuit 261. Consequently, an image corresponding to the user-specified channel is displayed on the display panel 262.

Also, the MPEG decoder 258 decodes the audio PES packet made up of the audio data TS packet, thereby obtaining audio data. The audio signal processing circuit 263 executes necessary processing, such as D/A conversion, on this audio data. The audio amplifier circuit 264 amplifies the processed audio data and supplies the amplified audio data to the loudspeaker 265. Consequently, the sound corresponding to the user-specified channel is outputted from the loudspeaker 265.

At the reception of the above-mentioned television broadcast signal, a partial TS extracted by the demultiplexer 257 is supplied to a mate device connected by the HDMI cable 351 after being encrypted by the DTCP circuit 266 to be supplied to the high-speed data line interface 252A via the Ethernet interface 274 as transmission data. Therefore, this partial TS is transmitted to the mate device via a predetermined line of the HDMI cable 351 connected to the HDMI terminal 251.

In transmitting the partial TS extracted by the demultiplexer 257 to a network at the time of receiving a television broadcast signal as described above, this partial TS is encrypted by the DTCP circuit 266 before being outputted to the network terminal 275 via the Ethernet interface 274.

Further, the encrypted partial TS supplied to the network terminal 275 or received by the high-speed data line interface 252A from the HDMI terminal 251 is supplied to the DTCP circuit 266 via the Ethernet interface 274 to be decrypted, as required. Then, this partial TS is supplied to the MPEG decoder 258 to be decoded to obtain video (image) data and audio data. Subsequently, the same operation as that executed at the reception of the above-mentioned television broadcast signal, displaying an image on the display panel 262 and outputting sound from the loudspeaker 265.

The remote control reception section 276 receives a remote control code (a remote control signal) transmitted from the remote control transmitter 277 and supplies the received remote control code to the CPU 271. If this remote control code is associated with control of the television receiver 250, the CPU 271 controls components of the television receiver 250 as specified by this remote control code.

Further, in the CPU 271, an IP packet including a remote control code supplied from the remote control reception section 276 is generated. This IP packet is outputted to the HDMI terminal 251 via the Ethernet interface 274 and the high-speed data line interface 252A. Therefore, this IP packet is transmitted to the mate device through the HDMI cable 351 connected to the HDMI terminal 271. Also, this IP packet is transmitted to the network, as required. In that case, this IP packet is outputted to the network terminal 275 via the Ethernet interface 274. Consequently, the operations of other devices can be controlled by the remote control transmitter 277 of the television receiver 250.

Figure 3:
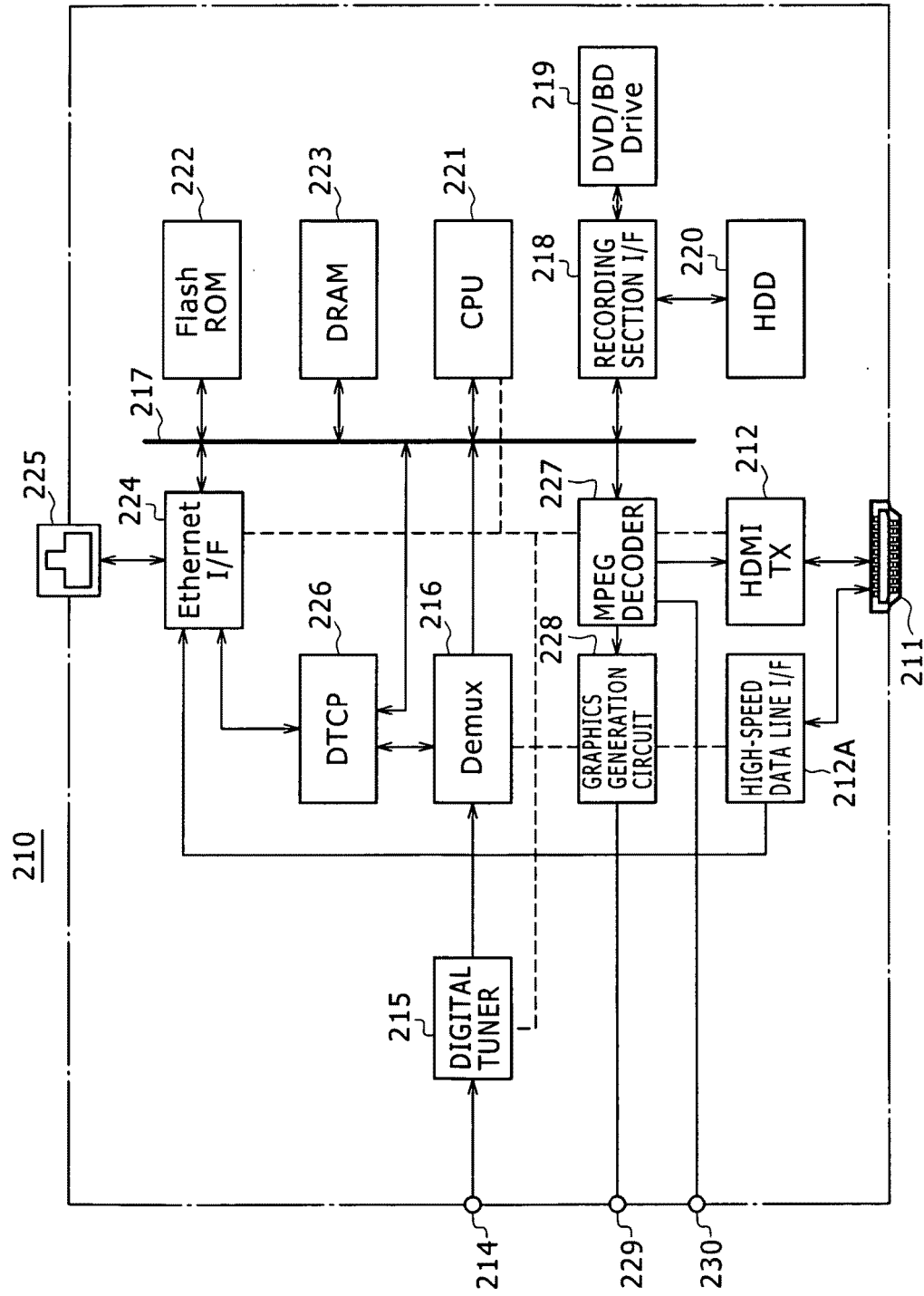
FIG. 3 is a block diagram illustrating an exemplary configuration of a disc recorder (or a source device) constituting the AV system.

FIG. 3 shows an exemplary configuration of the disc recorder 210. This disc recorder 210 has an HDMI terminal 211, an HDMI transmission section 212, a high-speed data line interface 212A, an antenna terminal 214, a digital tuner 215, a demultiplexer 216, an internal bus 217, a recording section interface 218, a DVD/BD drive 219, an HDD (Hard Disk Drive) 220, a CPU 221, a flash ROM 222, a DRAM 223, an Ethernet interface (Ethernet I/F) 224, a network terminal 225, a DTCP circuit 226, an MPEG decoder 227, a graphics generation circuit 228, a video output terminal 229, and an audio output terminal 230.

The HDMI transmission section (HDMI source) 212 transmits the data of video (image) and audio of baseband from the HDMI terminal 211 by the communication based on HDMI. Details of this HDMI transmission section 212 will be described later. The high-speed data line interface 212A is an interface of bidirectional communication using predetermined lines (in this embodiment, a reserve line, an HPD line) configuring the HDMI cable 351. Details of this high-speed data line interface 212A will be described later.

The antenna terminal 214 is a terminal at which a television broadcast signal received at a reception antenna (not shown) is entered. The digital tuner 215 processes the television broadcast signal entered at the antenna terminal 214 to output a predetermined transport stream. The demultiplexer 216 extracts a partial TS (a TS packet of video data, a TS packet of audio data) corresponding to a predetermined selected channel.

Also, the demultiplexer 216 takes PSI/SI out of the transport stream obtained in the digital tuner 215 and outputs the PSI/SI to the CPU 221. The transport stream obtained in the digital tuner 215 has been multiplexed with two or more channels. The processing of extracting a partial TS of a given channel from this transport stream by the demultiplexer 216 is made practicable by getting information about a packet ID (PID) of this given channel from PSI/SI (PAT/PMT).

The CPU 221, the flash ROM 222, the DRAM 223, the demultiplexer 216, the Ethernet interface 224, and the recording section interface 218 are connected to the internal bus 217. The DVD/BD drive 219 and the HDD 220 are connected to the internal bus 217 via the recording section interface 218. The DVD/BD drive 219 and the HDD 220 record the partial TS extracted by the demultiplexer 216. In addition, the DVD/BD drive 219 and the HDD 220 each reproduce the partial TS recorded to a recording media.

The MPEG decoder 227 decodes video PES packets configuring a partial TS extracted by the demultiplexer 216 or reproduced by the DVD/BD drive 219 or the HDD 220, thereby obtaining video data. In addition, the MPEG decoder 227 decodes audio PES packets configuring this partial TS to obtain audio data.

The graphics generation circuit 228 executes graphics data superimpose processing and the like on the video data obtained in the MPEG decoder 227, as required. The video output terminal 229 outputs the video data outputted from the graphics generation circuit 228. The audio output terminal 230 outputs the audio data obtained in the MPEG decoder 227.

The DTCP circuit 226 encrypts a partial TS extracted in the demultiplexer 216 or a partial TS reproduced by the DVD/BD drive or the HDD 220, as required. The DTCP circuit 226 decrypts the encrypted data supplied from the network terminal 225 or the high-speed data line interface 212A to the Ethernet interface 224.

The CPU 221 controls the operations of components of the disc recorder 210. The flash ROM 222 stores control software and stores data. The DRAM 223 configures a work area of the CPU 221. The CPU 221 develops software and data read from the flash ROM 222 into the DRAM 223 to start up software, thereby controlling components of the disc recorder 210.

The following briefly describes operations of the disc recorder 210 shown in FIG. 3.

A television broadcast signal entered at the antenna terminal 214 is supplied to the digital tuner 215. The digital tuner 215 processes the television broadcast signal to take out a predetermined transport stream, which is supplied to the demultiplexer 216. The demultiplexer 216 extracts a partial TS (a TS packet of video data, a TS packet of audio data) corresponding to a predetermined channel from the transport stream. This partial TS is supplied to the DVD/BD drive 219 or the HDD 220 via the recording section interface 218 to be recorded in accordance with a record instruction from the CPU 221.

Further, as described above, the partial TS extracted in the demultiplexer 216 or the partial TS reproduced in the DVD/BD drive 219 or the HDD 220 is supplied to the MPEG decoder 227. The MPEG decoder 227 decodes the video PES packet configured by the TS packets of video data, thereby obtaining video data. The graphics generation circuit 228 executes superimpose processing and the like on this video data with graphics data and outputs the processed data to the video output terminal 229. In addition, the MPEG decoder 227 decodes the audio PES packet configured by TS packets of audio data to obtain audio data. This audio data is outputted to the audio output terminal 230.

The video (image) data and the audio data obtained in the MPEG decoder 227 in accordance with the partial TS reproduced in the DVD/BD drive 219 or the HDD 220 are supplied to the HDMI transmission section 212 to be transmitted to the HDMI cable 351 connected to the HDMI terminal 211, as required.

Also, the partial TS extracted in the demultiplexer 216 or the partial TS reproduced in the DVD/BD drive 219 or the HDD 220 is encrypted by the DTCP circuit 226, as required, to be supplied to the high-speed data line interface 212A via the Ethernet interface 224 as transmission data. Hence, this partial TS is transmitted to the mate device via a predetermined line of the HDMI cable 351 connected to the HDMI terminal 211.

Further, in transmitting the partial TS extracted by the demultiplexer 216 or the partial TS reproduced in the DVD/BD drive 219 or the HDD 220, this partial TS is encrypted by the DTCP circuit 226 to be outputted to the network terminal 225 via the Ethernet interface 224.

Also, the high-speed data line interface 212A receives the IP packet including a remote control code transmitted through a predetermined line of the HDMI cable 351 connected to the HDMI terminal 211. This IP packet is supplied to the CPU 221 via the Ethernet interface 224. If the remote control code included in this IP packet is related with the control of the disc recorder 210, the CPU 221 controls components of the disc recorder 210 on the basis of this remote control code.

Figure 4:
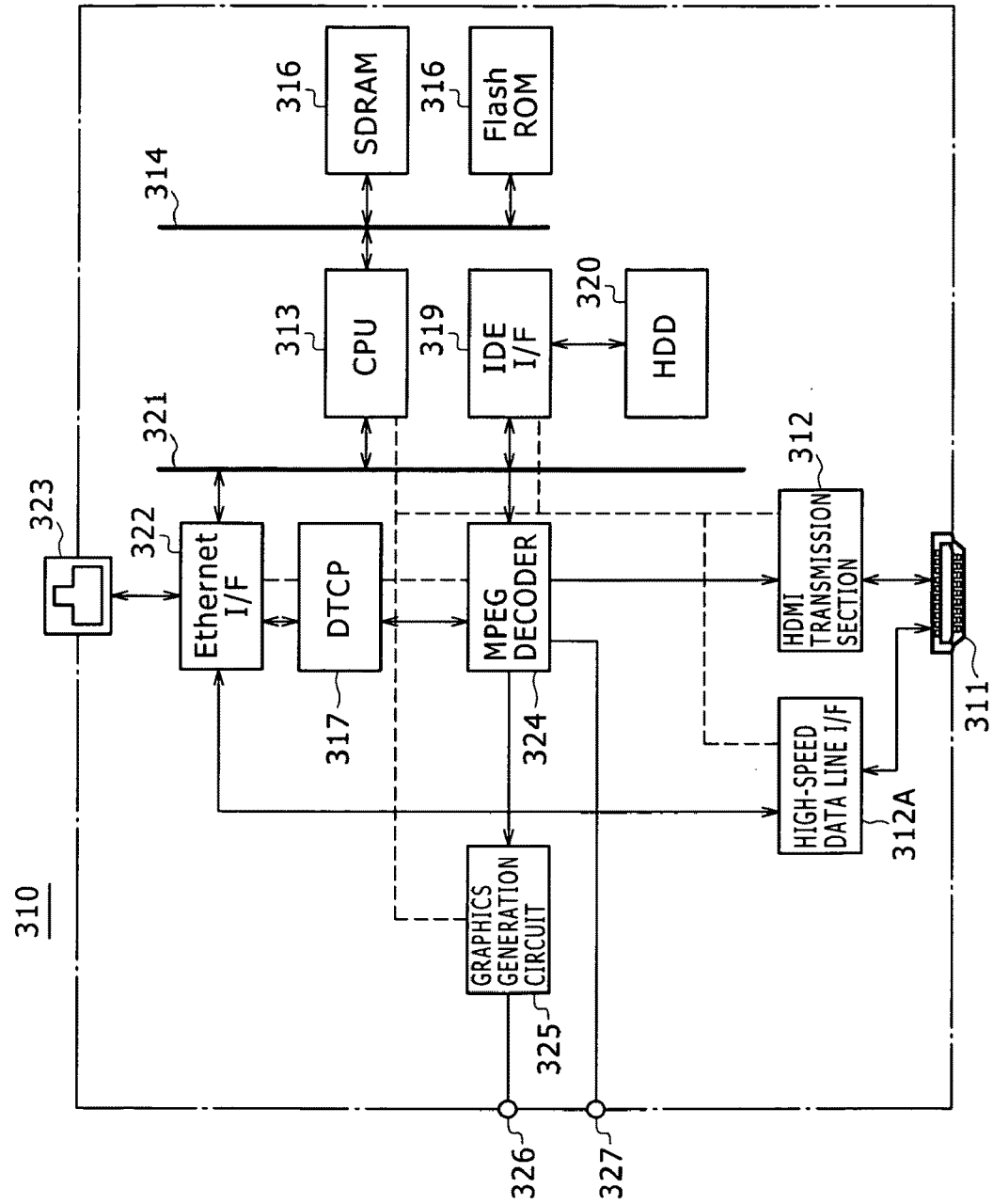
FIG. 4 is a block diagram illustrating an exemplary configuration of a set-top box (or a source device) constituting the AV system.

FIG. 4 shows an exemplary configuration of a set-top box 310 for IPTV. This set-top box 310 has an HDMI terminal 311, an HDMI transmission section 312, a high-speed data line interface (I/F) 312A, a CPU 313, a CPU bus 314, a flash ROM 315, an SDRAM 316, a DTCP circuit 317, an IDE interface 319, an HDD 320, an internal bus 321, an Ethernet interface (Ethernet I/F) 322, a network terminal 323, an MPEG decoder 324, a graphics generation circuit 325, a video output terminal 326, and an audio output terminal 327. The HDMI transmission section (HDMI source) 312 transmits data of video (image) and audio of baseband from the HDMI terminal 311 to the HDMI cable 351 by the communication based on HDMI. Details of this HDMI transmission section 312 will be described later. The high-speed data line interface 312A is an interface of bidirectional communication using a predetermined line (in this embodiment, a reserve line and an HPD line) configuring the HDMI cable 351. Details of this high-speed data line interface 312A will be described later.

The CPU 313, the flash ROM 315, and the SDRAM 316 are connected to the CPU bus 314. Also, the CPU 313, the IDE interface 319, the Ethernet interface 322, and the MPEG decoder 324 are connected to the internal bus 321.

The CPU 313 controls the operations of components of the set-top box 310. The flash ROM 315 stores control software and stores data. The SDRAM 316 configures a work area of the CPU 313. The CPU 313 develops software and data read from the flash ROM 315 into the SDRAM 316 to start up software, thereby controlling components of the set-top box 310.

The HDD 320 accumulates download data from a VOD (Video On Demand) server, for example. This HDD 320 is connected to the internal bus 321 via the IDE interface 319. The MPEG decoder 324 decodes an MPEG2 stream that is streaming data from the VOD server or an MPEG2 stream reproduced from the HDD 320, thereby obtaining video data and audio data.

The DTCP circuit 317 encrypts a partial TS reproduced in the HDD 320, as required. Also, the DTCP circuit 317 decrypts the encrypted data supplied from the network terminal 323 or the high-speed data line interface 212A to the Ethernet interface 322.

The graphics generation circuit 325 executes graphics data superimpose processing and the like on the video (image) data obtained in the MPEG decoder 324, as required. The video output terminal 326 outputs the video data outputted from the graphics generation circuit 325. The audio output terminal 327 outputs the audio data obtained in the MPEG decoder 324.

The following briefly describes operations of the set-top box 310 shown in FIG. 4.

The encrypted download data obtained from the network terminal 323 via the Ethernet interface 322 is decrypted by the DTCP circuit 317 to be supplied to the HDD 220 via the IDE interface 319 for accumulation.

Further, the encrypted streaming data obtained from the network terminal 323 via the Ethernet interface 322 is decrypted by the DTCP circuit 317 to be supplied to the MPEG decoder 324 for decoding. Then, The MPEG decoder 324 decodes the video PES packet configured by the TS packets of video data, thereby obtaining video data. The graphics generation circuit 325 executes superimpose processing and the like on this video data with graphics data and outputs to the video output terminal 326. In addition, the MPEG decoder 324 decodes the audio PES packet configured by TS packets of audio data to obtain audio data. This audio data is outputted to the audio output terminal 327.

Also, the partial TS reproduced in the HDD 320 is supplied to the MPEG decoder 324 for decoding to obtain video (image) data and audio data, the video data being outputted to the video output terminal 326, the audio data being outputted to the audio output terminal 327.

Further, at the time of receiving the streaming data from the network terminal 323 or at the time of reproduction from the HDD 320, the video (image) data and audio data obtained in the MPEG decoder 324 are supplied to the HDMI transmission section 312 as required and then transmitted to the HDMI cable 351 connected to the HDMI terminal 311.

Further, a partial TS obtained by decrypting the streaming data entered via the network terminal 323 in the DTCP circuit 317 or a partial TS reproduced in the HDD 320 is encrypted by the DTCP circuit 317 and then supplied to the high-speed data line interface 312A via the Ethernet interface 322 as transmission data. Hence, this partial TS is transmitted to the mate device via a predetermined line of the HDMI cable 351 connected to the HDMI terminal 311.

Further, when a partial TS obtained by decrypting the streaming data entered via the network terminal 323 in the DTCP circuit 317 or a partial TS reproduced in the HDD 320 is transmitted to the network, this partial TS is encrypted by the DTCP circuit 317 and then outputted to the network terminal 323 via the Ethernet interface 322.

Further, the high-speed data line interface 312A receives an IP packet containing a remote control code transmitted via a predetermined line of the HDMI cable 351 connected to the HDMI terminal 311. This IP packet is supplied to the CPU 313 via the Ethernet interface 322. If the remote control code included in this IP packet is related to the control of the set-top box 310, the CPU 313 controls components of the set-top box 310 on the basis of this remote control code.

Figure 5:
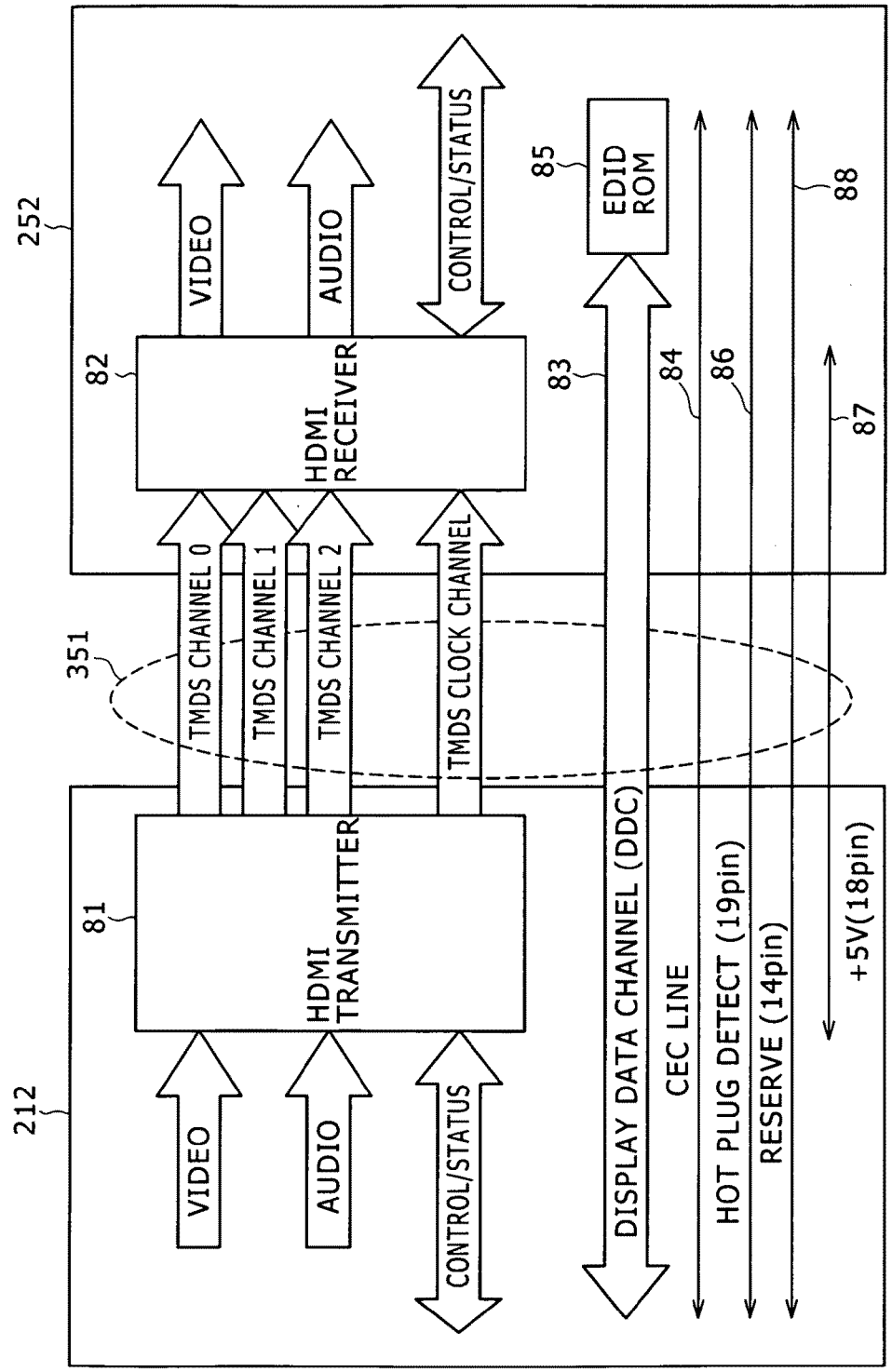
FIG. 5 is a block diagram illustrating exemplary configurations of an HDMI transmission section (or an HDMI source) and an HDMI reception section (HDMI sink).

Referring to FIG. 5, there are shown exemplary configurations of the HDMI transmission section (HDMI source) 212 of the set-top box 210 described above and the HDMI reception section (HDMI sink) 252 of the television receiver 250.

The HDMI source 212 unidirectionally transmits a differential signal corresponding to pixel data of an image for one non-compressed screen to the HDMI sink 252 on a two or more channels in an effective image interval (hereafter referred to as an active video interval) obtained by removing a horizontal blanking interval and a vertical blanking interval from an interval between one vertical sync signal to the following vertical sync signal and, at the same time, unidirectionally transmits a differential signal corresponding to at least audio data and control data accompanying the image and other auxiliary data to the HDMI sink 252 on two or more channels in a horizontal blanking interval or a vertical blanking interval.

Namely, the HDMI source 212 has an HDMI transmitter 81. The transmitter 81 converts pixel data of a non-compressed image into corresponding differentials signal and unidirectionally serial transmits the differential signals to the HDMI sink 252 via the HDMI cable 351 over three TMDS channels #0, #1, and #2.

Further, the transmitter 81 converts the audio data accompanying a non-compressed image, necessary control data, other auxiliary data and so on into corresponding differential signals and unidirectionally serial transmits the differential signals to the HDMI sink 252 connected via the HDMI cable 351 over the three TMDS channels #0, #1, and #2.

In addition, the transmitter 81 transmits a pixel clock synchronized with pixel data to be transmitted over the three TMDS channels #0, #1, and #2 to the HDMI sink 252 connected via the HDMI cable 351 over a TMDS clock channel. It should be noted that, on one TMDS channel #1 (i=0, 1, 2), pixel data of 10 bits is transmitted in one pixel clock.

In an active video interval, the HDMI sink 252 receives a differential signal corresponding to pixel data unidirectionally transmitted from the HDMI source 212 over two or more channels in an active video interval and, at the same time, receives a differential signal corresponding to audio data and control data unidirectionally transmitted from the HDMI source 212 over two or more channels in a horizontal blanking interval or a vertical blanking interval.

Namely, the HDMI sink 252 has an HDMI receiver 82. The receiver 82 receives a differential signal corresponding to pixel data and a differential signal corresponding to audio data and control data unidirectionally transmitted from the HDMI source 212 connected via the HDMI cable 351 over the TMDS channels #0, #1, and #2, in synchronization with a pixel clock transmitted from the HDMI source 212 over the TMDS clock channel.

The transmission channels of the HDMI system based on the HDMI source 212 and the HDMI sink 252 include the three TMDS channels #0 through #2 for unidirectionally serial transmitting pixel data and audio data in synchronization with a pixel clock to the HDMI source 212 and the HDMI sink 252, the TMDS clock channel for transmitting a pixel clock, and transmission channels referred to as a DDC (Display Data Channel) 83 and a CEC line 84.

The DDC 83 is made up of two signal lines, not shown, included in the HDMI cable 351 and is used for the HDMI source 212 to read E-EDID (Enhanced Extended Display Identification Data) from the HDMI sink 252 connected via the HDMI cable 351.

Namely, in addition to the receiver 82, the HDMI sink 252 has an EDID ROM (Read Only Memory) 85 that stores E-EDID that is performance information associated with the configuration/capability of the HDMI sink 252 itself. The HDMI source 212 reads, via the DDC 83, the E-EDID of the HDMI sink 252 from the HDMI sink 252 connected via the HDMI cable 351 and, on the basis of this E-EDID, recognizes the setting of the performance of the HDMI source 212, namely, a format (or a profile) of an image to which an electronic device having the HDMI sink 252 corresponds, RGB, YCbCr4:4:4, and YCbCr4:2:2, for example.

The CEC line 84 is made up of one signal line, not shown, included in the HDMI cable 351 and is used for the bidirectional control data communication between the HDMI source 212 and the HDMI sink 252.

The HDMI cable 351 also includes a line 86 that is connected to a pin referred to as HPD (Hot Plug Detect). By use of the line 86, each source device can detect the connection of each sink device. In addition, the HDMI cable 351 includes a line 87 that is used to supply power from the source device to the sink device. Further, the HDMI cable 351 includes a reserved line 88.

Figure 6:
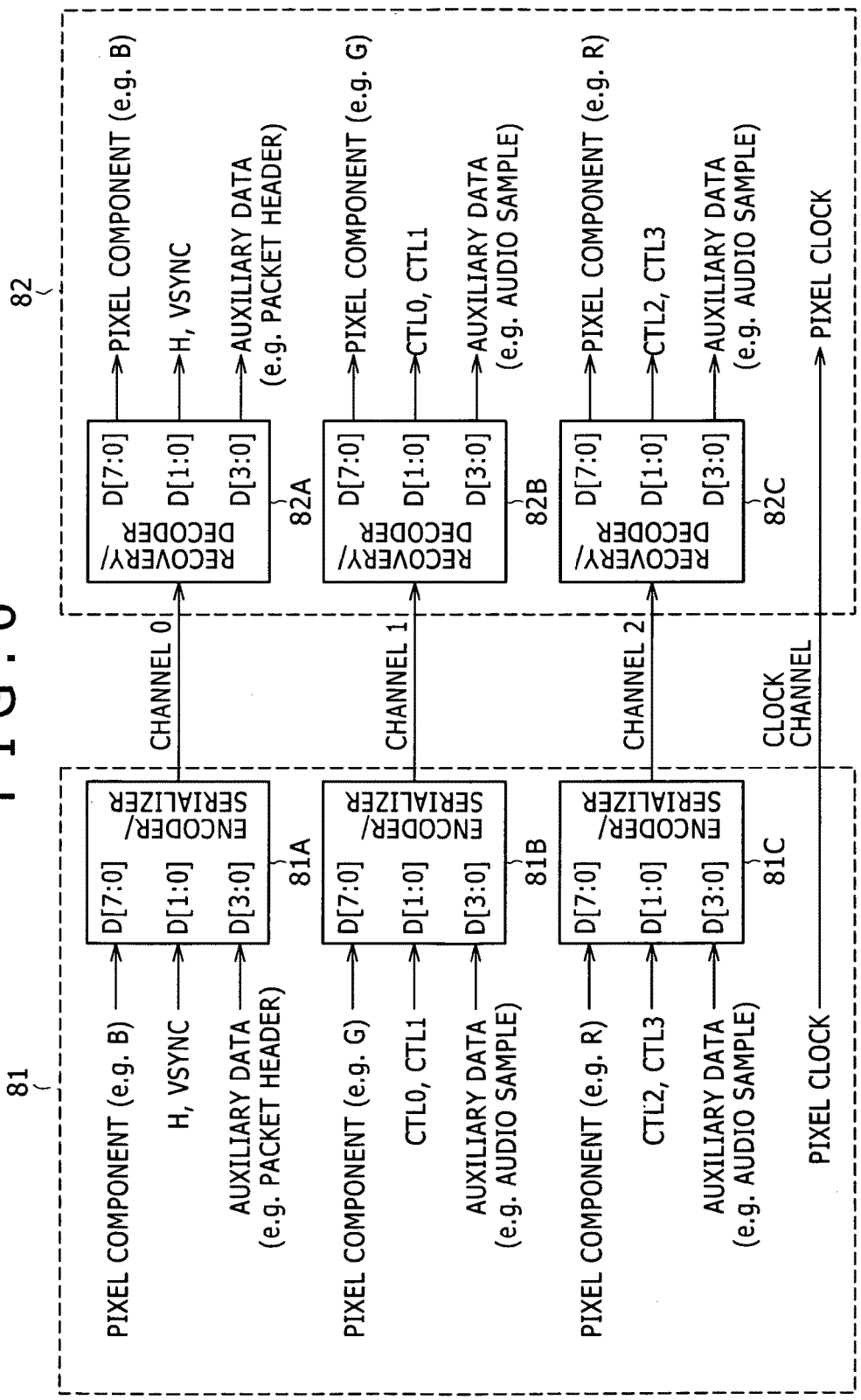
FIG. 6 is a block diagram illustrating exemplary configurations of an HDMI transmitter and an HDMI receiver.

FIG. 6 shows an exemplary configuration of the HDMI transmitter 81 and the HDMI receiver 82 shown in FIG. 5.

The transmitter 81 has three encoders/serializers 81A, 81B, and 81C corresponding to the three TMDS channels #0, #1, and #2, respectively. Each of the three encoders/serializers 81A, 81B, and 81C encodes image data, auxiliary data and control data supplied thereto to covert these data from parallel to serial, the resultant data being transmitted by differential signals. If the image data has three components, R (Red), G (Green), and B (Blue), for example, the B component is supplied to the encoder/serializer 81A, the G component to the encoder/serializer 81B, and the R component to the encoder/serializer 81C.

The auxiliary data include audio data and control packet data, for example. The control packet data is supplied to the encoder/serializer 81A and the audio data is supplied to the encoder/serializers 81B and 81C.

Further, the control data include a 1-bit vertical sync signal (VSYNC), a 1-bit horizontal sync signal (HSYNC), and 1-bit control bits CTL0, CTL1, CTL2, and CTL3. The vertical sync signal and the horizontal sync signal are supplied to the encoder/serializer 81A. The control bits CTL0 and CTL1 are supplied to the encoder/serializer 81B. The control bits CTL2 and CTL3 are supplied to the encoder/serializer 81C.

The encoder/serializer 81A transmits, in a time division manner, B component of the supplied image data, the supplied vertical sync signal and horizontal sync signal, and the supplied auxiliary data. Namely, the encoder/serializer 81A converts B component of the image data supplied thereto into 8-bit parallel data that is the fixed number of bits. Further, the encoder/serializer 81A encodes this parallel data into serial data and transmits the serial data over TMDS channel #0.

Also, the encoder/serializer 81A encodes 2-bit parallel data of a vertical sync signal and a horizontal sync signal supplied thereto into serial data and transmits this serial data over TMDS channel #0. In addition, the encoder/serializer 81A converts auxiliary data supplied thereto into 4-bit parallel data. Then, the encoder/serializer 81A encodes and converts this parallel data into serial data and transmits this serial data over TMDS channel #0.

The encoder/serializer 81B transmits, a time division manner, G component of image data, control bits CTL0, CTR1, and auxiliary data supplied thereto. Namely, the encoder/serializer 81B converts G component of the image data supplied thereto into 8-bit parallel data that is the fixed number of bits. Further, the encoder/serializer 81B encodes and converts this parallel data into serial data and transmits the serial data over TMDS channel #1.

The encoder/serializer 81B encodes and converts 2-bit parallel data of control bits CTL0 and CTL1 supplied thereto into serial data and transmits this serial data over TMDS channel #1. Further, the encoder/serializer 81B converts the auxiliary data supplied thereto into 4-bit parallel data. Then, the encoder/serializer 81B encodes and converts this parallel data into serial data and transmits this serial data over the TMDS channel #1.

The encoder/serializer 81C transmits, in a time division manner, R component of image data, control bits CTL2, CTL3, and auxiliary data supplied thereto. Namely, the encoder/serializer 81C converts R component of the image data supplied thereto into 8-bit parallel data that is the fixed number of bits. Further, the encoder/serializer 81C encodes and converts this parallel data into serial data and transmits the serial data over TMDS channel #2.

The encoder/serializer 81C encodes and converts 2-bit parallel data of control bits CTL2 and CTL3 into serial data and transmits this serial data over TMDS channel #2. Further, the encoder/serializer 81C converts the auxiliary data supplied thereto into 4-bit parallel data. Then, the encoder/serializer 81C encodes and converts this parallel data into serial data and transmits this serial data over the TMDS channel #2.

The receiver 82 has three recoveries/decoders 82A, 82B, and 82C corresponding to three TMDS channels #0, #1, and #2, respectively. Each of the recoveries/decoders 82A, 82B, and 82C receives image data, auxiliary data, and control data transmitted by differential signals over TMDS channels #0, #1, and #2. Further, each of the recoveries/decoders 82A, 82B, and 82C converts the received image data, auxiliary data, and control data from serial to parallel and decodes the resultant parallel data, outputting the decoded data.

Namely, the recovery/decoder 82A receives B component of image data, a vertical sync signal, horizontal sync signal, and auxiliary data transmitted by differential signals over TMDS channel #0. Then, the recovery/decoder 82A converts these B component of image data, vertical sync signal, horizontal sync signal, and auxiliary data from serial to parallel and decodes the parallel data, outputting the decoded data.

The recovery/decoder 82B receives G component of image data, control bit CTL0, control bit CTL1, and auxiliary data transmitted by differential signals over TMDS channel #1. Then, the recovery/decoder 82B converts these G component of image data, control bit CTL0, control bit CTL1, and auxiliary data from serial to parallel and decodes the parallel data, outputting the decoded data.

The recovery/decoder 82C receives R component of image data, control bit CTL2, control bit CTL3, and auxiliary data transmitted by differential signals over TMDS channel #2. Then, the recovery/decoder 82C converts these R component of image data, control bit CTL2, control bit CTL3, and auxiliary data from serial to parallel and decodes the parallel data, outputting the decoded data.

Figure 7:
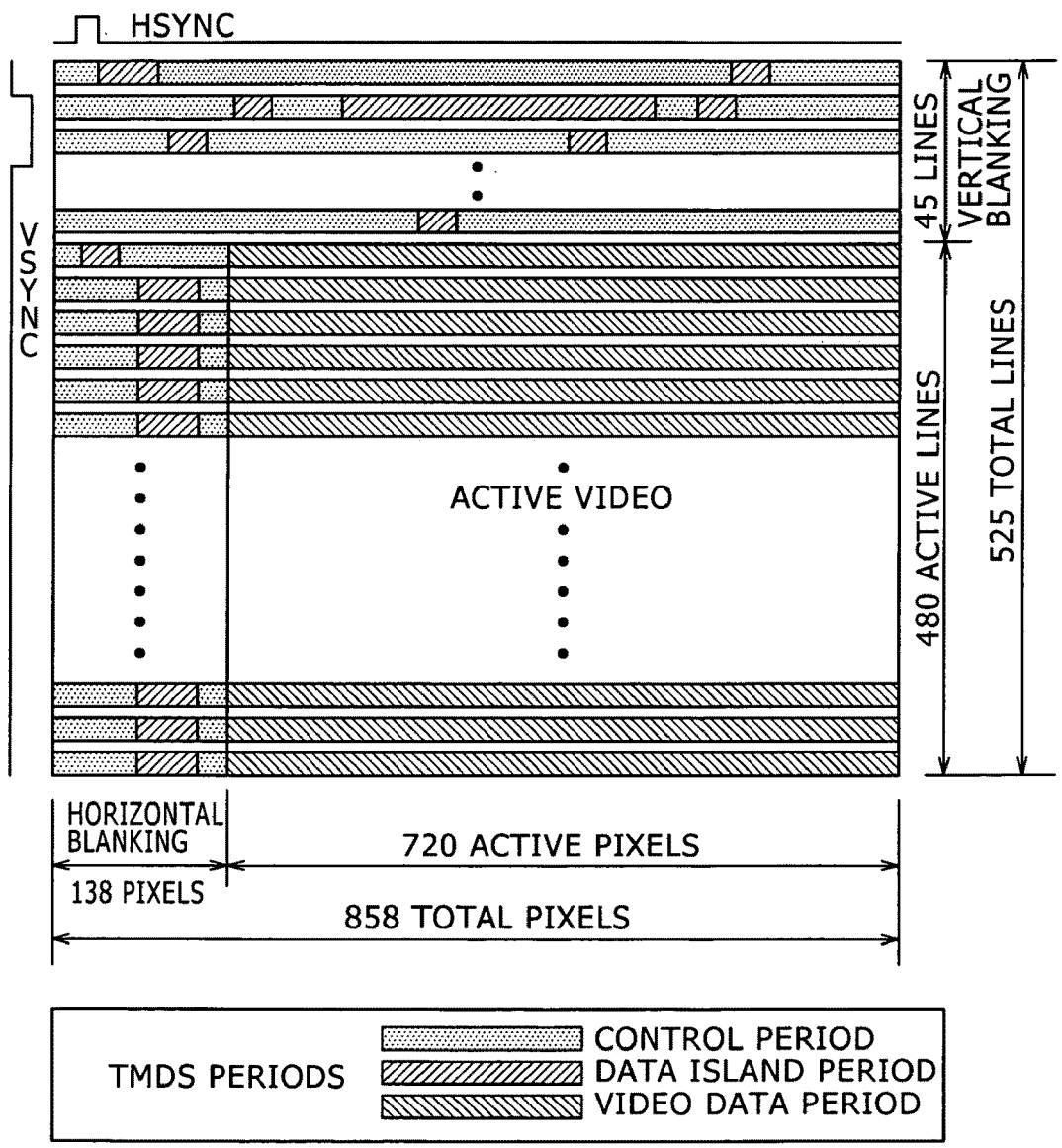
FIG. 7 is a schematic diagram illustrating a structure of TMDS transmission data.

FIG. 7 shows an example of transmission periods in which various kinds of transmission data are transmitted over the three TMDS channels #0, #1 and #2 of HDMI. It should be noted that FIG. 7 shows periods of various kinds of transmission data in the case where a progressive image of 720, (wide)×480 (high) pixels is transmitted over TMDS channels #0, #1, and #2.

A video field in which transmission data is transmitted over the three TMDS channels #0, #1, and #2 of HDMI has three kinds of periods, a video data period, a data island period, and a control period depending on the type of transmission data.

The video field period is a period between the active edge of a vertical sync signal to the active edge of the next vertical sync signal. The video field period is divided into a horizontal blanking period, a vertical blanking period, and an active video period obtained by removing horizontal blanking and vertical blanking from the video field period.

The video data period is allocated to the active video period. In this video data period, data made up of active pixels for 720 pixels×480 lines making up the image data for one non-compressed screen is transmitted.

A data island period and a control period are allocated to the horizontal blanking period and vertical blanking period. In the data island period and a control period, auxiliary data is transmitted.

Namely, a data island period is allocated to parts of the horizontal blanking period and vertical blanking period. In this data island period, of the auxiliary data, the data not associated with control, such as an audio data packet for example, is transmitted.

The control period is allocated to other parts of the horizontal blanking period and vertical blanking period. In this control period, of the auxiliary data, the data associated with control, such as a vertical sync signal, a horizontal sync signal, and a control packet, is transmitted.

In the current HDMI standard, the frequency of a pixel clock transmitted on the TMDS clock channel is 165 MHz for example; in this case, the transfer rate of the data island period is approximately 500 Mbps.

FIG. 8 shows a pin arrangement of HDMI terminals 101, 201a. This pin arrangement is called a type-A pin arrangement.

Two differential lines along which TMDS Data #i+ and TMDS Data #i−, differential signals of TMDS channel #i, are transmitted are connected to pins (pin numbers 1, 4, and 7) to which TMDS Data #i+ is allocated and pins (pin numbers 3, 6, and 9) to which TMDS Data #i− is allocated.

The CEC line 84 along which a CEC signal that is data for control is transmitted is connected to a pin whose pin number is 13. A pin whose pin number is 14 is a reserved pin. A line along which an SDA (Serial Data) signal, such as E-EDID, is transmitted is connected to a pin whose pin number is 16. A line along which an SCL (Serial Clock) signal that is a clock signal for use in synchronization at the time of SDA signal transmission or reception is transmitted is connected to a pin whose pin number is 15. The above-mentioned DDC 83 is made up of the line along which a SDA signal is transmitted and the line along which an SCL signal is transmitted.

As described above, the line 86 for a source device 110 to detect the connection of a sink device 120 is connected to a pin whose pin number is 19. Further, as described above, the line 87 for supplying power is connected to a pin whose pin number is 18.

It should be noted that FIG. 5 shows an exemplary configuration of the HDMI transmission section (HDMI source) 212 of the disc recorder 210 and the HDMI reception section (HDMI sink) 252 of the television receiver 250. Although detailed explanation is omitted, the HDMI transmission section (HDMI source) 321 of the set-top box 310 is configured in the same manner as the HDMI transmission section (HDMI source) 212 of the disc recorder 210.

Figure 9:
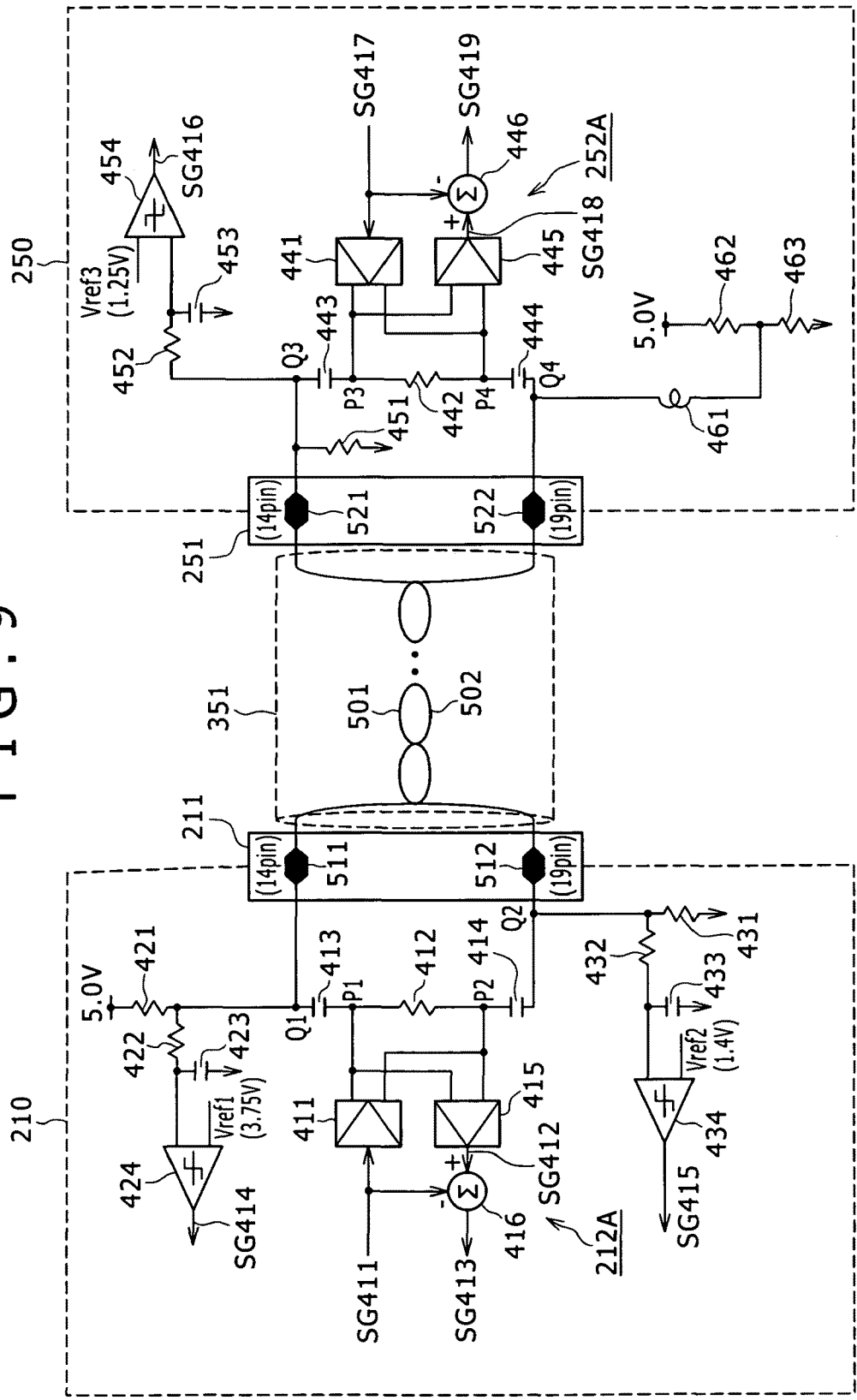
FIG. 9 is a connection diagram illustrating an exemplary configuration of a high-speed data line interface for the disc recorder and the television receiver.

FIG. 9 shows an exemplary configuration of the high-speed data line interface 212A of the disc recorder 210 and the high-speed data line interface 252A of the television receiver 250. These interfaces 212A and 252A configure a communication section that executes LAN (Local Area Network) communication. This communication section executes communication by use of one pair of differential lines of two or more lines configuring the HDMI cable 351, a reserve line (Ether− line) corresponding to a reserve (Reverse) pin (14 pin) and an HPD line (Ether+ line) corresponding to an HPD pin (19 pin) in this embodiment.

The disc recorder 210 has a LAN signal transmission circuit 411, a terminal resistor 412, AC coupling capacitors 413, 414, a LAN signal reception circuit 415, a subtraction circuit 416, a pullup resistor 421, a resistor 422 and a capacitor 423 making up a lowpass filter, a comparator 424, a pulldown resistor 431, a resistor 432 and a capacitor 433 making up a lowpass filter, and a comparator 434. The high-speed data line interface 212A is made up of the LAN signal transmission circuit 411, the terminal resistor 412, the AC coupling capacitors 413, 414, the LAN signal reception circuit 415, and the subtraction circuit 416.

A series circuit of the pullup resistor 421, the AC coupling capacitor 413, the terminal resistor 412, the AC coupling capacitor 414, and the pulldown resistor 431 is connected between a power supply line (+5.0 V) and a ground line. A connection point P1 shared by the AC coupling capacitor 413 and the terminal resistor 412 is connected to the positive output side of the LAN signal transmission circuit 411 and the positive input side of the LAN signal reception circuit 415. A connection point P2 shared by the AC coupling capacitor 414 and the terminal resistor 412 is connected to the negative output side of the LAN signal transmission circuit 411 and the negative input side of the LAN signal reception circuit 415. To the input side of the LAN signal transmission circuit 411, a transmission signal (transmission data) SG411 is supplied.

The positive terminal of the subtraction circuit 416 is supplied with output signal SG412 of the LAN signal reception circuit 415 and the negative terminal of this subtraction circuit 416 is supplied with transmission signal (transmission data) SG411. The subtraction circuit 416 subtracts the transmission signal SG411 from the output signal SG412 of the LAN signal reception circuit 415 to provide reception signal (reception data) SG413.

A connection point Q1 shared by the pullup resistor 421 and the AC coupling capacitor 413 is connected to the ground line via a series circuit of the resistor 422 and the capacitor 423. An output signal of a lowpass filter formed at the connection point between the resistor 422 and the capacitor 423 is supplied to one input terminal of the comparator 424. The comparator 424 compares the output signal of the lowpass filter with reference voltage Vref1 (+3.75 V) to be supplied to the other input terminal. Output signal SG414 of the comparator 424 is supplied to the CPU 213.

A connection point Q2 shared by the AC coupling capacitor 414 and the pulldown resistor 431 is connected to the ground line via a series circuit of the resistor 432 and the capacitor 433. An output signal of a lowpass filter formed at the connection point between the resistor 432 and the capacitor 433 is supplied to one input terminal of the comparator 434. The comparator 434 compares the output signal of the lowpass filter with reference voltage Vref2 (+1.4 V) to be supplied to the other input terminal. Output signal SG415 of the comparator 434 is supplied to the CPU 213.

The television receiver 250 has a LAN signal transmission circuit 441, a terminal resistor 442, AC coupling capacitors 443, 444, a LAN signal reception circuit 445, a subtraction circuit 446, a pulldown resistor 451, a resistor 452 and a capacitor 453 making up a lowpass filter, a comparator 454, a choke coil 461, a resistor 462, and a resistor 463. The high-speed data line interface 212A is made up of the LAN signal transmission circuit 441, the terminal resistor 442, AC coupling capacitors 443, 444, the LAN signal reception circuit 445, and the subtraction circuit 446.

A series circuit of the resistor 462 and the resistor 463 is connected between the power supply line (+5.0 V) and the ground line. A series circuit made up of the choke coil 461, the AC coupling capacitor 444, the terminal resistor 442, the AC coupling capacitor 443, and the pulldown resistor 451 is connected between the connection point of the resistor 462 and the resistor 463 and the ground line.

A connection point P3 shared by the AC coupling capacitor 443 and the terminal resistor 442 is connected to the positive output side of the LAN signal transmission circuit 441 and to the positive input side of the LAN signal reception circuit 445. A connection point P4 shared by the AC coupling capacitor 444 and the terminal resistor 442 is connected to the negative output side of the LAN signal transmission circuit 441 and to the negative input side of the LAN signal reception circuit 445. To the input side of the LAN signal transmission circuit 441, transmission signal (transmission data) SG417 is supplied.

The positive terminal of the subtraction circuit 446 is supplied with output signal SG418 of the LAN signal reception circuit 445. To the negative terminal of the subtraction circuit 446, transmission signal SG417 is supplied. The subtraction circuit 446 subtracts transmission signal SG417 from output signal SG418 of the LAN signal reception circuit 445 to provide reception signal (reception data) SG419.

Connection point Q3 shared by the pulldown resistor 451 and the AC coupling capacitor 443 is connected to the ground line via a series circuit of the resistor 452 and the capacitor 453. An output signal of a lowpass filter obtained at the connection point between the resistor 452 and the capacitor 453 is connected to one input terminal of the comparator 454.

The comparator 454 compares the output signal of the lowpass filter with reference voltage Vref3 (+1.25 V) to be supplied to the other input terminal. Output signal SG416 of this comparator 454 is supplied to the CPU 271.

A reserved line 501 and an HPD line 502 contained in the HDMI cable 351 form a differential twisted pair. A source-side terminal 511 of the reserved line 501 is connected to 14-pin of the HDMI terminal 211 and a sink-side terminal of the reserved line 501 is connected to 14-pin of the HDMI terminal 251. A source-side terminal 512 of the HPD line 502 is connected to 19-pin of the HDMI terminal 211 and a sink-side terminal 522 of the HPD line 502 is connected to 19-pin of the HDMI terminal 251.

In the disc recorder 210, the above-mentioned connection point Q1 between the pullup resistor 421 and the AC coupling capacitor 413 is connected to 14-pin of the HDMI terminal 211 and the above-mentioned connection point Q2 between the pulldown resistor 431 and the AC coupling capacitor 414 is connected to 19-pin of the HDMI terminal 211. On the other hand, in the television receiver 250, the above-mentioned connection point Q3 between the pulldown resistor 451 and the AC coupling capacitor 443 is connected to 14-pin of the HDMI terminal 251 and the above-mentioned connection point Q4 between the choke coil 461 and the AC coupling capacitor 444 is connected to 19-pin of the HDMI terminal 251.

The following describes an operation of LAN communication based on the high-speed data line interfaces 212A, 252A configured as described above.

In the disc recorder 210, transmission signal (transmission data) SG411 output from the CPU 213 is supplied to the input side of the LAN signal transmission circuit 411. From this LAN signal transmission circuit 411, differential signals (a positive output signal and a negative output signal) corresponding to transmission signal SG411 are outputted. The differential signals outputted from the LAN signal transmission circuit 411 are supplied to connection points P1 and P2 to be transmitted to the television receiver 250 via the pair of lines (the reserved line 501, the HPD line 502) of the HDMI cable 351.

In the television receiver 250, transmission signal (transmission data) SG417 output from the CPU 271 is supplied to the input side of the LAN signal transmission circuit 441 and differential signals (a positive output signal and a negative output signal) corresponding to transmission signal SG417 is outputted from the LAN signal transmission circuit 441. The differential signals outputted from the LAN signal transmission circuit 441 are supplied to connection points P3 and P4 to be transmitted to the disc recorder 210 via the pair of lines (the reserved line 501 and the HPD line 502) of the HDMI cable 351.

In the disc recorder 210, the input side of the LAN signal reception circuit 415 is connected to the connection points P1 and P2, so that a signal obtained by adding a transmission signal corresponding to the differential signal (a current signal) outputted from the LAN signal transmission circuit 411 to a reception signal corresponding to the differential signal transmitted from the television receiver 250 as described above is obtained as output signal SG412 of the LAN signal reception circuit 415. The subtraction circuit 416 subtracts transmission signal SG411 from output signal SG412 of the LAN signal reception circuit 415. Hence, output signal SG413 of the subtraction circuit 416 corresponds to transmission signal (transmission data) SG417 of the television receiver 250.

In the television receiver 250, the input side of the LAN signal reception circuit 445 is connected to connection points P3 and P4, so that a signal obtained by adding a transmission signal corresponding to the differential signal (a current signal) outputted from the LAN signal transmission circuit 441 to a reception signal corresponding to the differential signal transmitted from the disc recorder 210 as described above is obtained as output signal SG418 of the LAN signal reception circuit 445. The subtraction circuit 446 subtracts transmission signal SG417 from output signal SG418 of the LAN signal reception circuit 445. Hence, output signal SG419 of the subtraction circuit 446 corresponds to transmission signal (transmission data) SG411 of the disc recorder 210.

Thus, between the high-speed data line interface 212A of the disc recorder 210 and the high-speed data line interface 252A of the television receiver 250, bidirectional LAN communication can be executed.

According to the configuration shown in FIG. 9, in an interface where the data transmission of video and audio, the exchange and authentication of connected device information, the communication of device control data, and LAN communication are executed by one HDMI cable 351, LAN communication is executed in bidirectional communication via one pair of differential transmission paths and the connection state of the interface is notified by at least one of DC bias potentials of the pair of transmission paths, so that the spatial separation in which an SCL line and an SDA line are not physically used for LAN communication becomes practicable. As a result, a circuit for LAN communication regardless of the electrical specifications specified for DDC by that division can be formed, thereby realizing secure and low-cost LAN communication.

It should be noted that, in FIG. 9, the HPD line 502 notifies the disc recorder 210 of the connection of the HDMI cable 351 with the television receiver 250 on a DC bias level, in addition to the above-mentioned LAN communication. Namely, when the HDMI cable 351 is connected to the television receiver 250, the resistors 462 and 463 and the choke coil 461 within the television receiver 250 bias the HPD line 502 to approximately 4 V via 19-pin of the HDMI terminal 251. The disc recorder 210 detects the DC bias of the HPD line 502 through a lowpass filter made up of the resistor 432 and the capacitor 433, which is compared with reference voltage Vref2 (1.4 V for example) through the comparator 434.

If the HDMI cable 351 is not connected to the television receiver 250, a voltage on 19-pin of the HDMI terminal 211 is lower than reference voltage Vref2 because of the existence of the pulldown resistor 431. Conversely, if the HDMI cable 351 is connected to the television receiver 250, the voltage is higher than reference voltage Vref2. Therefore, if the HDMI cable 351 is connected to the television receiver 250, output signal SG415 of the comparator 434 is at the high level; otherwise, output signal SG415 is at the low level. Consequently, the CPU 213 of the disc recorder 210 can recognize whether the HDMI cable 351 is in connection with the television receiver 250 on the basis of output signal SG415 of the comparator 434.

Referring to FIG. 9, the present embodiment also has capabilities by which the devices connected on both ends of the HDMI cable 351 can mutually recognize whether each is LAN-communication enabled (hereafter referred to as "e-HDMI compliant device") or LAN-communication disabled (hereafter referred to as "e-HDMI noncompliant device"), at a DC bias potential of the reserved line 501.

As described above, the disc recorder 210 pulls up (+5 V) the reserved line 501 by the resistor 421 and the television receiver 250 pulls down the reserved line 501 by the resistor 451. None of the resistors 421, 451 is arranged in e-HDMI noncompliant devices.

As described above, the disc recorder 210 causes the comparator 424 to compare the DC potential of the reserved line 501 that has passed the lowpass filter composed of the resistor 422 and the capacitor 423 with reference voltage Vref1. If the television receiver 250 is an e-HDMI compliant device and has the pulldown resistor 451, then the voltage of the reserved line 501 is 2.5 V. However, if the television receiver 250 is an e-HDMI non-compliant device and has not pulldown resistor 451, the voltage of the reserved line 501 is 5 V due to the presence of the pullup resistor 421.

Hence, if reference voltage Vref1 is 3.75 V for example, output signal SG414 of the comparator 424 goes low when the television receiver 250 is an e-HDMI compliant device; otherwise, output signal SG414 goes high. Consequently, the CPU 213 of the disc recorder 210 can recognize, on the basis of output signal SG414 of the comparator 424, whether the television receiver 250 is an e-HDMI compliant device or not.

Likewise, as described above, the television receiver 250 causes the comparator 454 to compare the DC potential of the reserved line 501 that has passed the lowpass filter composed of the resistor 452 and the capacitor 453 with reference voltage Vref3. If the disc recorder 210 is an e-HDMI compliant device and has the pullup resistor 421, then the voltage of the reserved line 501 is 2.5 V. However, if the disc recorder 210 is an e-HDMI non-compliant device and has not pullup resistor 421, the voltage of the reserved line 501 is 0 V due to the presence of the pulldown resistor 451.

Hence, if reference voltage Vref3 is 1.25 V for example, output signal SG416 of the comparator 454 goes high when the disc recorder 210 is an e-HDMI compliant device; otherwise, output signal SG416 goes low. Consequently, the CPU 271 of the television receiver 250 can recognize, on the basis of output signal SG416 of the comparator 454, whether disc recorder 210 is an e-HDMI compliant device or not.

It should be noted that FIG. 9 shows an exemplary configuration of the high-speed data line interface 212A of the disc recorder 210 and the high-speed data line interface 252A of the television receiver 250. The high-speed data line interface 312A of the set-top box 310 is configured in the same manner while the detailed description thereof is omitted.

In the AV system 200 shown in FIG. 1, the television receivers 250 (250A through 250C) automatically execute the connection setting of DLNA with the disc recorders 210 (210A and 210B) and the set-top box 210A connected via the HDMI cable 351.

Figure 10:
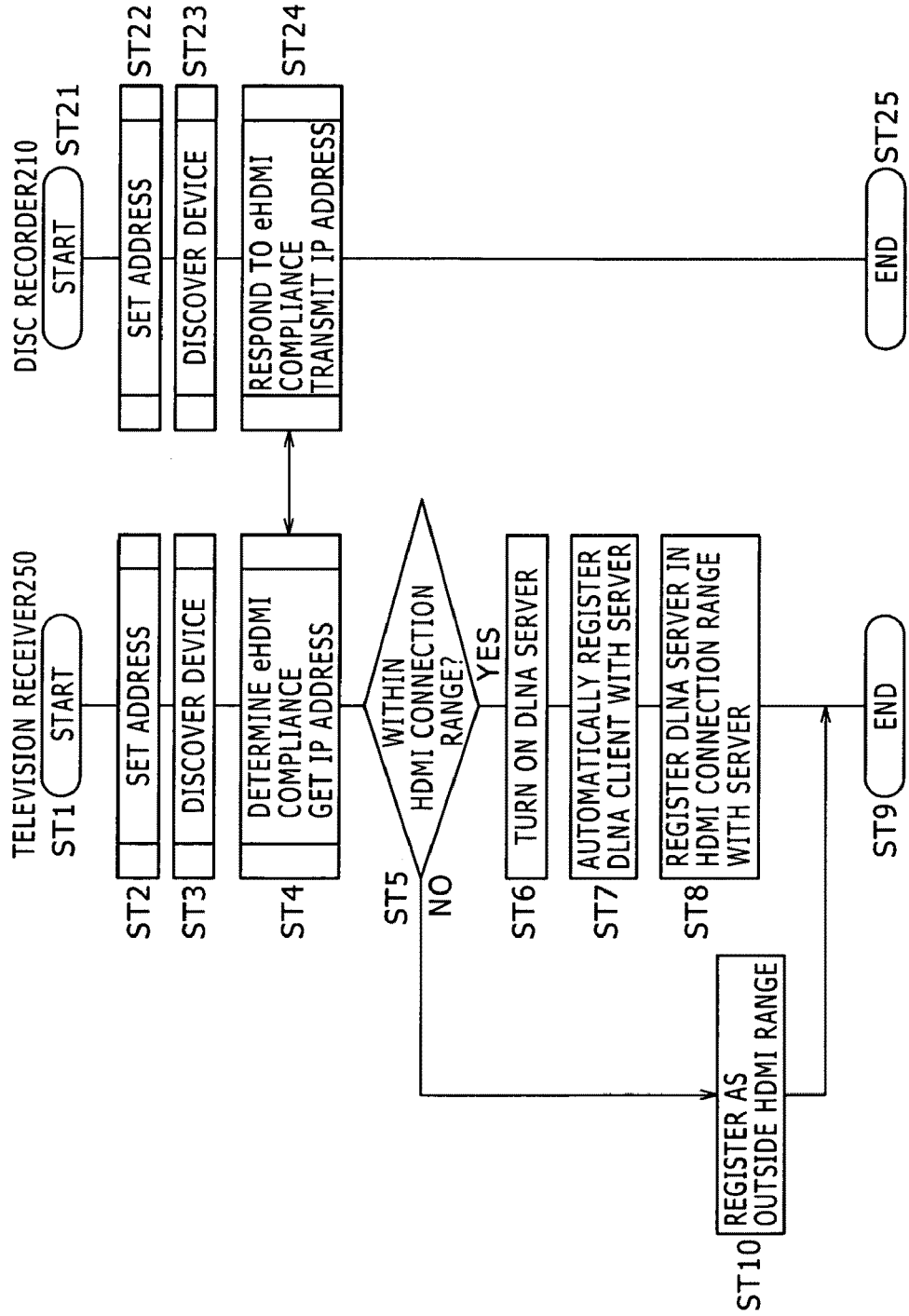
FIG. 10 is a diagram indicative of a processing flow of a television receiver and a disc recorder.

FIG. 10 shows a processing flow of the television receiver 250 and the disc recorder 210.

In step S1, the television receiver 250 starts processing and executes address setting in step S2. In the address setting, a fixed IP address may be manually allocated or, because the television is a DLNA-compliant device, addresses may be allocated by Auto IP or DHCP client. And, in step ST3, the television receiver 250 discovers a DLNA-compliant device connected to the network by the device discovery of UPnP (Universal Plug and Play), for example. It should be noted that UPnP is a protocol for realizing the linking between the devices on the TCP/IP network. In this UPnP, SSDP (Simple Service Discovery Protocol) is used for a device discovery technique.

Likewise, in step ST21, the disc recorder 210 starts processing and, in step ST22, executes address setting, then, in step ST23, discovers a device.

Next, in step ST4, the television receiver 250 determines whether the device discovered in step ST2 is a device directly connected by HDMI. If the device is found directly connected to HDMI, then, in step ST4, the television receiver 250 obtains the IP address of the connected device every time HDMI is entered and holds the obtained IP address. It should be noted that, for the processing of step ST4 by the television receiver 250, the disc recorder 210 enquires, in step ST24, for eHDMI compliance and transmits the IP address. Then, the disc recorder 210 ends the processing in step ST25.

Figures 11, 12:
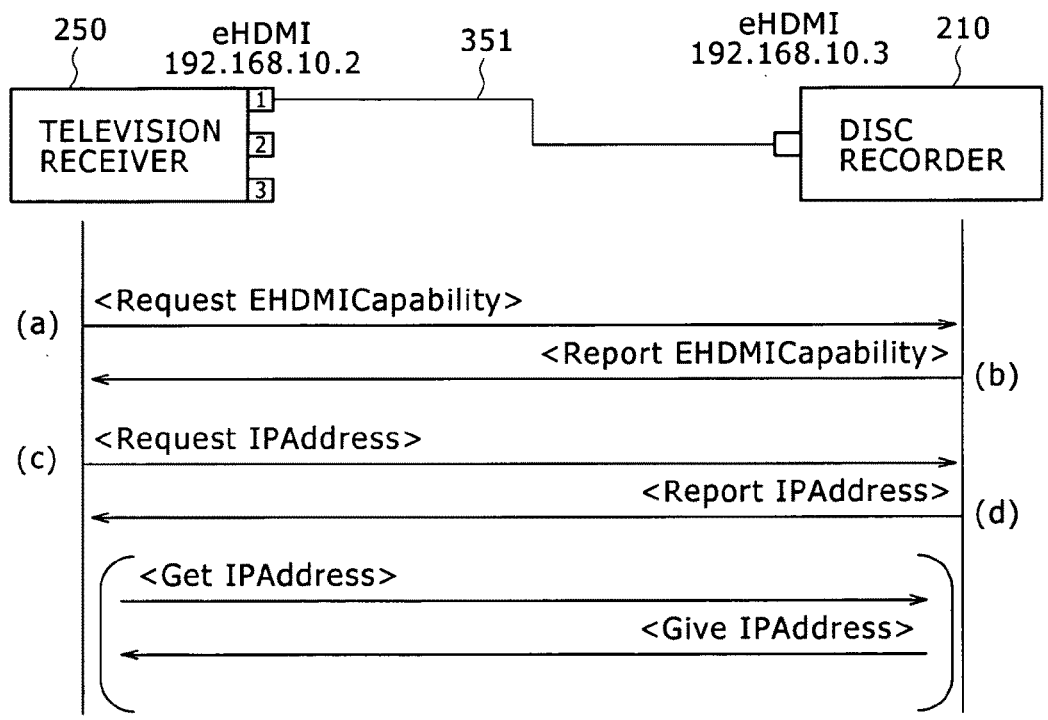
FIG. 11 is a diagram for describing a decision sequence of IP addresses.
FIG. 12 is a diagram indicative of a list of CEC extension codes for use in the decision of IP addresses.

FIG. 11 shows a processing sequence of step ST4 of the television receiver 250 and step ST24 of the disc recorder 210. It should be noted that FIG. 11 shows an example in which the disc recorder 210 is connected to the first HDMI terminal of the television receiver 250 via the HDMI cable 351.

(a) First, the television receiver 250 enquires the disc recorder 210 for eHDMI compliance by <Request EHDMI Capability> command by use of a CEC line. (b) In response, the disc recorder 210 makes a response of eHDMI compliance (true) or eHDMI non-compliance (false) to the television receiver 250 by <Report EHDMI Capability> response command by use of the CEC line.

Then, if the disc recorder 210 is eHDMI-compliant (true), (c) the television receiver 250 requests the disc recorder 210 for the IP address by <Request IP Address> (or <Get IP Address>) command by use of the CEC line. (d) In response, the disc recorder 210 transmits the IP address by <Request IP Address> (or <Give IP Address>) command by use of the CEC line.

FIG. 12 shows a list of CEC extended codes for use in the above-described processing. Conventionally, the television receiver 250 holds a CEC physical address corresponding to each HDMI terminal as shown in the table of FIG. 13(a); in the present embodiment, the television receiver 250 holds and manages the CEC physical address and the IP address in correspondence to each HDMI terminal as shown in the table of FIG. 13(b). Thus, the television receiver 250 obtains the IP address and manages the same because, when content of DLNA is specified by the user, for example, the television receiver 250 determines whether that content is content held by a device (DLNA server) directly connected by HDMI.

Now, referring to FIG. 10 again, in step ST5, the television receiver 250 branches the operation on the basis of a result of the enquiry for eHDMI compliance made in step ST4. Namely, for a device not directly connected by HDMI, the television receiver 250 registers as out of HDMI range in step ST10, and then ends the processing in step ST9.

On the other hand, for a device directly connected by HDMI, the television receiver 250 goes to step ST6. In this step ST6, the television receiver 250 turns on the DLNA server function of the device (the disc recorder 210, set-top box 310A) directly connected by HDMI. Then, in step ST7, the television receiver 250 registers itself with the device (DLNA server) directly connected by HDMI as a device of DLNA client. In this case, because the device is directly connected by HDMI, the television receiver 250 recognizes the device to be safe and makes registration without authentication. Further, in step ST8, the television receiver 250 registers the device directly connected by the HDMI with the DLNA client (the television receiver 250 itself) as a DLNA server, and then ends the processing in step ST9.

It should be noted that, although not shown in FIG. 10, the television receiver 250 may present each state of the connection setting to the user by a user interface screen, thereby letting the user check the state.

Figure 14:
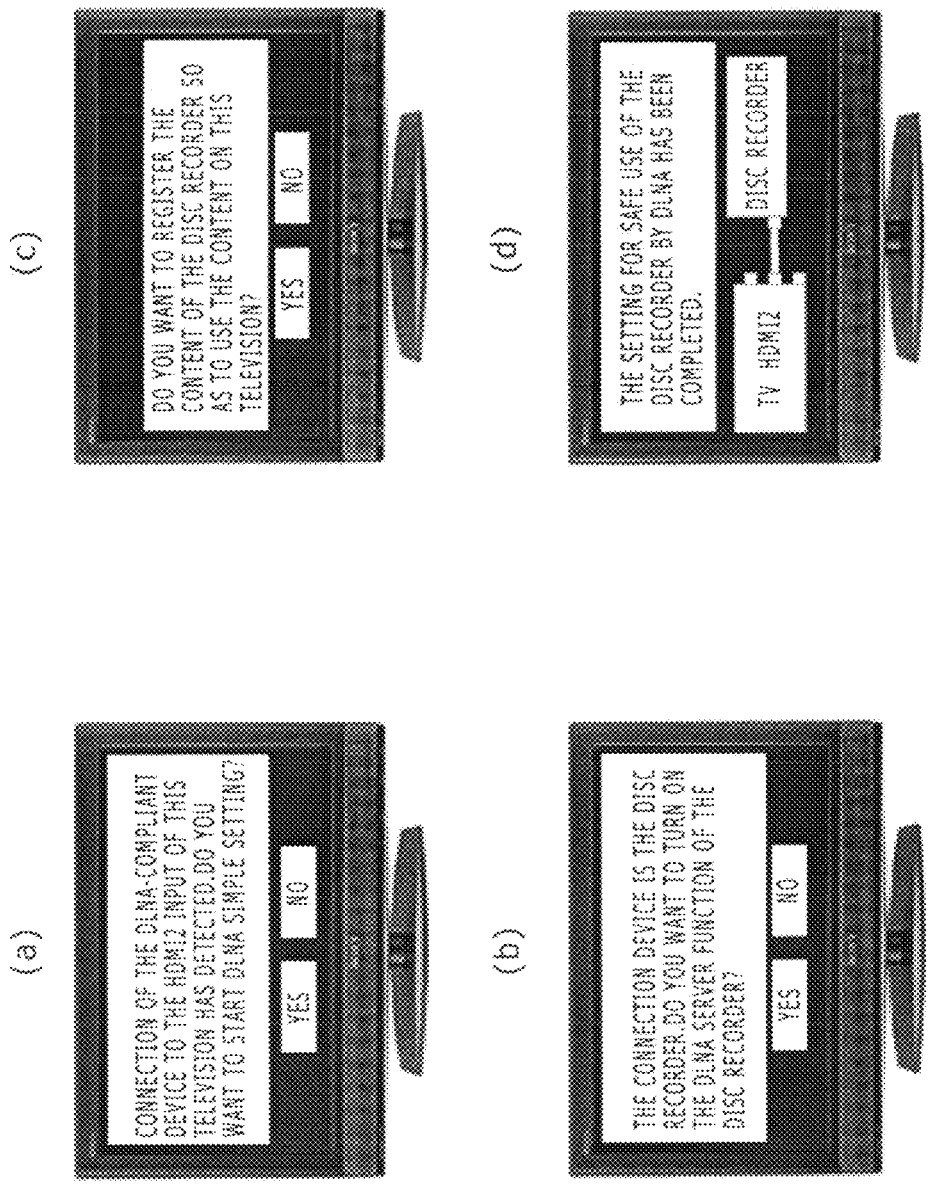
FIG. 14 is a diagram indicative of an example of a user interface screen (simple setting).

FIG. 14 shows one example of a user interface screen. FIG. 14(a) shows an example of a user interface screen that is displayed if a device directly connected by HDMI has been discovered, which is displayed after step ST4 shown in FIG. 10 for example. On the basis of this screen, if the user selects "YES," the procedure moves to the processing of the connection setting of DLNA.

FIG. 14(b) shows an example of a user interface screen for letting the user make sure of turning on the server function of the device directly connected by HDMI, the screen being displayed in correspondence with step S6 shown in FIG. 10. If the user selects "YES" on the basis of this screen, the television receiver 250 executes the processing of turning on the server function.

FIG. 14(c) shows an example of a user interface screen for letting the user make sure of the registration of the server client, the screen being displayed in correspondence with step S7 shown in FIG. 10. If the user selects "YES" on the basis of this screen, the client registration processing is executed. FIG. 14(d) shows an example of a user interface screen indicative of a message of setting end, the screen being displayed after the processing of step S8 shown in FIG. 10.

Thus, by presenting user interface screens to the user, the user can easily complete the connection setting by only confirming television screens.

As described above, in the AV system 200 shown in FIG. 1, the television receivers 250 (250A through 250C) are configured to automatically execute connection setting of DLNA with the disc recorders 210 (210A, 210B) connected via the HDMI cable 351 and the set-top box 210A. Therefore, the user need not execute connection setting of DLNA in configuring the AV system, thereby enhancing the ease of use of the AV system 200.

It should be noted that in the above-mentioned embodiment, the television receiver 250 is one that automatically executes the connection setting of DLNA with the disc recorder 210 and so on directly connected by HDMI. Likewise, on the basis of the information (refer to step S4 shown in FIG. 10) indicative if the device is a DLNA-compliant device directly connected by HDMI, it is possible for the television receiver 250, if an access request comes from a DLNA-compliant device not directly connected by HDMI to the disc recorder 210 and so on directly connected by HDMI, to automatically set the permission of this access request.

In this case, the television receiver 250 may automatically execute the setting so as to permit access not only for a device requested for access but also for all devices directly connected by HDMI to the television receiver 250.

Also, in this case, the television receiver 250 may be configured so as to present each state of permission setting to the user by user interface screen, thereby letting the user make confirmation.

Figure 15:
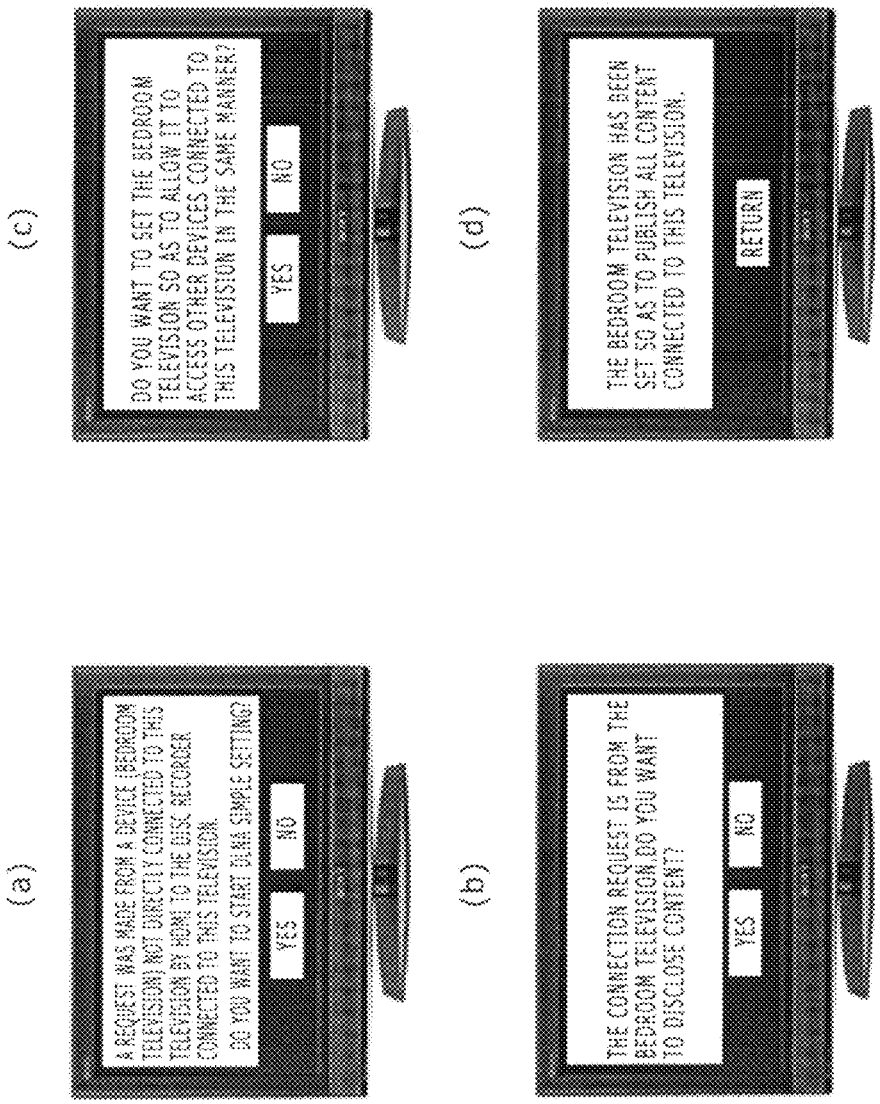
FIG. 15 is a diagram indicative of an example of a user interface screen (access permission setting).

FIG. 15 shows an example of a user interface screen. FIG. 15(a) shows an example of a user interface screen that is displayed when an access request comes from a DLNA-compliant device not directly connected by HDMI. If the user selects "YES" on the basis of this screen, the procedure goes to the processing of access permission setting.

FIG. 15(b) shows an example of a user interface screen for letting the user make sure of content publishing. FIG. 15(c) shows a user interface screen for letting the user make sure of the server registration of a device HDMI-connected to the television receiver 250 in addition to an access requested device. FIG. 15(d) is an example of user interface screen indicative of a message of setting end.

Thus, presenting user interface screens to the user allows the user to easily complete access permission setting only by confirming television screens.

It should be noted that, in the above-mentioned embodiment, the communication section for executing bidirectional communication is configured by use of the reserve line (Ether− line) and the HPD line (Ether+ line) of the HDMI cable 351; however, the configuration of the communication section for executing bidirectional communication is not limited thereto. The following describes other exemplary configurations. In the following examples, the description will be made with the disc recorder 210 being the source device and the television receiver 250 being the sink device.

Figure 16:
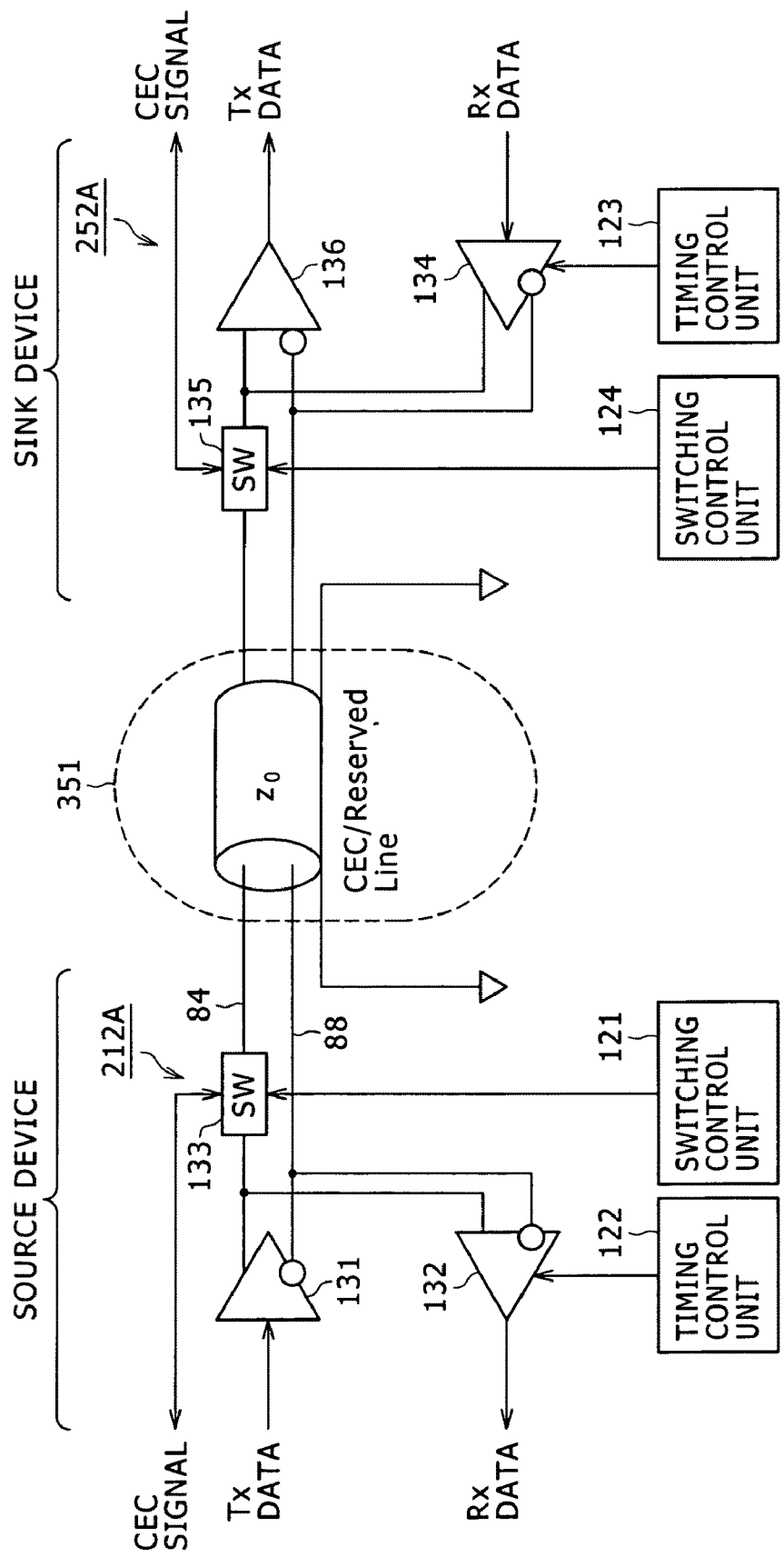
FIG. 16 is a connection diagram illustrating another exemplary configuration of a high-speed data line interface of the disc recorder and the television receiver.

FIG. 16 shows an example in which IP communication is executed in a half-duplex communication manner by use of the CEC line 84 and the reserved line 88. With reference to FIG. 16, components similar to those previously described with FIG. 5 are denoted by the same reference numerals and the description thereof will be omitted as appropriate.

A high-speed data line interface 212A that is a source device has a conversion unit 131, a decoding unit 132, a switch 133, a switching control unit 121, and a timing control unit 122. The conversion unit 131 is supplied with Tx data that is data transmitted from the source device to the sink device by bidirectional IP communication between the source device and the sink device.

The conversion unit 131, made up of a differential amplifier for example, converts the supplied Tx data into a differential signal composed of two part signals. Also, the conversion unit 131 transmits a differential signal obtained by the conversion to the sink device via the CEC line 84 and the reserved line 88. Namely, the conversion unit 131 supplies one of the part signals making up the differential signal obtained by the conversion to the switch 133 via the CEC line 84, to be more specific, a signal line arranged on the source device and connected to the CEC line 84 of a HDMI cable 351, and the other part signal making up the differential signal to the sink device via the reserved line 88, to be more specific, a signal line arranged on the source device and connected to the reserved line 88 of the HDMI cable 351.

The decoding unit 132, made up of a differential amplifier for example, is connected at an input terminal thereof to the CEC line 84 and the reserved line 88. Under the control of the timing control unit 122, the decoding unit 132 receives a differential signal transmitted from the sink device via the CEC line 84 and the reserved line 88, namely, a differential signal made up of a part signal on the CEC line 84 and a part signal on the reserved line 88, decodes the received differential signal into Rx data that is the original data, and outputs the decoded signal. The Rx data denotes data that is transmitted from the sink device to the source device by the bidirectional IP communication therebetween.

At the time of data transmission, the switch 133 is supplied with a CEC signal from a control section (CPU) of the source device or a part signal making up a differential signal corresponding to Tx data transmitted from the conversion unit 131; at the time of data reception, the switch 133 is supplied with a CEC signal from the sink device or a part signal making up a differential signal corresponding to Rx data from the sink device. Under the control of the switching control unit 121, the switch 133 selects a CEC signal from the control section (CPU), a CEC signal from the sink device, a part signal making up a differential signal corresponding to Tx data, or a part signal making up a differential signal corresponding to Rx data and outputs the selected signal.

Namely, when the source device transmits data to the sink device, the switch 133 selects a CEC signal transmitted from the control section (CPU) or one of the part signals supplied from the conversion unit 131 and transmits the selected CEC signal or part signal to the sink device via the CEC line 84.

Also, when the source device receives data transmitted from the sink device, the switch 133 receives a CEC signal transmitted from the sink device via the CEC line 84 or a part signal of a differential signal corresponding to Rx data and supplies the received CEC signal or part signal to the control section (CPU) or the decoding unit 132.

The switching control unit 121 controls the switch 133 to select one of signals that are supplied to the switch 133. The timing control unit 122 controls the timing of receiving a differential signal by the decoding unit 132.

The high-speed data line interface 252A has a conversion unit 134, a decoding unit 136, a switch 135, a switching control unit 124, and a timing control unit 123. the conversion unit 134, made up of a differential amplifier for example, is supplied with Rx data. Under the control of the timing control unit 123, the conversion unit 134 converts the supplied Rx data into a differential signal made up of two part signals and transmits the differential signal obtained by the conversion to the source device via the CEC line 84 and the reserved line 88.

Namely, the conversion unit 134 supplies one of the part signals making up a differential signal obtained by the conversion to the switch 135 via the CEC line 84, to be more specific, a signal line arranged on the sink device and connected to the CEC line 84 of the HDMI cable 351 and the other part signal making up the differential signal to the source device via the reserved line 88, to be more specific a signal line arranged on the sink device and connected to the reserved line 88 of the HDMI cable 351 and the reserved line 88.

At the time of receiving data, the switch 135 is supplied with a CEC signal from the source device or a part signal making up a differential signal corresponding to Tx data from the source device; at the time of transmitting data, the switch 135 is supplied with a part signal making up a differential signal corresponding to Rx data from the conversion unit 134 or a CEC signal from the control section (CPU) of the sink device. Under the control of the switching control unit 124, the switch 135 selects a CEC signal from the source device, a CEC signal from the control section (CPU), a part signal making up a differential signal corresponding to Tx data, or a part signal making up a differential signal corresponding to Rx data and outputs the selected signal.

Namely, when the sink device transmits data to the source device, the switch 135 selects a CEC signal supplied from the control section (CPU) of the sink device or one of the part signals supplied from the conversion unit 134 and transmits the selected CEC signal or part signal to the source device via the CEC line 84.

Also, when the sink device receives data from the source device, the switch 135 receives a CEC signal transmitted from the source device via the CEC line 84 or a part signal of a differential signal corresponding to Tx data and supplies the received CEC signal or part signal to the control section (CPU) or the decoding unit 136.

The decoding unit 136, made up of a differential amplifier for example, is connected at an input terminal thereof to the CEC line 84 and the reserved line 88. The decoding unit 136 receives a differential signal transmitted from the source device via the CEC line 84 and the reserved line 88, namely, a differential signal on the CEC line 84 and a part signal on the reserved line 88, decodes the received differential signal into Tx data that is the original data, and outputs the decoded signal.

The switching control unit 124 controls the switch 135 to select one of signals that are supplied to the switch 135. The timing control unit 123 controls the timing of transmitting a differential signal by the conversion unit 134.

Figure 17:
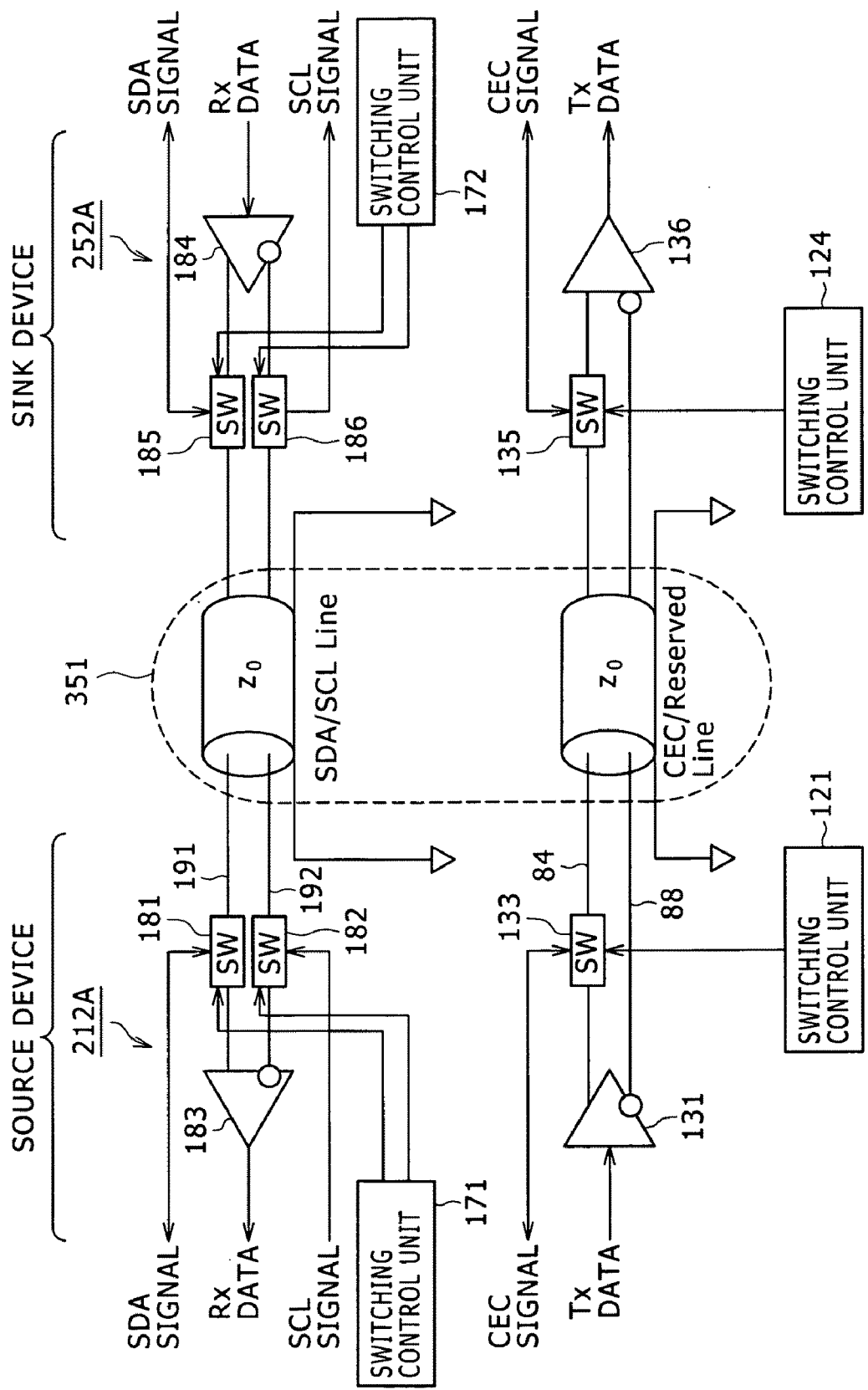
FIG. 17 is a connection diagram illustrating still another exemplary configuration of a high-speed data line interface of the disc recorder and the television receiver.

FIG. 17 shows an example in which IP communication based on full-duplex communication is executed by use of the CEC line 84 and the reserved line 88, and a signal line (an SDA line) along which an SDA signal is transmitted and a signal line (an SCL line) along which an SCL signal is transmitted. It should be noted that, with reference to FIG. 17, components similar to those previously described with reference to FIG. 16 are denoted by the same reference numerals and the description thereof will be omitted appropriately.

A high-speed data line interface 212A of a source device has a conversion unit 131, a switch 133, a switch 181, a switch 182, a decoding unit 183, a switching control unit 121, and a switching control unit 171.

At the time of transmitting data, the switch 181 is supplied with an SDA signal from a control section (CPU) of a source device; at the time of receiving data, the switch 181 is supplied with an SDA signal from a sink device or a part signal making up a differential signal corresponding to Rx data from the sink device. Under the control of the switching control unit 171, the switch 181 selects an SDA signal from the control section (CPU), an SDA signal from the sink device, or a part signal making up a differential signal corresponding to Rx data and outputs the selected signal.

Namely, when the source device receives data transmitted from the sink device, the switch 181 receives an SDA signal transmitted from the sink device via an SDA line 191 that is a signal line along which an SDA signal is transmitted or a part signal of a differential signal corresponding to Rx data and supplies the received SDA signal or part signal to the control section (CPU) or the decoding unit 183.

When the source device transmits data to the sink device, the switch 181 transmits an SDA signal supplied from the control section (CPU) to the sink device via the SDA line 191 or nothing to the sink device.

At the time of transmitting data, the switch 182 is supplied with an SCL signal from the control section (CPU) of the source device; at the time of receiving data, the switch 181 is supplied with a part signal making up a differential signal corresponding to Rx data from the sink device. Under the control of the switching control unit 171, the switch 182 selects the SCL signal or the part signal making up the differential signal corresponding to Rx data and outputs the selected signal.

Namely, when the source device receives data from the sink device, the switch 182 receives the part signal of the differential signal corresponding to Rx data transmitted from the sink device via an SCL line 192 that is the signal line along which an SCL signal is transmitted and supplies the received part signal or nothing to the decoding unit 183.

When the source device transmits data to the sink device, the switch 182 transmits an SCL signal supplied from the control section (CPU) of the source device to the sink device via the SCL line 192 or nothing to the sink device.

The decoding unit 183, made up of a differential amplifier for example, is connected at an input terminal thereof to the SDA line 191 and the SCL line 192. The decoding unit 183 receives a differential signal transmitted from the sink device via the SDA line 191 and the SCL line 192, namely, a differential signal made up of a part signal on the SDA line 191 and a part signal on the SCL line 192, decodes the received differential signal into Rx data that is the original data, and outputs the decoded signal.

The switching control unit 171 controls the switch 181 and the switch 182 such that one of the signals to be supplied is selected for each switch.

The high-speed data line interface 252A making up the sink device has a conversion unit 184, a switch 135, a switch 185, a switch 186, a decoding unit 136, a switching control unit 172, and a switching control unit 124.

The conversion unit 184, made up of a differential amplifier for example, is supplied with Rx data. The conversion unit 184 converts the supplied Rx data into a differential signal made up of two part signals and transmits the differential signal obtained by the conversion to the source device via the SDA line 191 and the SCL line 192. Namely, the conversion unit 184 transmits one part signal making up the differential signal obtained by the conversion to the source device via the switch 185 and the other part signal making up the differential signal to the source device via the switch 186.

At the time of transmitting data, the switch 185 is supplied with a part signal making up a differential signal corresponding to Rx data from the conversion unit 184 or an SDA signal from the control section (CPU) of the sink device; at the time of receiving data, the switch 185 is supplied with an SDA signal from the source device. Under the control of the switching control unit 172, the switch 185 selects an SDA signal from the control section (CPU), an SDA signal from the source device, or a part signal making up a differential signal corresponding to Rx data and outputs the selected signal.

Namely, when the data is received by the sink device from the source device, the switch 185 receives the SDA signal transmitted from the source device via the SDA line 191 and supplies the received SDA signal to the control section (CPU) or receives nothing.

Also, when the sink device transmits data to the source device, the switch 185 transmits an SDA signal supplied from the control section (CPU) or a part signal supplied from the conversion unit 184 to the source device via the SDA line 191.

At the time of transmitting data, the switch 186 is supplied with a part signal making up a differential signal corresponding to Rx data from the conversion unit 184; when data is received, the switch 186 is supplied with an SCL signal from the source device. Under the control of the switching control unit 172, the switch 186 selects the part signal making up the differential signal corresponding to Rx data or the SCL signal and outputs the selected signal.

Namely, when data is received by the sink device from the source device, the switch 186 receives an SCL signal transmitted from the source device via the SCL line 192 and supplies the received SCL signal to the control section (CPU) or receives nothing.

Also, when data is transmitted by the sink device to the source device, the switch 186 transmits a part signal supplied from the conversion unit 184 to the source device via the SCL line 192 or transmits nothing.

The switching control unit 172 controls switching the switch 185 and the switch 186 such that one of the supplied signals is selected for each switch.

It should be noted that, when IP communication is executed between the source device and the sink device, the availability of half-duplex communication or full-duplex communication is determined by the configurations of the source device and the sink device. Therefore, the source device references E-EDID received from the sink device to determine whether to execute half-duplex communication, full-duplex communication, or bidirectional communication based on CEC signal transfer.

Figure 18:
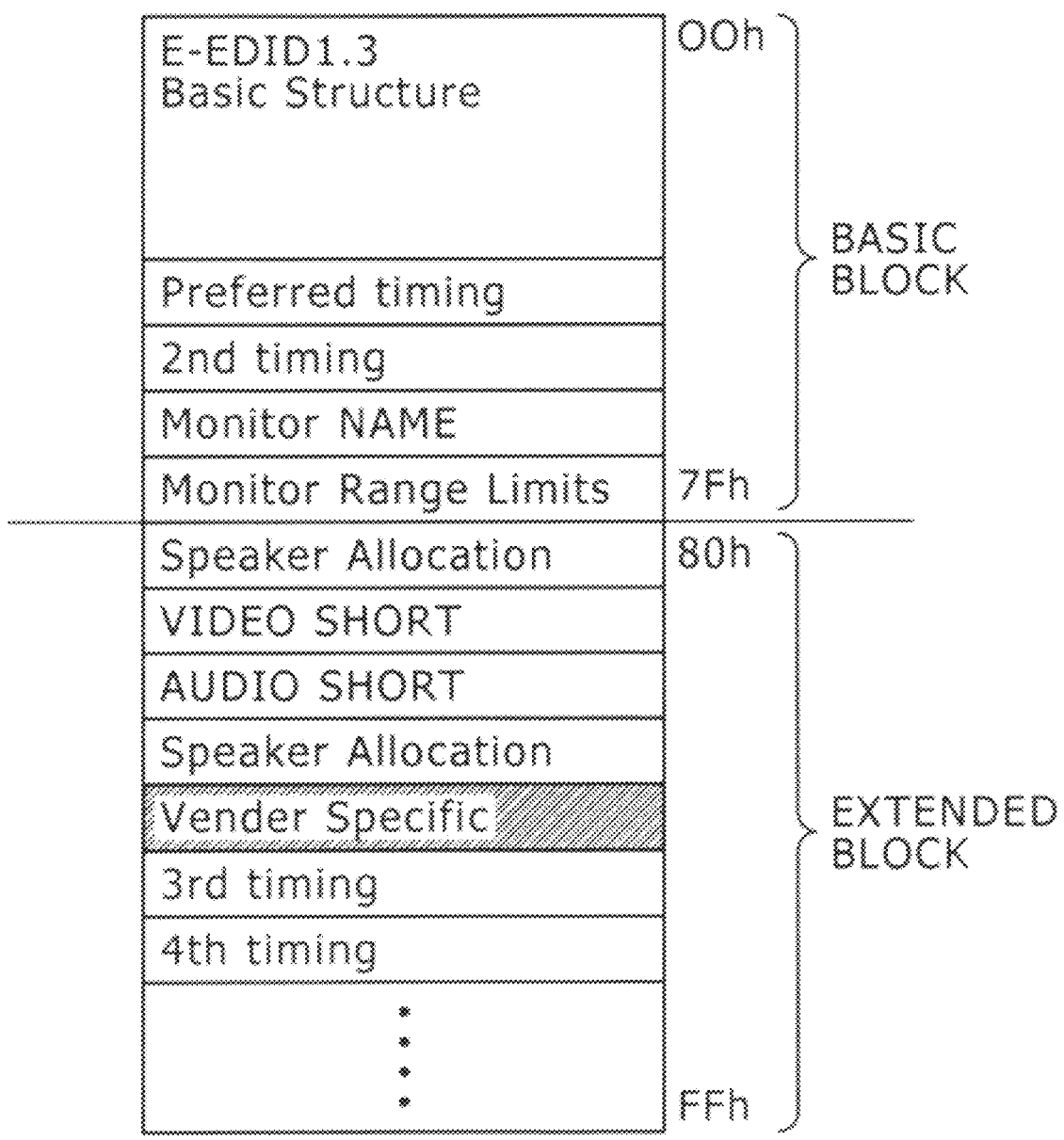
FIG. 18 is a schematic diagram illustrating a structure of E-EDID to be received by the source device.

The E-EDID that is received by the source device is made up of a basic block and an extended block as shown in FIG. 18, for example.

The basic block of E-EDID starts with data defined by the E-EDID 1.3 standard represented by "E-EDID1.3 Basic Structure" followed by timing information for maintaining compatibility with the EDID of the past represented by "Preferred timing" and timing information, different from "Preferred timing," for maintaining compatibility with the EDID of the past represented by "2nd timing."

In the basic block, "2nd timing" is followed by information indicative of the name of a display apparatus represented by "Monitor NAME" and information indicative of the number of displayable pixels represented by "Monitor Range Limits" when aspect ratios are 4:3 and 16:9, in this order.

The extended block starts with information associated with right and left loudspeakers represented by "Speaker Allocation," followed by information indicative of displayable image size, frame rate, and interlaced/progressive, represented by "VIDEO SHORT," data written with information such as aspect ratio, data written with information such as reproducible audio codec, sampling frequency, cutoff frequency, and codec bit count, represented by "AUDIO SHORT," and information associated with right and left loudspeakers represented by "Speaker Allocation," in this order.

Also, in the extended block, "Speaker Allocation" is followed by data uniquely defined for each maker represented by "Vender Specific," timing information for maintaining compatibility with the EDID of the past represented by "3rd timing," and timing information for maintaining compatibility with the EDID of the past represented by "4th timing."

Further, data represented by "Vender Specific" has a data structure shown in FIG. 19. Namely, the data represented by "Vender Specific" has block 0 through block N, each being one byte long.

Block 0 arranged at the beginning of data represented by "Vender Specific" includes a header indicative of a data area of data "Vender Specific" represented by "Vender-Specific tag code (=3)" and information indicative of a length of data "Vender Specific" represented by "Length (=N)."

Also, block 1 through block 3 have information indicative of number "0x000003" registered for HDMI(R) represented by "24 bit IEEE Registration Identifier (0x000003) LSB first." In addition, block 4 and block 5 have information indicative of the physical address of the sink device of 24 bits represented by "A," "B," "C," and "D," respectively.

Block 6 has a flag indicative of a function corresponding to the sink device represented by "Supports-AI," information for specifying the number of bits per pixel represented by "DC-48 bit," "DC-36 bit," and "DC-30 bit," a flag indicative of the compatibility of the sink device with the transmission of an image of YCbCr4:4:4 represented by "DC-Y444," and a flag indicative of the compatibility of the sink device with dual DVI (Digital Visual Interface) represented by "DVI-Dual."

Block 7 has information indicative of a maximum frequency of TMDS pixel clock represented by "Max-TMDS-Clock." Block 8 has a flag indicative of presence or absence of video and audio latency information represented by "Latency," a full-duplex flag indicative of the availability of full-duplex communication represented by "Full Duplex," and a half-duplex flag indicative of the availability of half-duplex communication represented by "Half Duplex."

For example, if the full-duplex flag is set (set to "1" for example), it is indicative that the sink device has a function of executing full-duplex communication, namely, the sink device has the configuration shown in FIG. 17; if the full-duplex flag is reset (set to "0" for example), it indicates that the sink device has no function of executing full-duplex communication.

Likewise, if the half-duplex flag is set (set to "1" for example), it is indicative that the sink device has a function of executing half-duplex communication, namely, the sink device has the configuration shown in FIG. 16; if the half-duplex flag is reset (set to "0" for example), it indicates that the sink device has no function of executing half-duplex communication.

Block 9 of the data represented by "Vender Specific" has progressive video latency time data represented by "Video Latency." Block 10 has audio latency time data accompanying progressive video represented by "Audio Latency." Block 11 has interlaced video latency time data represented by "Interlaced Video Latency." Block 12 has audio latency time data accompanying interlaced video represented by "Interlaced Audio Latency."

On the basis of the full-duplex flag and the half-duplex flag included in the E-EDID received from the sink device, the source device determines whether to execute half-duplex communication or full-duplex communication or bidirectional communication based on CEC signal transfer. According to a result of this decision, the source device carries out bidirectional communication with the sink device.

For example, if the source device has the configuration shown in FIG. 16, the source device can execute half-duplex communication with the sink device shown in FIG. 16 but cannot execute half-duplex communication with the sink device shown in FIG. 17. Therefore, the source device starts communication processing when the power to the source device is turned on, hereby carrying out bidirectional communication according to the capabilities of the sink device connected to the source device.

Figure 20:
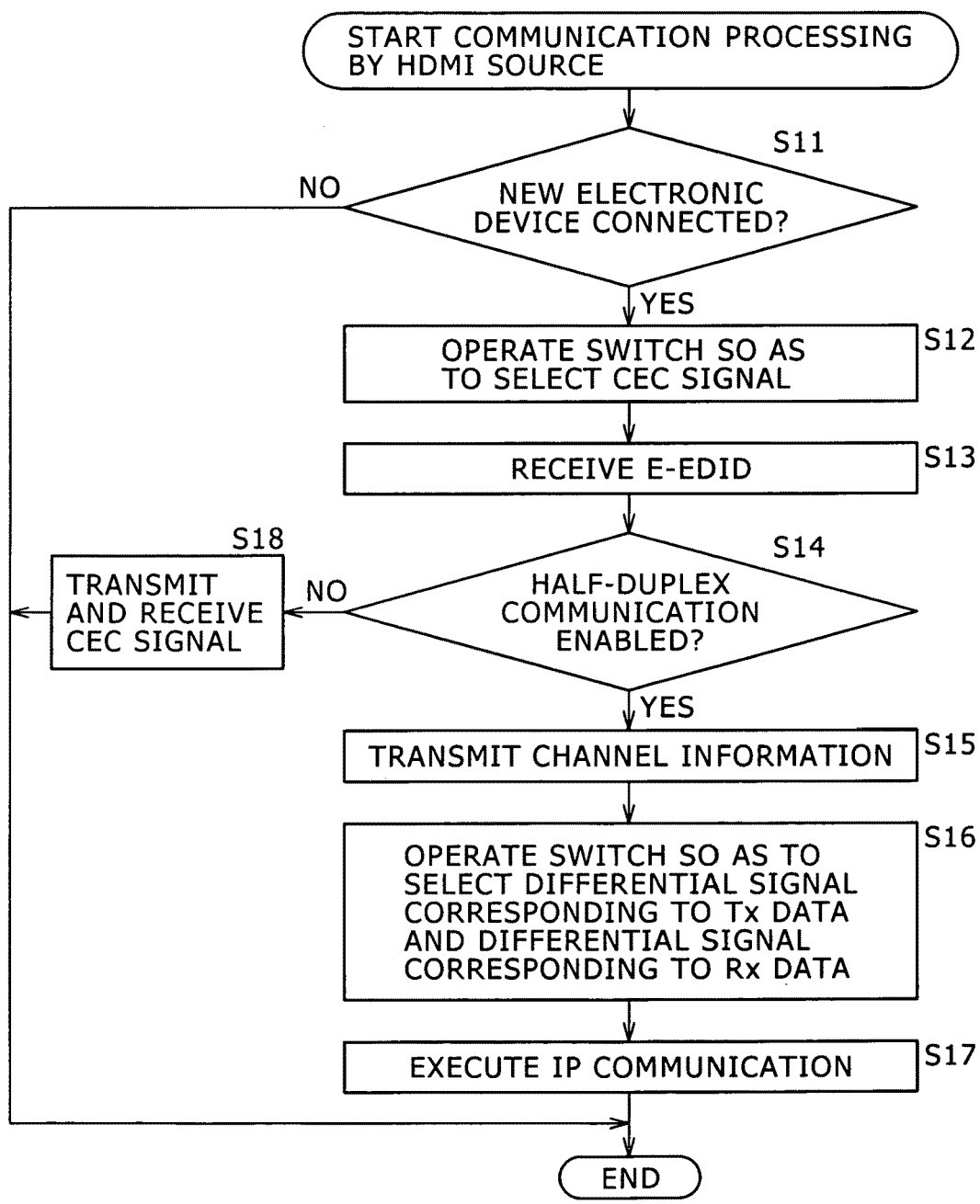
FIG. 20 is a flowchart indicative of communication processing by the source device.

The following describes communication processing to be executed by the source device shown in FIG. 16 with reference to the flowchart shown in FIG. 20.

In step S11, the source device determines whether a new electronic device has been connected to the source device. For example, on the basis of the magnitude of a voltage applied to a pin called Hot Plug Detect to which the HPD line 86 is connected, the source device determines whether a new electronic device (or a sink device) has been connected or not.

If no new electronic device is found connected in step S11, then no communication is carried out, so that the communication processing comes to an end. If a new electronic device is found connected in step S11, then the switching control unit 121 controls the switch 133 in step S12 so as to set the switch 133 to select a CEC signal from the control section (CPU) of the source device at the time of data transmission and select a CEC signal from the sink device at the time of data reception.

In step S13, the source device receives the E-EDID transmitted from the sink device via the DDC 83. Namely, upon detection of the connection with the source device, the sink device reads E-EDID from the EDID ROM 85 and transmits the read E-EDID to the source device via the DDC 83, so that the source device receives the E-EDID transmitted from the sink device.

In step S14, the source device determines whether half-duplex communication with the sink device can be carried out or not. Namely, referencing the E-EDID received from the sink device, the source device determines whether half-duplex flag "Half Duplex" shown in FIG. 19 is set or not. If the half-duplex flag is found set, for example, the source device determines that the bidirectional IP communication based on half-duplex communication is enabled, namely, half-duplex communication is enabled.

If half-duplex communication is found enabled in step S14, then, the source device transmits, in step S15, a signal telling that IP communication based on half-duplex communication using the CEC line 84 and the reserved line 88 is carried out to the sink device via the switch 133 and the CEC line 84 as channel information indicative of a channel for use in bidirectional communication.

Namely, if the half-duplex flag is set, the source device knows that the sink device has the configuration shown in FIG. 16 and the half-duplex communication using the CEC line 84 and the reserved line 88 is enabled, so that the source device transmits the channel information to the sink device to notify the sink device of the execution of half-duplex communication.

In step S16, the switching control unit 121 controls the switch 133 to select a differential signal corresponding to Tx data from the conversion unit 131 at the time of data transmission and select a differential signal corresponding to Rx data from the sink device at the time of data reception.

In step S17, each section of the source device executes bidirectional IP communication with the sink device by half-duplex communication, upon which the communication processing comes to an end. To be more specific, at the time of data transmission, the conversion unit 131 converts the Tx data supplied from the control section (CPU) into a differential signal, supplies one of the part signals making up the differential signal obtained by the conversion to the switch 133, and transmits the other part signal to the sink device via the reserved line 88. The switch 133 transmits the part signal supplied from the conversion unit 131 to the sink device via the CEC line 84. Consequently, the differential signal corresponding to Tx data is transmitted from the source device to the sink device.

At the time of data reception, the decoding unit 132 receives a differential signal corresponding to Rx data transmitted from the sink device. To be more specific, the switch 133 receives a part signal of a differential signal corresponding to Rx data transmitted from the sink device via the CEC line 84 and supplies the received part signal to the decoding unit 132. Under the control of the timing control unit 122, the decoding unit 132 decodes differential signal made up of the part signal supplied from the switch 133 and the part signal supplied from the sink device via the reserved line 88 into the Rx data that is the original data and outputs the Rx data to the control section (CPU).

Consequently, the source device transmits and receives various data, such as control data, pixel data, and audio data, with the sink device.

If half-duplex communication is found not enabled in step S14, then the source device transmits and receives CEC signals in step S18 to carry out bidirectional communication with the sink device, upon which the communication processing comes to an end.

Namely, at the time of data transmission, the source device transmits a CEC signal to the sink device via the switch 133 and the CEC line 84 and, at the time of data reception, receives a CEC signal transmitted from the sink device via the switch 133 and the CEC line 84, thereby transmitting and receiving control data with the sink device.

Thus, the source device refers to the half-duplex flag to carry out half-duplex communication with the sink device enabled for half-duplex communication, by use of the CEC line 84 and the reserved line 88.

As described above, carrying out the half-duplex communication based on the CEC line 84 and the reserved line, namely, the IP communication based on half-duplex communication with the sink device by selecting the data to be transmitted and received by setting the switch 133 allows high-speed bidirectional communication while maintaining the compatibility with the HDMI of the past.

Further, as with the source device, the sink device also starts communication processing when the power to the sink device is turned on, thereby carrying out bidirectional communication with the source device.

Figure 21:
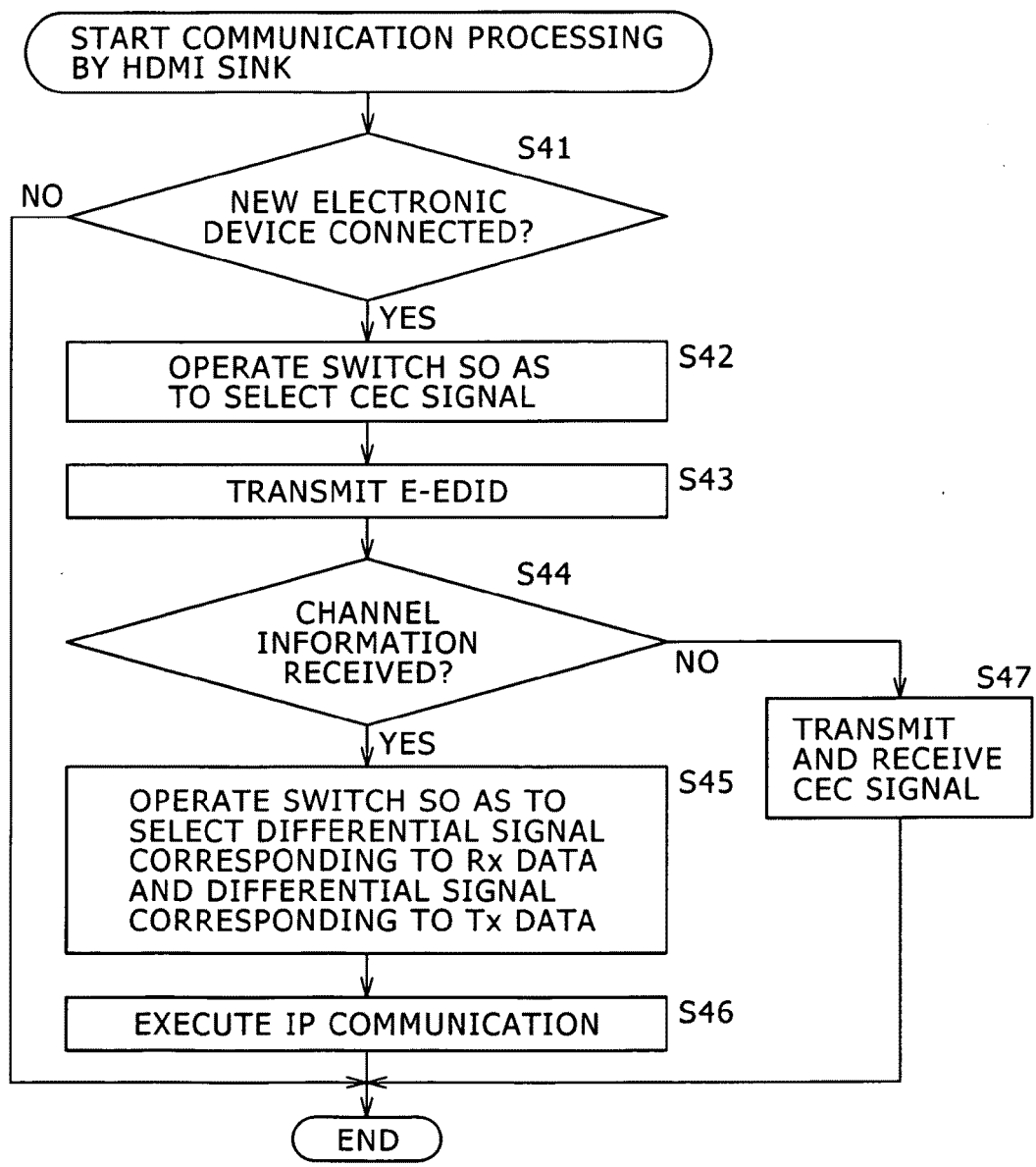
FIG. 21 is a flowchart indicative of communication processing by the sink device.

The following describes communication processing to be executed by the sink device shown in FIG. 16 with reference to the flowchart shown in FIG. 21.

In step S41, a sink device determines whether a new electronic device (or a source device) has been connected to the sink device or not. For example, on the basis of the magnitude of a voltage applied to a pin called Hot Plug Detect to which the HPD line 86 is connected, the sink device determines whether a new electronic device has been connected or not.

If no new electronic device is found connected in step S41, then no communication is carried out, so that the communication processing comes to an end. If a new electronic device is found connected in step S41, then the switching control unit 124 controls the switch 135 in step S42 so as to set the switch 135 to select a CEC signal from the control section (CPU) of the sink device at the time of data transmission and select a CEC signal from the source device at the time of data reception.

In step S43, the sink device reads E-EDID from the EDID ROM 85 and transmits the read E-EDID to the source device via the DDC 83.

In step S44, the sink device determines whether channel information has been received from the source device or not.

To be more specific, channel information indicative of a bidirectional communication channel is transmitted from the source device depending on the functions of the source device and the sink device. For example, if the source device has the configuration shown in FIG. 16, the source device and the sink device are enabled for the half-duplex communication based on the CEC line 84 and the reserved line 88. Hence, from the source device to the sink device, channel information is transmitted telling that the IP communication based on the CEC line 84 and the reserved line 88 is carried out. The sink device receives the channel information transmitted from the source device via the switch 135 and the CEC line 84, thereby determining that the channel information has been received.

In contrast, if the source device has no function of executing half-duplex communication, no channel information is transmitted from the source device to the sink device, so that the sink device determines that no channel information has been received.

If the channel information is found received in step S44, then the procedure goes to step S45, in which the switching control unit 124 controls the switch 135 to select a differential signal corresponding to Rx data from the conversion unit 134 at the time of data transmission and select a differential signal corresponding to Tx data from the source device at the time of data reception.

In step S46, the sink device carries out bidirectional IP communication with the source device by half-duplex communication, upon which the communication processing comes to an end. To be more specific, at the time of data transmission, under the control of the timing control unit 123, the conversion unit 134 converts the Rx data supplied from the control section (CPU) of the sink device into a differential signal, supplies one of the part signals making up the differential signal obtained by this conversion to the switch 135, and transmits the other part signal to the source device via the reserved line 88. The switch 135 transmits the part signal supplied from the conversion unit 134 to the source device via the CEC line 84. Consequently, the differential signal corresponding to Rx data is transmitted from the sink device to the source device.

At the time of data reception, the decoding unit 136 receives the differential signal corresponding to Tx data transmitted from the source device. To be more specific, the switch 135 receives the part signal of the differential signal corresponding to Tx data transmitted from the source device via the CEC line 84 and supplies the received part signal to the decoding unit 136. The decoding unit 136 decodes the differential signal made up of the part signal supplied from the switch 135 and the part signal supplied from the source device via the reserved line 88 into the Tx data that is the original data and outputs the Tx data to the control section (CPU).

Consequently, the sink device transmits and receives various data, such as control data, pixel data, and audio data, with the source device.

If no channel information is found received in step S44, then the sink device transmits and receives CEC signals in step S47 to carry out bidirectional communication with the source device, upon which the communication processing comes to an end.

Namely, at the time of data transmission, the sink device transmits a CEC signal to the sink device via the switch 135 and the CEC line 84 and, at the time of data reception, receives a CEC signal transmitted from the source device via the switch 135 and the CEC line 84, thereby transmitting and receiving control data with the source device.

Thus, upon reception of the channel information, the sink device carries out half duplex communication with the sink device by use of the CEC line 84 and the reserved line 88.

As described above, carrying out the half-duplex communication based on the CEC line 84 and the reserved line 88 with the source device by selecting the data to be transmitted and received with the sink device setting the switch 135 allows high-speed bidirectional communication while maintaining the compatibility with the HDMI of the past.

If the source device has the configuration shown in FIG. 17, the source device determines, in the communication processing, on the basis of the full-duplex flag contained in the E-EDID whether the sink device has a function of executing full-duplex communication, thereby carrying out bidirectional communication according to a result of this determination.

Figure 22:
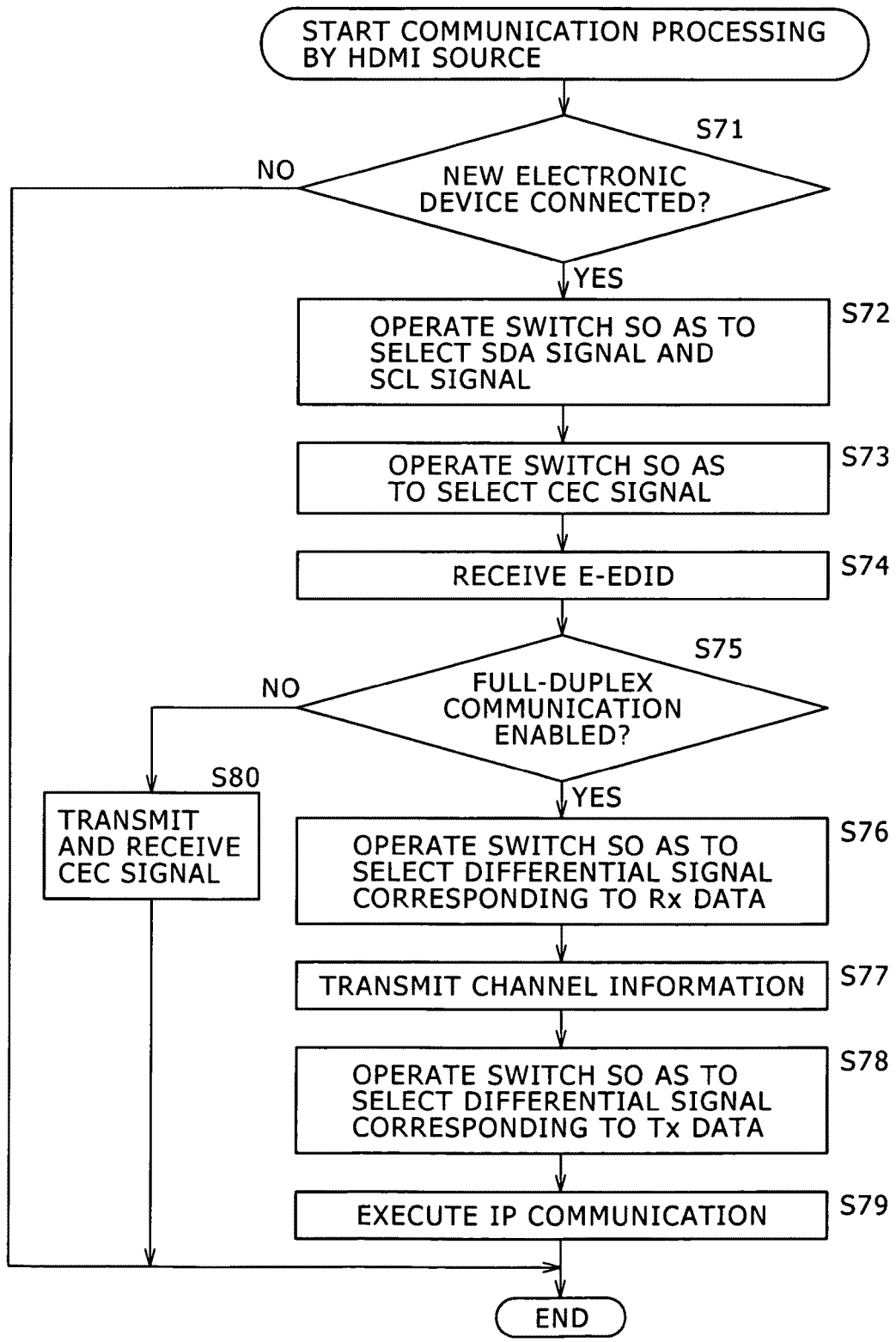
FIG. 22 is a flowchart indicative of communication processing by the source device.

The following describes communication processing to be carried out by the source device shown in FIG. 17 with reference to the flowchart shown in FIG. 22.

In step S71, the source device determines whether a new electronic device has been connected to the source device. If no new electronic device is found connected in step S71, then no communication is carried out, upon which the communication processing comes to an end.

If a new electronic device is found connected in step S71, then, the switching control unit 171 controls the switch 181 and the switch 182 in step S72 to select an SDA signal from the control section (CPU) of the source device through the switch 181 at the time of data transmission, select an SCL signal from the control section (CPU) of the source device through the switch 182, and select, at the time of data reception, an SDA signal from the sink device through the switch 181.

In step S73, the switching control unit 121 controls the switch 133 to select a CEC signal from the control section (CPU) of the source device at the time of data transmission and a CEC signal from the sink device at the time of data reception.

In step S74, the source device receives E-EDID transmitted from the sink device via the SDA line 191 of the DDC 83. Namely, upon detection of the connection with the source device, the sink device reads E-EDID from the EDID ROM 85 and transmits the read E-EDID to the source device via the SDA line 191 of the DDC 83, so that the source device receives the E-EDID transmitted from the sink device.

In step S75, the source device determines whether full-duplex communication with the sink device is enabled or not. To be more specific, the source device references the E-EDID received from the sink device to determine whether the full-duplex flag "Full Duplex" shown in FIG. 19 is set or not. For example, if the full-duplex flag is found set, the source device determines the bidirectional IP communication based on full-duplex communication, namely, the full-duplex communication is enabled.

If the full-duplex communication is found enabled in step S75, then the switching control unit 171 controls the switch 181 and the switch 182 in step S76 to select a differential signal corresponding to Rx data from the sink device at the time of data reception.

Namely, at the time of data reception, the switching control unit 171 controls the switch 181 and the switch 182 such that, of the part signals making up a differential signal corresponding to Rx data transmitted form the sink device, one part signal transmitted via the SDA line 191 is selected through the switch 181 and the other part signal transmitted via the SCL line 192 is selected through the switch 182.

The SDA line 191 and the SCL line 192 making up the DDC 83 are used no more after E-EDID has been transmitted from the sink device to the source device, namely, the transmission and reception of an SDA signal and an SCL signal via the SDA line 191 and the SCL line 192 are not carried out, so that the SDA line 191 and the SCL line 192 can be used as Rx data transmission paths based on full-duplex communication by switching the switch 181 and the switch 182.

In step S77, the source device transmits a signal telling that the IP communication based on full-duplex communication using the CEC line 84 and the reserved line 88 and the SDA line 191 and the SCL line 192 is carried out to the sink device via the switch 133 and the CEC line 84 as channel information indicative of a bidirectional communication channel.

Figure 24:
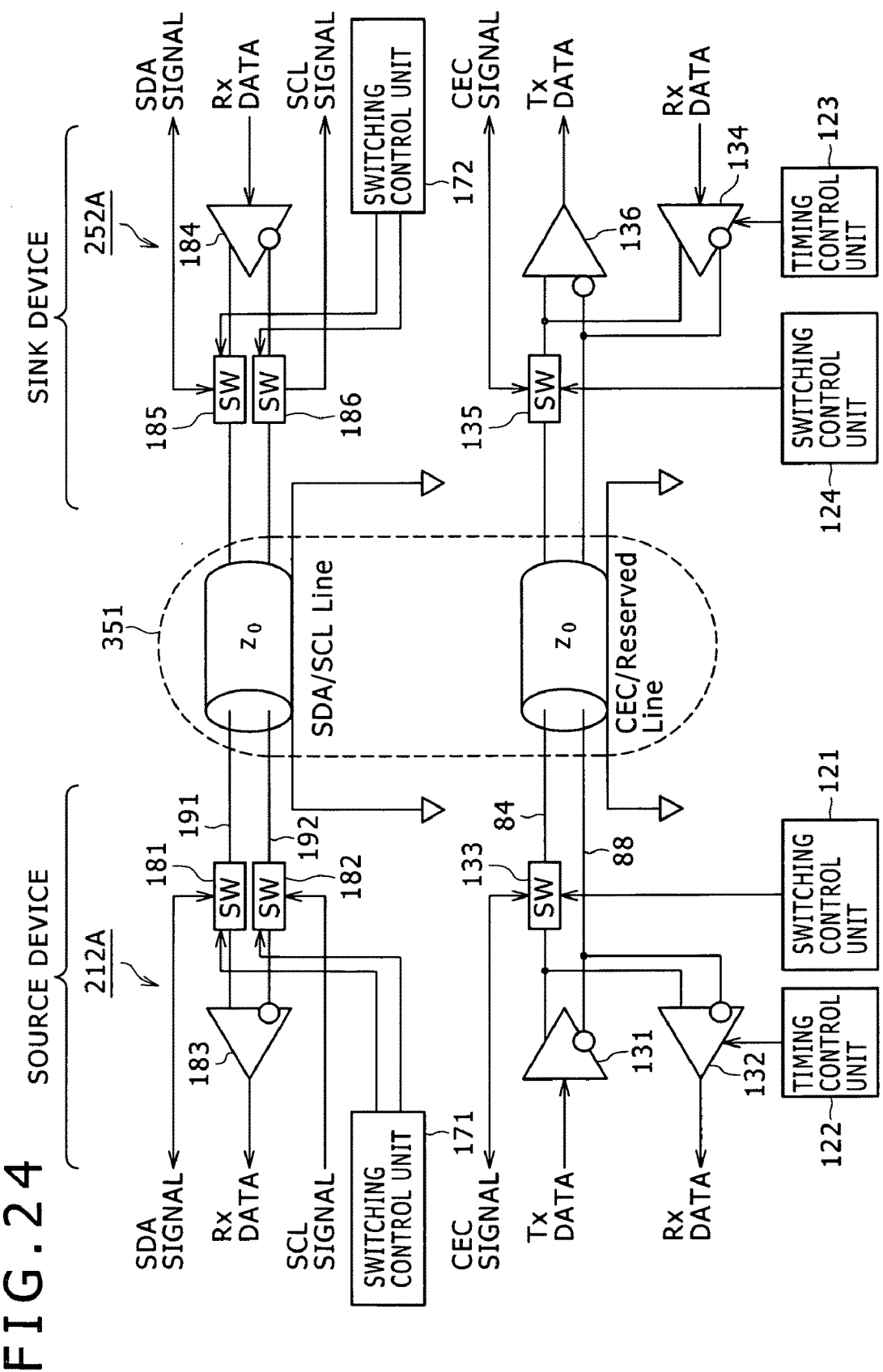
FIG. 24 is a connection diagram illustrating another exemplary configuration of a high-speed data line interface of the disc recorder and the television receiver.

To be more specific, if the full-duplex flag is set, the source device knows that the sink device has the configuration shown in FIG. 24 and the full-duplex communication using the CEC line 84 and the reserved line 88 and the SDA line 191 and the SCL line 192 is enabled, so that the source device transmits the channel information to the sink device telling that the full-duplex communication is carried out.

In step S78, the switching control unit 121 controls the switch 133 to select a differential signal corresponding to Tx data from the conversion unit 131 at the time of data transmission. Namely, the switching control unit 121 controls the switch 133 such that a part signal of the differential signal corresponding to Tx data supplied from the conversion unit 131 to the switch 133 is selected.

In step S79, the source device carries out bidirectional IP communication with the sink device by full-duplex communication, upon which the communication processing comes to an end. To be more specific, at the time of data transmission, the conversion unit 131 converts Tx data supplied from the control section (CPU) of the source device into a differential signal, supplies one of the part signals making up this differential signal obtained by the conversion to the switch 133, and transmits the other part signal to the sink device via the reserved line 88. The switch 133 transmits the part signal supplied from the conversion unit 131 to the sink device via the CEC line 84. Consequently, the differential signal corresponding to Tx data is transmitted from the source device to the sink device.

At the time of data reception, the decoding unit 183 receives a differential signal corresponding to Rx signal transmitted from the sink device. To be more specific, the switch 181 receives one of the part signals of a differential signal corresponding to Rx data transmitted from the sink device via the SDA line 191 and supplies the received part signal to the decoding unit 183. The switch 182 receives the other part signal of the differential signal corresponding to Rx data transmitted from the sink device via the SCL line 192 and supplies the received part signal to the decoding unit 183. The decoding unit 183 decodes the differential signal made up of the part signal supplied from the switch 181 and the switch 182 into the Rx data that is the original data and outputs the Rx data to the control section (CPU).

Consequently, the source device transmits and receives various data, such as control data, pixel data, and audio data, with the sink device.

If the full-duplex communication is found not enabled in step S75, then the source device carries out bidirectional communication with the sink device by transmitting and receiving CEC signals in step S80, upon which the communication processing ends.

Namely, at the time of data transmission, the source device transmits a CEC signal to the sink device via the switch 133 and the CEC line 84 and, at the time of data reception, receives a CEC signal transmitted from the sink device via the switch 133 and the CEC line 84, thereby transmitting and receiving control data with the sink device.

Thus, the source device refers to the full-duplex flag to carry out the full-duplex communication with the sink device enabled for full-duplex communication using the CEC line 84 and the reserved line 88 and the SDA line 191 and the SCL line 192.

As described above, carrying out the full-duplex communication based on the CEC line 84 and the reserved line 88 and the SDA line 191 and the SCL line 192 with the sink device by selecting the data to be transmitted and received by setting the switch 133, the switch 181, and the switch 182 allows high-speed bidirectional communication while maintaining the compatibility with the HDMI of the past.

If the sink device has the configuration shown in FIG. 17, the sink device carries out communication processing in the same manner as with the sink device shown in FIG. 16, thereby executing bidirectional communication with the source device.

Figure 23:
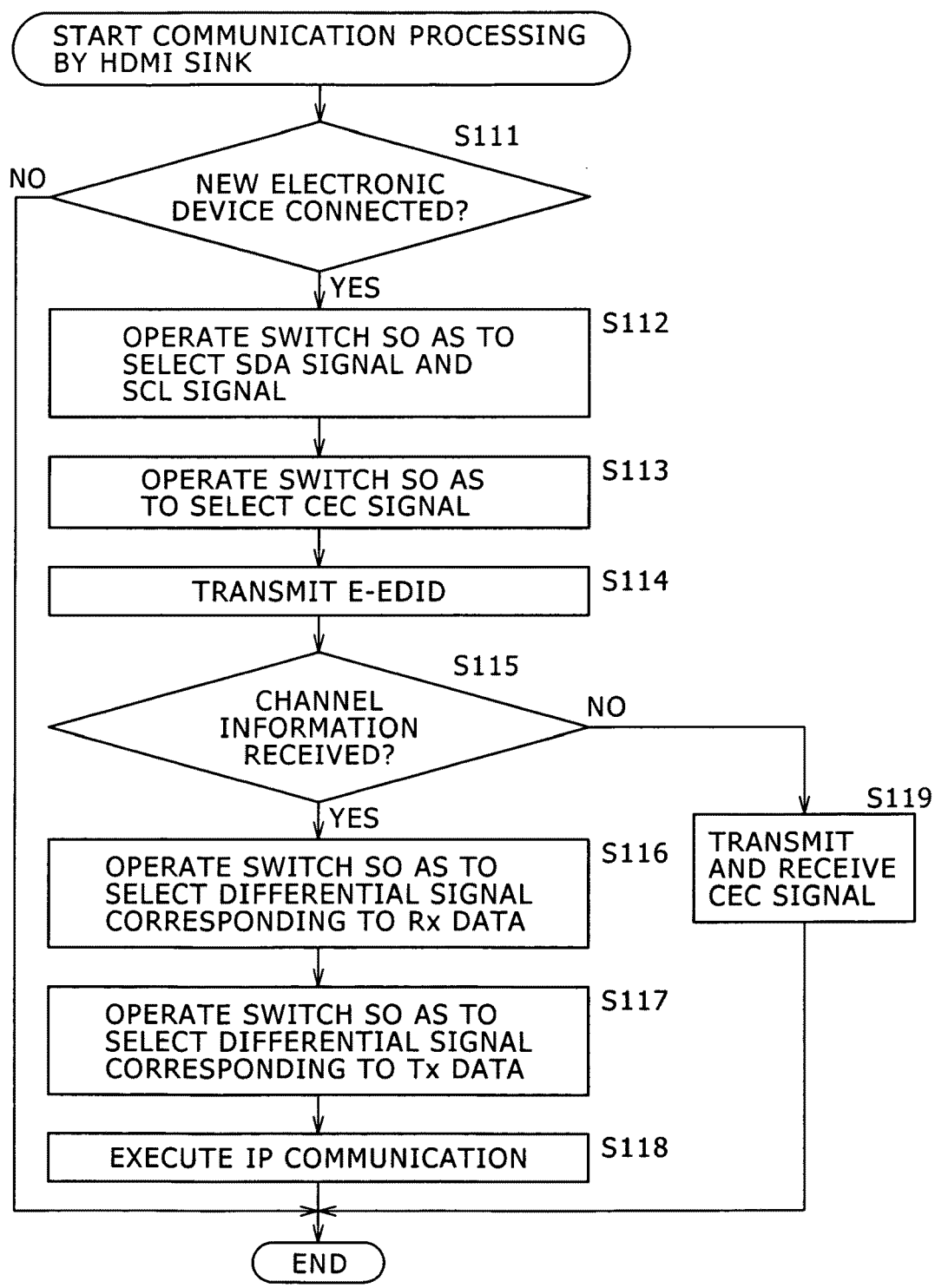
FIG. 23 is a flowchart indicative of communication processing by the sink device.

The following describes communication processing to be carried out by the sink device shown in FIG. 17 with reference to the flowchart shown in FIG. 23.

In step S111, the sink device determines whether a new electronic device (a source device) has been connected to the sink device or not. If no new electronic device is found connected in step S111, no communication is carried out, upon which the communication processing comes to an end.

If a new electronic device is found connected in step S111, then the switching control unit 172 controls the switch 185 and the switch 186 in step S112 to select an SDA signal from the control section (CPU) of the sink device through the switch 185 at the time of data transmission and selects an SDA signal from the source device through the switch 185 and an SCL signal from the source device through the switch 186 at the time of data reception.

In step S113, the switching control unit 124 controls the switch 135 to select a CEC signal from the control section (CPU) of the sink device at the time of data transmission and a CEC signal from the source device at the time of data reception.

In step S114, the sink device reads E-EDID from the EDID ROM 85 and transmits the read E-EDID to the source device via the switch 185 and the SDA line 191 of the DDC 83.

In step S115, the sink device determines whether channel information transmitted from the source device has been received or not.

To be more specific, channel information indicative of a bidirectional communication channel is transmitted from the source device depending on the functions of the source device and the sink device. For example, if the source device has the configuration shown in FIG. 17, the source device and the sink device are enabled for the full-duplex communication. Hence, from the source device to the sink device, channel information is transmitted telling that the IP communication by full-duplex communication based on the CEC line 84 and the reserved line 88 and the SDA line 191 and the SCL line 192 is carried out. The sink device receives the channel information transmitted from the source device via the switch 135 and the CEC line 84, thereby determining that the channel information has been received.

In contrast, if the source device has no function of executing full-duplex communication, no channel information is transmitted from the source device to the sink device, so that the sink device determines that no channel information has been received.

If the channel information is found received in step S115, then the procedure goes to step S116, in which the switching control unit 172 controls the switch 185 and the switch 186 to select a differential signal corresponding to Rx data from the conversion unit 184 at the time of data transmission.

In step S117, the switching control unit 124 controls the switch 135 to select a differential signal corresponding to Tx data from the source device at the time of data reception.

In step S118, the sink device carries out bidirectional IP communication based on full-duplex communication, upon which the communication processing comes to an end. To be more specific, at the time of data transmission, the conversion unit 184 converts the Rx data supplied from the control section (CPU) of the sink device into a differential signal, supplies one of the part signals making up the differential signal obtained by this conversion to the switch 185, and supplies the other part signal to the switch 186. The switch 185 and the switch 186 transmit the part signals supplied from the conversion unit 184 to the source device via the SDA line 191 and the SCL line 192. Consequently, the differential signal corresponding to Rx data is transmitted from the sink device to the source device.

At the time of data reception, the decoding unit 136 receives the differential signal corresponding to Tx data transmitted from the source device. To be more specific, the switch 135 receives the part signal of the differential signal corresponding to Tx data transmitted from the source device via the CEC line 84 and supplies the received part signal to the decoding unit 136. The decoding unit 136 decodes the differential signal made up of the part signal supplied from the switch 135 and the part signal supplied from the source device via the reserved line 88 into the Tx data that is the original data and outputs the Tx data to the control section (CPU).

Consequently, the sink device transmits and receives various data, such as control data, pixel data, and audio data, with the source device.

If no channel information is found received in step S115, then the sink device transmits and receives CEC signals in step S119 to carry out bidirectional communication with the source device, upon which the communication processing comes to an end.

Thus, upon reception of the channel information, the sink device carries out full-duplex communication with the sink device by use of the CEC line 84 and the reserved line 88 and the SDA line 191 and the SCL line 192.

As described above, carrying out the full-duplex communication based on the CEC line 84 and the reserved line 88 and the SDA line 191 and the SCL line 192 with the source device by selecting the data to be transmitted and received by setting the switch 135, the switch 185, and the switch 186 allows high-speed bidirectional communication while maintaining the compatibility with the HDMI of the past.

It should be noted that, in the example shown in FIG. 17, the source device has the configuration in which the conversion unit 131 is connected to the CEC line 84 and the reserved line 88 and the decoding unit 183 is connected to the SDA line 191 and the SCL line 192; it is also practicable that the decoding unit 183 is connected to the CEC line 84 and the reserved line 88 and the conversion unit 131 is connected to the SDA line 191 and the SCL line 192.

In the above-mentioned case, the switch 181 and the switch 182 are connected to the CEC line 84 and the reserved line 88 and, at the same time, the decoding unit 183 and the switch 133 is connected to the SDA line 191 and, at the same time, the conversion unit 131.

Likewise, with the sink device shown in FIG. 17, the conversion unit 184 may be connected to the CEC line 84 and the reserved line 88 and the decoding unit 136 may be connected to the SDA line 191 and the SCL line 192. In this case, the switch 185 and the switch 186 are connected to the CEC line 84 and the reserved line 88 and, at the same time, the conversion unit 184 and the switch 135 is connected to the SDA line 191 and, at the same time, the decoding unit 136.

In addition, in FIG. 16, the CEC line 84 and the reserved line 88 may be the SDA line 191 and the SCL line 192. Namely, the conversion unit 131 and the decoding unit 132 of the source device and the conversion unit 134 and the decoding unit 136 of the sink device may be connected to the SDA line 191 and the SCL line 192, thereby providing the IP communication based on half-duplex communication between the source device and the sink device. Further, in this case, the reserved line 88 may be used to detect the connection of a new electronic device.

Further, each of the source device and the sink device may have both the functions of executing half-duplex communication and full-duplex communication. In this case, the source device and the sink device can execute the IP communication based on half-duplex communication or full-duplex communication in accordance with the functions of a connected electronic device.

If each of the source device and the sink device has both the functions of executing half-duplex communication and full-duplex communication, the source device and the sink device are configured as shown in FIG. 24. It should be noted that, with reference to FIG. 24, components similar to those previously described with reference to FIG. 16 or 17 are denoted by the same reference numerals and the description thereof will be omitted as appropriate.

A high-speed data line interface 212A that is a source device shown in FIG. 24 has a conversion unit 131, a decoding unit 132, a switch 133, a switch 181, a switch 182, a decoding unit 183, a switching control unit 121, a timing control unit 122, and a switching control unit 171. Namely, the high-speed data line interface 212A in the source device shown in FIG. 24 has a configuration in which the timing control unit 122 and the decoding unit 132 shown in FIG. 16 are added to the configuration of the high-speed data line interface 212A in the source device shown in FIG. 17.

Also, the high-speed data line interface 252A that is a sink device shown in FIG. 24 has a conversion unit 134, a switch 135, a decoding unit 136, a conversion unit 184, a switch 185, a switch 186, a timing control unit 123, a switching control unit 124, and a switching control unit 172. Namely, the sink device shown in FIG. 24 has a configuration in which the timing control unit 123 and the conversion unit 134 shown in FIG. 16 are added to the sink device shown in FIG. 17.

The following describes communication processing that is carried out by the source device and the sink device shown in FIG. 24.

Figure 25:
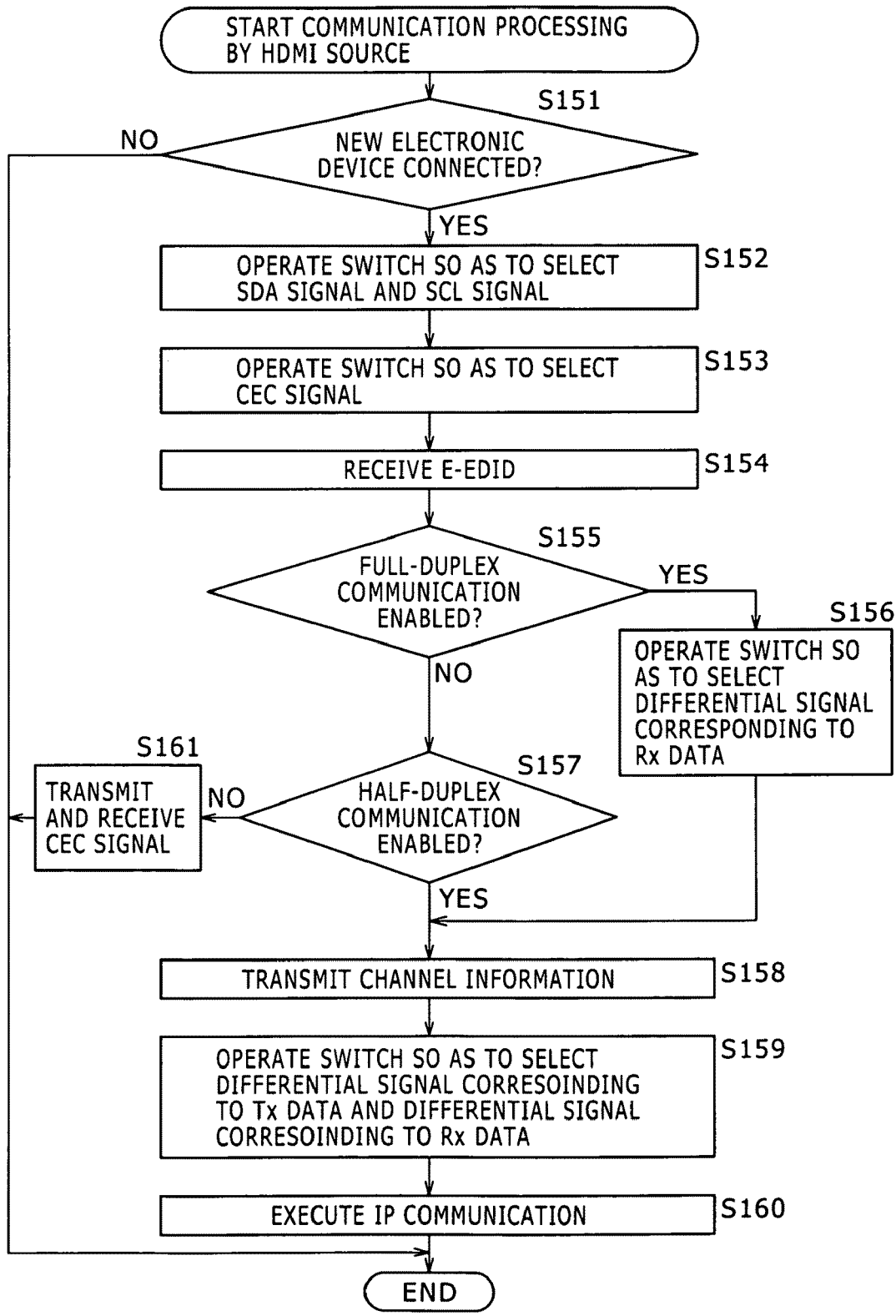
FIG. 25 is a flowchart indicative of communication processing by the source device.

First, communication processing to be executed by the source device shown in FIG. 24 with reference to the flowchart shown in FIG. 25. It should be noted that processes of steps S151 through S154 are substantially the same as those of steps S71 through S74 in FIG. 22 and therefore description thereof will be omitted.

In step S155, the source device determines whether full-duplex communication is enabled with the sink device or not. Namely, the source device references E-EDID received from the sink device to determine whether full-duplex flag "Full Duplex" shown in FIG. 19 is set or not.

If full-duplex communication is found enabled in step S155, namely, if the sink device shown in FIG. 24 or 17 is connected to the source device, then the switching control unit 171 controls the switch 181 and the switch 182 in step S156 to select a differential signal corresponding to Rx data from the sink device at the time of data reception.

On the other hand, if full-duplex communication is found not enabled in step S155, then the source device determines in step S157 whether half-duplex communication is enabled or not. To be more specific, the source device references the received E-EDID to determine whether half-duplex flag "Half Duplex" shown in FIG. 19 is set or not. In other words, the source device determines whether the sink device shown in FIG. 16 is connected to the source device or not.

If half-duplex communication is found enabled in step S157 or if the switch 181 and the switch 182 have been switched in step S156, then the source device transmits channel information to the sink device via the switch 133 and the CEC line 84 in step S158.

If full-duplex communication is found enabled in step S155, it indicates that the sink device has the function of executing full-duplex communication, so that the source device transmits, as channel information, a signal telling that IP communication using the CEC line 84 and the reserved line 88 and the SDA line 191 and the SCL line 192 is carried out to the sink device via the switch 133 and the CEC line 84.

If half-duplex communication is found enabled in step S157, it indicates that the sink device does not have the function of carrying out full-duplex communication but has the function of carrying out half-duplex communication, so that the source device transmits, as channel information, a signal telling that IP communication using the CEC line 84 and the reserved line 88 is carried out to the sink device via the switch 133 and the CEC line 84.

In step S159, the switching control unit 121 controls the switch 133 to select a differential signal corresponding to Tx data from the conversion unit 131 at the time of data transmission and select a differential signal corresponding to Rx data transmitted from the sink device at the time of data reception. It should be noted that, if the source device and the sink device carry out full-duplex communication, the differential signal corresponding to Rx data is not transmitted from the sink device via the CEC line 84 and the reserved line 88 at the time of data reception on the source device, so that the differential signal corresponding to Rx signal is not supplied to the decoding unit 132.

In step S160, the source device carries out bidirectional IP communication with the sink device, upon which the communication processing comes to an end. Namely, if the source device carries out full-duplex communication with the sink device and the source device carries out half-duplex communication, then, at the time of data transmission, the conversion unit 131 converts the Tx data supplied from the control section (CPU) of the source device into a differential signal, transmits one of the part signals making up the differential signal obtained by the conversion to the sink device via the switch 133 and the CEC line 84, and transmits the other part signal to the sink device via the reserved line 88.

If the source device carries out full-duplex communication with the sink device, the decoding unit 183 receives, at the time of data reception, a differential signal corresponding to Rx data transmitted from the sink device and decodes the received differential signal into Rx data that is the original data, outputting the Rx data to the control section (CPU).

If the source device carries out half-duplex communication with the sink device, the decoding unit 132 receives a differential signal corresponding to Rx data transmitted from the sink device under the control of the timing control unit 122 at the time of data reception and decodes the received differential signal into Rx data that is the original data, outputting the Rx data to the control section (CPU).

Consequently, the source device transmits and receives various data, such as control data, pixel data, and audio data, with the sink device.

If half-duplex communication is found not enabled in step S157, then the source device transmits and receives CEC signals via the CEC line 84 in step S161 to carry out bidirectional communication with the sink device, upon which the communication processing comes to an end.

Thus, the source device refers to the full-duplex flag and the half-duplex flag to carry out full-duplex communication or half-duplex communication in accordance with the functions of the sink device that is a mate device.

Thus, in accordance with the communication functions of the sink device that is a mate device of communication, the data to be transmitted and the data to be received are selected by switching the switch 133, the switch 181, and the switch 182 to carry out full-duplex communication or half-duplex communication, thereby allowing the selection of the more optimum communication method to carry out high-speed bidirectional communication while maintaining the compatibility with the HDMI of the past.

Figure 26:
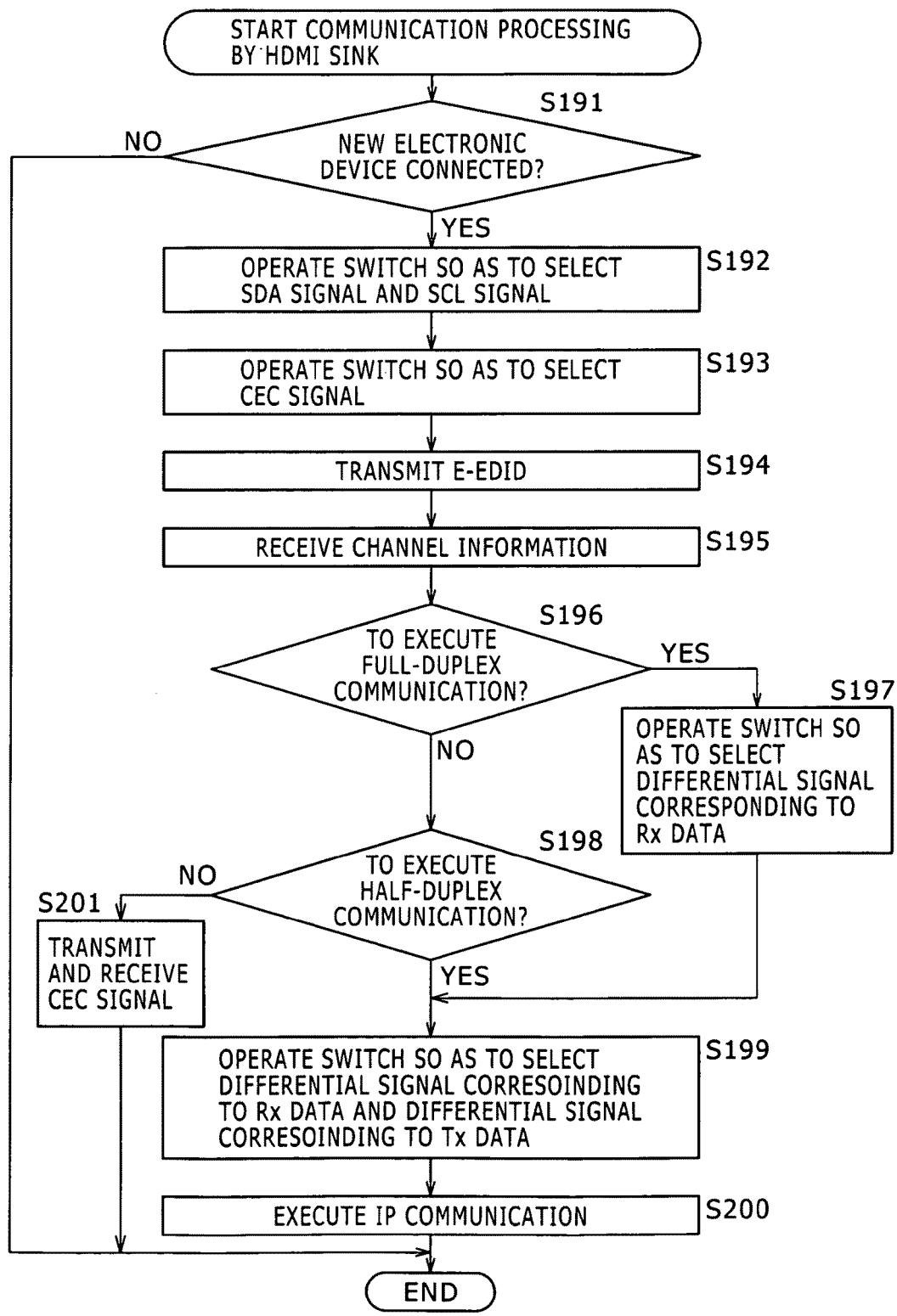
FIG. 26 is a flowchart indicative of communication processing by the sink device.

The following describes communication processing that is carried out by the sink device shown in FIG. 24 with reference to the flowchart shown in FIG. 26. It should be noted that processes of steps S191 through S194 are substantially the same as those of steps S111 through S114 shown in FIG. 23, so that the description thereof will be omitted.

In step S195, the sink device receives channel information transmitted from the source device via the switch 135 and the CEC line 84. It should be noted that the source device connected to the sink device has none of the full-duplex communication function and the half-duplex communication function, no channel information is transmitted from the source device to the sink device, so that the sink device does not receive channel information.

In step S196, the sink device determines on the basis of the received channel information whether to carry out full-duplex communication or not. For example, if the sink device receives channel information telling that IP communication using the CEC line 84 and the reserved line 88 and the SDA line 191 and the SCL line 192 is carried out, the sink device determines that full-duplex communication is carried out.

If full-duplex communication is found to be carried out in step S196, then the switching control unit 172 controls the switch 185 and the switch 186 in step S197 to select a differential signal corresponding to Rx data transmitted from the conversion unit 184 at the time of data transmission, thereby switching the switch 185 and the switch 186.

If full-duplex communication is found not to be carried out in step S196, then the sink device determines in step S198 on the basis of the received channel information whether to carry out half-duplex communication or not. For example, if the sink device receives channel information telling that IP communication using the CEC line 84 and the reserved line 88 is executed, the sink device determines that half duplex communication is executed.

If half-duplex communication is found in step S198 to be carried out or if the switch 185 and the switch 186 are switched in step S197, then the switching control unit 124 controls the switch 135 in step S199 to select a differential signal corresponding to Rx data from the conversion unit 134 at the time of data transmission and select a differential signal corresponding to Tx data from the source device at the time of data reception.

It should be noted that, when the source device and the sink device carry out full-duplex communication, no differential signal corresponding to Rx data is transmitted from the conversion unit 134 to the transmitter 81 at the time of data transmission on the sink device, so that no differential signal corresponding to Rx data is supplied to the switch 135.

In step S200, the sink device carries out bidirectional IP communication with the source device, upon which the communication processing comes to an end.

To be more specific, when the sink device carries out full-duplex communication with the source device, the conversion unit 184 converts Rx data supplied from the control section (CPU) of the sink device into a differential signal at the time of data transmission, transmits one of the part signal making up the differential signal obtained by the conversion to the source device via the switch 185 and the SDA line 191, and transmits the other part signal to the source device via the switch 186 and the SCL line 192.

If the sink device carries out half-duplex communication with the source device, the conversion unit 134 converts Rx data supplied from the control section (CPU) of the sink device into a differential signal at the time of data transmission, transmits one of the part signals making up the differential signal obtained by the conversion to the transmitter 81 via the switch 135 and the CEC line 84, and transmits the other part signal to the source device via the reserved line 88.

Further, when the sink device carries out full-duplex communication and half-duplex communication with the source device, the decoding unit 136 receives a differential signal corresponding to Tx data transmitted from the source device at the time of data reception and decodes the received differential signal into Tx data that is the original data, outputting the Tx data to the control section (CPU).

If half-duplex communication is found not to be executed in step S198, namely, if no channel information is transmitted, then the sink device executes bidirectional communication with the source device in step S201 by transmitting and receiving CEC signals, upon which the communication processing comes to an end.

Thus, the sink device carries out full-duplex communication or half-duplex communication in accordance with the functions of the source device that is a mate device of communication in accordance with the received channel information.

As described above, carrying out the full-duplex communication or half-duplex communication by selecting data to be transmitted and data to be received by switching the switch 135, the switch 185, and the switch 186 in accordance with the functions of the source device that is a mate device of communication allows high-speed bidirectional communication by selecting the more optimum communication method while maintaining the compatibility with the HDMI(R) of the past.

Also, interconnecting the source device and the sink device with an HDMI cable 351 including the CEC line 84 and the reserved line 88 mutually differential twisted pair connected and shielded and connected to the ground line and the SDA line 191 and the SCL line 192 mutually differential twisted pair connected and shielded and connected to the ground line allows the high-speed bidirectional IP communication based on half-duplex communication or full-duplex communication while maintaining the compatibility with the HDMI cable of the past.

The above-mentioned sequence of processing operations may be executed by software as well as dedicated hardware. When the above-mentioned sequence of processing operations is executed by software, the programs constituting the software are installed in a microcomputer or the like that controls each of the source device and the sink device, for example.

Figure 27:
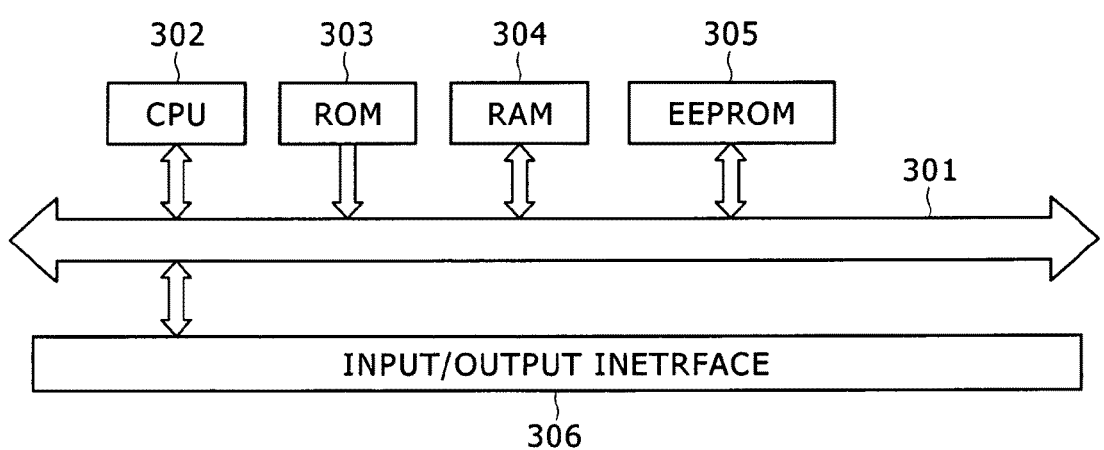
FIG. 27 is a block diagram illustrating an exemplary configuration of a computer to which the present invention is applied.

Now, FIG. 27 shows an exemplary configuration of a computer practiced as one embodiment on which a program for executing the above-mentioned series of processing operations is installed.

The above-mentioned program can be stored in an EEPROM (Electrically Erasable Programmable Read-Only Memory) 305 or a ROM 303 in advance that provides a recording media built in the computer.

Alternatively, the program can be stored (or recorded) in any of removable recording media, such as a flexible disc, a CD-ROM (Compact. Disc Read Only Memory), an MO (Magneto Optical) disc, a DVD (Digital Versatile Disc), a magnetic disc, and a semiconductor memory in a temporary or permanent manner. This removable recording media can be provided as so-called packaged software.

It should be noted that, in addition to the installation from removable recording media such as mentioned above into a computer, programs may be downloaded from a download site into a computer via satellite for digital satellite broadcasting in a wireless manner or via a network such as LAN (Local Area Network) or the Internet in a wired manner. The computer can receive, by an input/output interface 306, the program transmitted as above and install the received program into the incorporated EEPROM 305.

The computer incorporates a CPU (Central Processing Unit) 302. The CPU 302 is connected with the input/output interface 306 via a bus 301. The CPU 302 loads the program stored on the ROM (Read Only Memory) 303 or the EEPROM 305 into a RAM (Random Access Memory) 304 for execution. Consequently, the CPU 302 executes the processing specified by the above-mentioned flowcharts or the processing to be executed by the configurations described in the above-mentioned block diagrams.

It should be noted herein that the steps for describing each program include not only the processing operations which are sequentially executed in a time-dependent manner shown as the flowcharts but also the processing operations which are executed concurrently or discretely such as parallel processing or object processing. It should also be noted that the program may be one that is executed by one unit of computer or by two or more units of computer in a distributed processing manner.

The above-mentioned exemplary configuration shown in FIG. 9 allows the forming of a circuit for LAN communication regardless of, the electrical specifications defined with respect to DDC. It should be noted that FIG. 28 shows another configuration that provides substantially the same effects.

Figure 28:
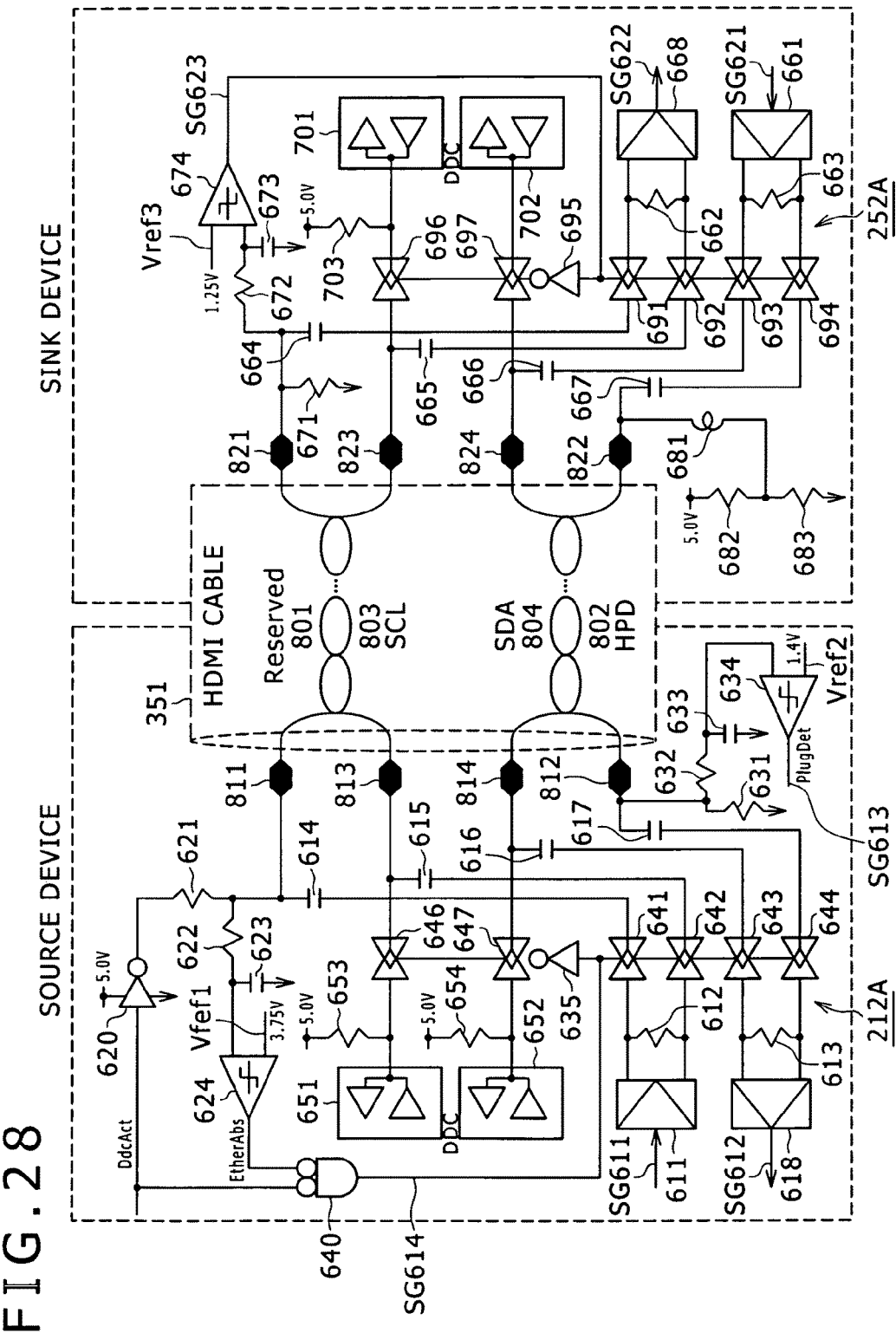
FIG. 28 is a connection diagram illustrating still another exemplary configuration of a high-speed data line interface of the disc recorder and the television receiver.

With the exemplary configuration shown in FIG. 28, in an interface for executing video and audio data transmission, exchange and authentication of connected device information, device control data communication, and LAN communication by one cable, the LAN communication is executed unidirectionally via two pairs of differential transmission paths and the status of interface connection is notified by the DC bias potential of at least one of the transmission paths. At the same time, in this interface, at least two transmission paths are used for the exchange and authentication of connected device information in a time division manner with the LAN communication.

A source device has a LAN signal transmission circuit 611, terminal resistors 612, 613, AC coupling capacitors 614 through 617, a LAN signal reception circuit 618, an inverter 620, a resistor 621, a resistor 622 and a capacitor 623 that form a lowpass filter, a comparator 624, a pulldown resistor 631, a resistor 632 and a capacitor 633 that form a lowpass filter, a comparator 634, a NOR gate 640, analog switches 641 through 644, an inverter 645, analog switches 646, 747, DDC transceivers 651, 652, and pullup resistors 653, 654.

A sink device 602 has a LAN signal transmission circuit 661, terminal resistors 662, 663, AC coupling capacitors 664 through 667, a LAN signal reception circuit 668, a pulldown resistor 671, a resistor 672 and capacitor 673 that form a lowpass filter, a comparator 674, a choke coil 681, resistors 682, 683 series connected between power supply potential and reference potential, analog switches 691 through 694, an inverter 695, analog switches 696, 697, DDC transceivers 701, 702, and pullup resistors 703, 704.

The HDMI cable 351 contains a differential transmission path composed of a reserved line 801 and an SCL line 803 and a differential transmission path composed of an SDA line 804 and an HPD line 802 and source-side terminals 811 through 814 and sink-side terminals 821 through 824 of these differential transmission paths are formed.

The reserved line 801 and the SCL line 803 are connected as a differential twisted pair and the SDA line 804 and the HPD line 802 are connected as a differential twisted pair.

In the source device, the terminals 811 and 813 are connected to the transmission circuit 611 for transmitting a LAN transmission signal SG611 to the sink and the terminal resistor 612 via the AC coupling capacitors 614, 605 and analog switches 641, 642, respectively. The terminals 814 and 812 are connected to the reception circuit 618 for receiving a LAN signal from the sink device and the terminal resistor 613 via the AC coupling capacitors 616, 617 and the analog switches 643, 644, respectively.

In the sink device, the terminals 821 through 824 are connected to the transmission circuit 661 and the reception circuit 668 and the terminal resistors 662, 663 via the AC coupling capacitors 664, 665, 666, 667 and the analog switches 691 through 694, respectively. The analog switches 641 through 644, 691 through 694 conduct when LAN communication is carried out and open when DDC communication is carried out.

The source device connects the terminal 813 and the terminal 814 to the DDC transceivers 651, 652 and the pullup resistors 653, 654 via other analog switches 646, 647, respectively.

The sink device connects the terminal 823 and the terminal 824 to the DDC transceivers 701, 702 and the pullup resistor 703 via the analog switches 696, 697. The analog switches 646, 647 conduct when DDC communication is carried out and open when LAN communication is carried out.

A mechanism for recognizing e-HDMI compliant devices by means of the potential of the reserved line 801 is basically the same as the example illustrated in FIG. 20 except the resistor 62 of the source device 601 is driven by the inverter 620.

When the input of the inverter 620 is HIGH, the resistor 621 becomes a pulldown resistor, so that, when viewed from the sink device, the source device gets in the same 0 V status as when an e-HDMI non-compliant device is connected. As a result, signal SG623 indicative of an e-HDMI compliance identification result of the sink device goes LOW, upon which the analog switches 691 through 694 controlled by the signal SG623 are opened and the analog switches 696, 697 controlled by a signal obtained by inverting the signal SG623 by the inverter 695 conduct. Consequently, the sink device 602 disconnects the SCL line 803 and the SDA line 804 from the LAN transceiver, connecting to the DDC transceiver.

On the other hand, in the source device, the input of the inverter 620 is also entered in a NOR gate 640 and output SG614 thereof goes LOW. Analog switches 641 through 644 controlled by output signal SG614 of the NOR gate 640 are opened and analog switches 646, 647 controlled by a signal obtained by inverting signal SG614 by the inverter 645 conduct. As a result, the source device 601 also disconnects the SCL line 803 and the SDA line 804 from the LAN transceiver, connecting to the DDC transceiver.

Conversely, when the input of the inverter 620 is LOW, then both the source device and the sink device disconnect the SCL line 803 and the SDA line 804 from the DDC transceiver, connecting to the LAN transceiver.

Circuits 631 through, 634, 681 through 683 for the confirmation of connection by the DC bias potential of the HPD line 802 have substantially the same functions as the example shown in FIG. 9. To be more specific, the HPD line 802 transmits, to the source device, information indicative that the cable 351 has been connected to the sink device at DC bias level in addition to the above-mentioned LAN communication. The resistors 682, 683 and the choke coil 681 in the sink device bias the HPD line 802 to approximately 4 V via the terminal 822 when the cable 351 is connected to the sink device.

The source device extracts the DC bias of the HPD line 802 by a lowpass filter composed of the resistor 632 and the capacitor 633 and compares the extracted DC bias with reference potential Vref2 (1.4 V for example) by the comparator 634. If the cable 351 is not connected to the sink device, the potential of the terminal 812 is lower than reference potential Vref2 by the pulldown resistor 631; if the cable 351 is connected to the sink device, this potential is higher than reference potential. Therefore, if output signal SG613 of the comparator 634 is HIGH, it indicates that the cable 351 is connected to the sink device. On the other hand, if the output signal SG613 of the comparator 634 is LOW, it indicates that the cable 351 is not connected to the sink device.

As described above and according to the exemplary configuration shown in FIG. 28, in an interface where the transmission of video and audio data, the exchange and authentication of connected device information, the communication of device control data, and LAN communication are carried out with one cable, the LAN communication is executed in unidirectional communication via two pairs of differential transmission paths. In the interface, an interface connection status is notified by the DC bias potential of at least one of these transmission paths, and at least two transmission paths are used for the communication of the exchange and authentication of connected device information in a time division manner with LAN communication. Consequently, this novel configuration allows the execution of time division processing for providing a time zone in which the SCL line and the SDA line are connected to the LAN communication circuit and a time zone in which the SCL line and the SDA line are connected to the DDC circuit. This time division can form a circuit for LAN communication regardless of the electrical specifications defined for DDC, thereby realizing a stabilized, certain, and low-cost LAN communication.

It should be noted that SDA and SCL execute communication with H being 1.5 KΩ pullup and L being pulldown of low impedance and CEC also executes communication with H being 27 KΩ pullup and L being pulldown of low impedance. In order to maintain the compatibility with the existing HDMI, holding these functions may make it difficult to share the LAN function for high-speed data communication that requires the matched termination of each transmission path.

The exemplary configurations shown in FIGS. 9 and 28 can avoid these problems. To be more specific, in the exemplary configuration shown in FIG. 9, instead of using the SDA, SCL, and CEC lines, full-duplex communication is executed based on one-pair bidirectional communication with the reserved line and the HPD line madking a differential pair. In the exemplary configuration shown in FIG. 28, two-pair full-duplex communication is executed based on unidirectional communication by making two differential pairs with the HPD line and the SDA line and with the SCL line and the reserved line.

FIGS. 29(A) through 29(E) illustrate bidirectional communication waveforms in the exemplary configuration shown in FIG. 9 or FIG. 28.

Figure 29:
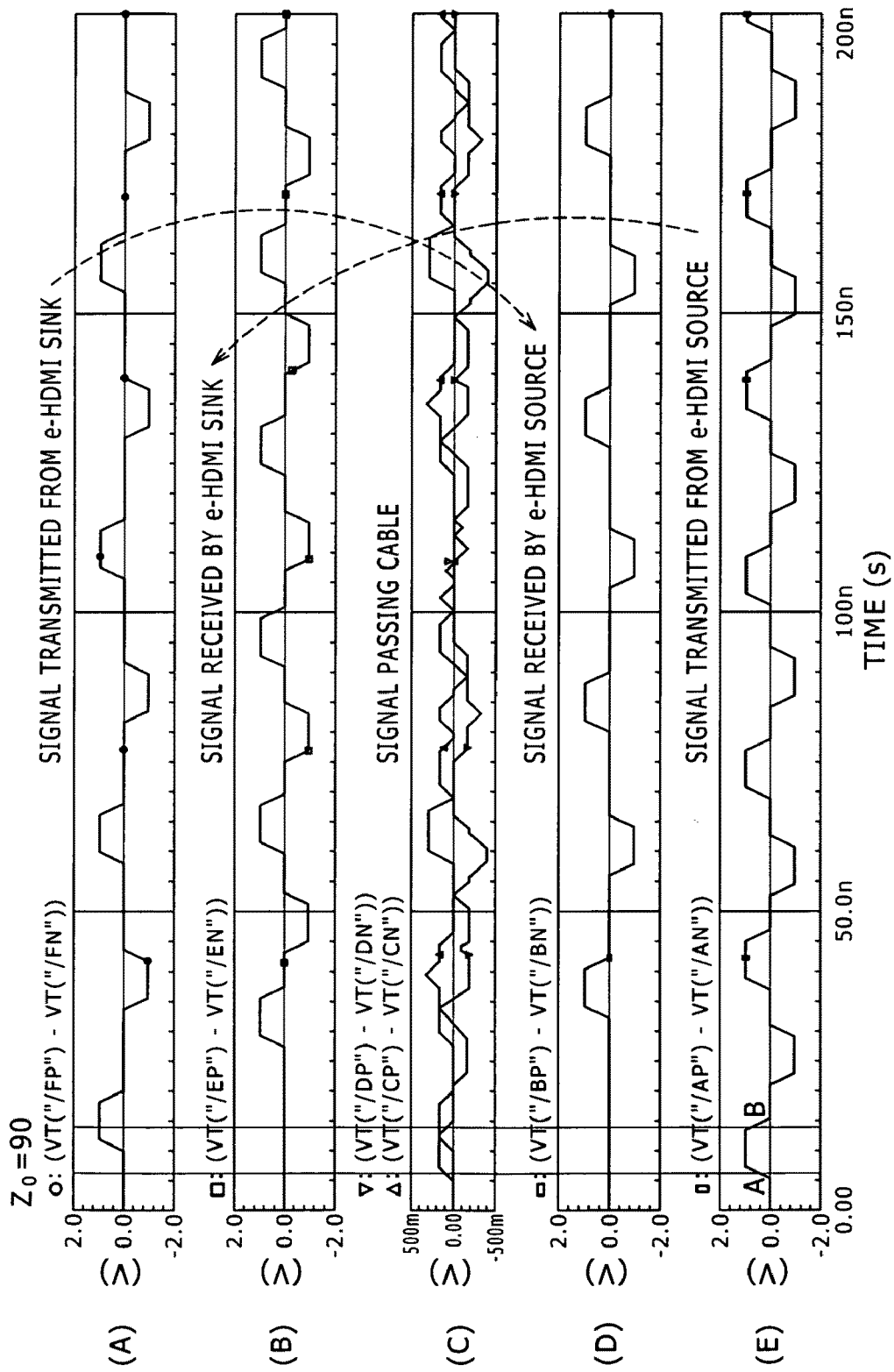
FIG. 29 is a waveform diagram illustrating bidirectional communication waveforms.

FIG. 29(A) shows a signal waveform transmitted from the source device; FIG. 29(B) shows a signal waveform received by the sink device; FIG. 29(C) shows a signal that passes through the cable; FIG. 29(D) shows a signal waveform received by the source device; and FIG. 29(E) shows a signal waveform transmitted from the source device, respectively. As seen from these figures, according to the exemplary configuration shown in FIG. 9 or FIG. 28, good bidirectional communication can be realized.

It should be noted that, in the above-mentioned embodiment, the television receiver 250, the disc recorder 210, and so on are eHDMI-compliant devices. The present invention is applicable if television receivers, disc recorders, and so on are not eHDMI-compliant devices. In this case, the television receivers, the disc recorders, and so on may be interconnected with the HDMI cable and each device may be Ethernet-connected by use of the network terminals. To be more specific, if each device is made compatible so as to be able of execute the processing shown in FIG. 10 described above, the processing can be uniquely executed by use of CEC vender commands.

In the above-mentioned embodiments of the invention, the electronic devices are interconnected with HDMI cables; it is also practicable to provide this interconnection in a wireless manner.

INDUSTRIAL APPLICABILITY

The present invention is intended to automatically execute the connection setting of DLNA, the access permission setting of DLNA, and so on and applicable to AV systems and so on with DLNA-compliant devices connected to a network.

The invention claimed is:

1. A DLNA-compliant device, comprising:
a device discovery section configured to discover another network-connected DLNA-compliant device;
a device decision section configured to decide whether said another DLNA-compliant device discovered by said device discovery section is a DLNA-compliant device directly connected by a transmission path of HDMI based on a bias potential of a reserved line of an HDMI cable connected to said DLNA-compliant device; and
a connection setting section configured to execute connection setting of DLNA with said another DLNA-compliant device decided to be said directly connected DLNA-compliant device by said device decision section,
wherein said device decision section enquires the another DLNA-compliant device discovered by said device discovery section for HDMI compliance via a CEC line of the HDMI cable.

2. The DLNA-compliant device according to claim 1, wherein said device discovery section discovers said another network-connected DLNA-compliant device by device discovery of UPnP.

3. The DLNA-compliant device according to claim 1, wherein said device decision section enquires the another DLNA-compliant device discovered by said device discovery section for HDMI compliance by comparing the bias potential of the reserved line of the HDMI cable with a reference voltage, thereby determining whether said another DLNA-compliant device is a DLNA-compliant device directly connected by a transmission path of HDMI.

4. The DLNA-compliant device according to claim 1, further comprising:
a signal reception section configured to receive a video signal by a differential signal over a plurality of channels from the another DLNA-compliant device directly connected via said transmission path of HDMI; and
a communication section configured to execute bidirectional communication by use of a predetermined line configuring said transmission path of HDMI.

5. The DLNA-compliant device according to claim 1, further comprising: a user confirmation section configured for a user to confirm by use of a user interface screen that connection setting is executed by said connection setting section.

6. A DLNA connection setting method using a DLNA-compliant device, the method comprising:
a device discovery step of discovering another network-connected DLNA-compliant device;
a device decision step of deciding whether said another DLNA-compliant device discovered by said device discovery section is a DLNA-compliant device directly connected by a transmission path of HDMI based on a bias potential of a reserved line of an HDMI cable connected to the DLNA-compliant device; and
a connection setting step of executing connection setting of DLNA with said another DLNA-compliant device decided to be said directly connected DLNA-compliant device in said device decision step,
wherein said device decision step enquires the another discovered DLNA-compliant device for HDMI compliance via a CEC line of the HDMI cable.

7. A computer-readable device recorded with a computer program configured to control a DLNA-compliant device to carry out a DLNA connection setting method, comprising:
discovering another network-connected DLNA-compliant device;
deciding whether said another DLNA-compliant device discovered by said discovering step is a DLNA-compliant device directly connected by a transmission path of HDMI based on a bias potential of a reserved line of an HDMI cable connected to the DLNA- compliant device; and executing connection setting of DLNA with said another DLNA-compliant device decided to be said directly connected DLNA-compliant device by said deciding step, wherein said deciding step enquires the another discovered DLNA-compliant device for HDMI compliance via a CEC line of the HDMI cable.

8. A DLNA-compliant device, comprising:

a device discovery section configured to discover another network-connected DLNA-compliant device;

a device decision section configured to decide whether said another DLNA-compliant device discovered by said device discovery section is a DLNA-compliant device directly connected by a transmission path of HDMI based on a bias potential of a reserved line of an HDMI cable connected to the DLNA-compliant device; and an access permission setting section configured, if an access request is made from a first DLNA-compliant device not directly connected to said transmission path of HDMI to a second DLNA-compliant device directly connected by said transmission path of HDMI, to set a permission of said access, wherein said device decision section enquires the another DLNA-compliant device discovered by said device discovery section for HDMI compliance via a CEC line of the HDMI cable.

9. The DLNA-compliant device according to claim 8, wherein said device discovery section discovers said another network-connected DLNA-compliant device by device discovery of UPnP.

10. The DLNA-compliant device according to claim 8, wherein said device decision section enquires the another DLNA-compliant device discovered by said device discovery section for HDMI compliance by comparing the bias potential of the reserved line of the HDMI cable with a reference voltage, thereby determining whether said another DLNA-compliant device is a DLNA-compliant device directly connected by a transmission path of HDMI.

11. The DLNA-compliant device according to claim 8, further comprising:

a signal reception section configured to receive a video signal by a differential signal over a plurality of channels from the another DLNA-compliant device directly connected via said transmission path of HDMI; and a communication section configured to execute bidirectional communication by use of a predetermined line configuring said transmission path of HDMI.

12. The DLNA-compliant device according to claim 8, wherein, if an access request is made from a first DLNA-compliant device not directly connected to said transmission path of HDMI to a second DLNA-compliant device directly connected by said transmission path of HDMI, said access permission setting section sets permission of access to another DLNA-compliant device directly connected by said transmission path of HDMI along with said second DLNA-compliant device.

13. The DLNA-compliant device according to claim 8, further comprising:

a user confirmation section configured for a user to confirm by use of a user interface screen that the setting is executed by said access permission setting section to permit access.

14. A DLNA connection setting method using a DLNA-compliant device, the method comprising:

a device discovery step of discovering another network-connected DLNA-compliant device;

a device decision step of deciding whether said another DLNA-compliant device discovered by said device discovery step is a DLNA-compliant device directly connected by a transmission path of HDMI based on a bias potential of a reserved line of an HDMI cable connected to the DLNA-compliant device; and an access permission setting step of, if an access request is made from a first DLNA-compliant device not directly connected to said transmission path of HDMI to a second DLNA-compliant device directly connected by said transmission path of HDMI, setting a permission of said access, wherein said device decision step enquires the another discovered DLNA-compliant device for HDMI compliance via a CEC line of said transmission path of HDMI.

15. A computer-readable device recorded with a computer program configured to control a DLNA-compliant device to carry out a DLNA connection setting method, comprising:

discovering another network-connected DLNA-compliant device;

deciding whether said another DLNA-compliant device discovered by said discovering step is a DLNA-compliant device directly connected by a transmission path of HDMI; and if an access request is made from a first DLNA- compliant device not directly connected to said transmission path of HDMI to a second DLNA-compliant device directly connected by said transmission path of HDMI, setting a permission of said access, wherein said deciding step enquires the another discovered DLNA-compliant device for HDMI compliance via a CEC line of said transmission path of HDMI.

* * * * *